United States Patent
Knox et al.

(10) Patent No.: US 7,261,843 B2
(45) Date of Patent: *Aug. 28, 2007

(54) PHOTOCHROMIC OPTICAL ARTICLE

(75) Inventors: Carol L. Knox, Monroeville, PA (US); Eric M. King, Pittsburgh, PA (US); James P. Colton, Trafford, PA (US)

(73) Assignee: Transitions Optical, Inc., Pinellas Park, FL (US)

( * ) Notice: Subject to any disclaimer, the term of this patent is extended or adjusted under 35 U.S.C. 154(b) by 337 days.

This patent is subject to a terminal disclaimer.

(21) Appl. No.: 10/793,582

(22) Filed: Mar. 4, 2004

(65) Prior Publication Data

US 2005/0196618 A1    Sep. 8, 2005

(51) Int. Cl.
- G02B 5/23 (2006.01)
- G02F 1/01 (2006.01)
- B32B 27/18 (2006.01)

(52) U.S. Cl. .................... 252/586; 359/238; 359/642; 428/412

(58) Field of Classification Search ............... 252/586, 252/582
See application file for complete search history.

(56) References Cited

U.S. PATENT DOCUMENTS

| | | | |
|---|---|---|---|
| 3,361,706 A | 1/1968 | Meriwether et al. ......... 260/39 |
| 3,479,328 A | 11/1969 | Nordstom .................. 260/86.1 |
| 3,563,957 A | 2/1971 | Beebe ....................... 260/77.5 |
| 3,799,854 A | 3/1974 | Jerabek ...................... 204/181 |
| 3,864,142 A | 2/1975 | Kovarik ...................... 117/100 |
| 3,919,315 A | 11/1975 | Wollweber et al. ......... 260/564 |
| 3,971,872 A | 7/1976 | LeBoeuf .................... 428/412 |
| 4,001,156 A | 1/1977 | Bosso et al. .............. 260/29.2 |
| 4,046,729 A | 9/1977 | Scriven et al. ............. 260/29.2 |
| 4,102,942 A | 7/1978 | Smith et al. ................ 260/836 |
| 4,166,043 A | 8/1979 | Uhlmann et al. ........... 252/300 |
| 4,367,170 A | 1/1983 | Uhlmann et al. ........... 252/286 |
| 4,405,679 A | 9/1983 | Fujioka et al. .............. 428/216 |
| 4,526,996 A | 7/1985 | Kilgour et al. ............. 556/413 |
| 4,650,718 A | 3/1987 | Simpson et al. ............ 428/413 |
| 4,681,811 A | 7/1987 | Simpson et al. ............ 428/413 |
| 4,703,101 A | 10/1987 | Singer et al. ................. 528/87 |
| 4,720,356 A | 1/1988 | Chu .......................... 252/586 |
| 4,731,264 A | 3/1988 | Lin et al. .................... 427/387 |
| 4,732,790 A | 3/1988 | Blackburn et al. .......... 427/407 |
| 4,756,973 A | 7/1988 | Sakagami et al. |
| 4,798,746 A | 1/1989 | Claar et al. .............. 427/407.1 |
| 4,804,581 A | 2/1989 | Geary et al. ................ 428/332 |
| 4,873,029 A | 10/1989 | Blum ......................... 264/1.3 |
| 4,904,525 A | 2/1990 | Taniguchi et al. .......... 428/328 |
| 4,931,220 A | 6/1990 | Haynes et al. ............. 252/586 |
| 5,051,309 A | 9/1991 | Kawaki et al. ............. 428/332 |
| 5,071,904 A | 12/1991 | Martin et al. .............. 524/458 |
| 5,084,541 A | 1/1992 | Jacobs, III et al. .......... 528/45 |
| 5,098,947 A | 3/1992 | Metzger et al. ............. 524/507 |
| 5,104,692 A | 4/1992 | Belmares ..................... 427/164 |
| 5,130,353 A | 7/1992 | Fischer et al. ................ 524/43 |
| 5,134,191 A | 7/1992 | Takarada et al. ............ 524/783 |
| 5,166,345 A | 11/1992 | Akashi et al. ................. 544/71 |
| 5,185,390 A | 2/1993 | Fischer et al. ................ 524/43 |
| 5,212,245 A | 5/1993 | Franks et al. ................ 525/223 |
| 5,231,156 A | 7/1993 | Lin ............................. 526/279 |
| 5,236,958 A | 8/1993 | Miyashita ................... 518/121 |
| 5,252,742 A | 10/1993 | Miyashita ................... 548/121 |
| 5,256,452 A | 10/1993 | McMonigal et al. ...... 427/407.1 |
| 5,296,321 A | 3/1994 | Kawanishi et al. |
| 5,300,334 A | 4/1994 | Niederst et al. ........... 428/35.7 |
| 5,359,085 A | 10/1994 | Iwamoto et al. ............ 548/468 |
| 5,391,327 A | 2/1995 | Ligas et al. ................. 252/586 |

(Continued)

FOREIGN PATENT DOCUMENTS

EP    0 443 803 A2    2/1991

(Continued)

OTHER PUBLICATIONS

B. Fischer, C. Thieme, T.M. Fischer, F. Kremer, T. Oge and R. Zentel: "The Packing Of Azobenzene Dye Moieties And Mesogens In The Opto-Dielectric Effect"; Liquid Crystals, 1997, vol. 22, No. 1; pp. 65-74.

(Continued)

*Primary Examiner*—Randy Gulakowski
*Assistant Examiner*—Timothy J. Kugel
(74) *Attorney, Agent, or Firm*—Frank P. Mallak; Deborah M. Altman

(57) ABSTRACT

Describes a photochromic article, e.g., an ophthalmic photochromic plastic article, such as a lens, in which the article includes (1) a rigid substrate, e.g., a transparent substrate such as a glass or organic polymeric substrate, as for example, a thermoset or thermoplastic substrate, (2) a photochromic polymeric coating appended to at least a portion of at least one surface of the substrate, the photochromic polymeric coating containing a photochromic amount of at least one organic photochromic material, e.g., spirooxazine, naphthopyran, diarylethene and/or fulgide, and (3) a thermally cured transparent thermoset polymeric coating superposed on, e.g., coherently appended to, the photochromic coating, the thermally cured polymeric coating being harder than the photochromic polymeric coating. Describes also the aforedescribed photochromic article having an abrasion-resistant coating affixed to the thermally cured polymer coating, e.g., an abrasion-resistant coating comprising an organo silane; and a photochromic article having an antireflective coating affixed to the abrasion-resistant coating.

19 Claims, No Drawings

U.S. PATENT DOCUMENTS

| | | | |
|---|---|---|---|
| 5,407,707 A | 4/1995 | Simeone et al. | 427/410 |
| 5,462,866 A | 10/1995 | Wang | 435/174 |
| 5,473,068 A | 12/1995 | Krongauz et al. | |
| 5,488,119 A | 1/1996 | Fischer-Reimann et al. | 552/201 |
| 5,580,819 A | 12/1996 | Li et al. | 427/167 |
| 5,593,733 A | 1/1997 | Mayo | 427/407.2 |
| 5,621,017 A | 4/1997 | Kobayakawa et al. | 522/16 |
| 5,639,802 A | 6/1997 | Neckers et al. | 522/25 |
| 5,645,767 A | 7/1997 | Van Gemert | 252/586 |
| 5,658,501 A | 8/1997 | Kumar et al. | 252/586 |
| 5,663,240 A | 9/1997 | Simeone et al. | 525/327.3 |
| 5,674,941 A | 10/1997 | Cho et al. | |
| 5,728,758 A | 3/1998 | Smith | |
| 5,728,769 A | 3/1998 | Natesh et al. | 524/591 |
| 5,753,146 A | 5/1998 | Van Gemert et al. | 252/586 |
| 5,757,459 A | 5/1998 | Bhalakia et al. | 351/168 |
| 5,770,115 A | 6/1998 | Misura | 252/586 |
| 5,776,376 A | 7/1998 | Nagoh et al. | 252/586 |
| 5,808,063 A | 9/1998 | Kumar | |
| 5,814,410 A | 9/1998 | Singer et al. | 428/423.1 |
| 5,821,287 A | 10/1998 | Hu et al. | 524/89 |
| 5,827,614 A | 10/1998 | Bhalakia et al. | 428/411.1 |
| 5,856,860 A | 1/1999 | Bhalakia et al. | 351/168 |
| 5,905,148 A | 5/1999 | Krongauz et al. | |
| 5,910,375 A | 6/1999 | Parker et al. | 428/520 |
| 5,916,669 A | 6/1999 | Parker et al. | 428/216 |
| 5,962,617 A | 10/1999 | Slagel | 528/61 |
| 5,965,670 A | 10/1999 | Mauer et al. | 525/398 |
| 6,025,026 A | 2/2000 | Smith et al. | 427/316 |
| 6,060,001 A | 5/2000 | Welch et al. | 252/586 |
| 6,065,836 A | 5/2000 | Krishnan et al. | 351/163 |
| 6,068,797 A | 5/2000 | Hunt | |
| 6,107,395 A | 8/2000 | Rosthauser et al. | 524/719 |
| 6,113,814 A | 9/2000 | Van Gemert et al. | 252/586 |
| 6,150,430 A | 11/2000 | Walters et al. | 522/79 |
| 6,153,126 A | 11/2000 | Kumar | 252/586 |
| 6,175,450 B1 | 1/2001 | Andreani et al. | 359/586 |
| 6,187,444 B1 * | 2/2001 | Bowles et al. | 428/423.1 |
| 6,190,777 B1 | 2/2001 | Asano et al. | 428/447 |
| 6,268,055 B1 | 7/2001 | Walters et al. | 428/413 |
| 6,277,917 B1 | 8/2001 | Jurgetz et al. | 525/125 |
| 6,281,272 B1 | 8/2001 | Baldy et al. | 523/501 |
| 6,296,785 B1 | 10/2001 | Nelson et al. | 252/586 |
| 6,328,446 B1 | 12/2001 | Bhalakia et al. | 351/163 |
| 6,348,604 B1 | 2/2002 | Nelson et al. | 549/389 |
| 6,353,102 B1 | 3/2002 | Kumar | 544/60 |
| 6,367,930 B1 | 4/2002 | Santelices et al. | 351/177 |
| 6,387,519 B1 | 5/2002 | Anderson et al. | 428/447 |
| 6,432,544 B1 | 8/2002 | Stewart et al. | 428/424.2 |
| 6,448,425 B1 | 9/2002 | Gedon et al. | 556/413 |
| 6,455,163 B1 | 9/2002 | Okamoto et al. | 428/412 |
| 6,506,322 B1 | 1/2003 | Breyne et al. | |
| 6,506,488 B1 | 1/2003 | Stewart et al. | 428/332 |
| 6,531,076 B2 | 3/2003 | Crano, deceased et al. | 252/586 |
| 6,547,390 B1 | 4/2003 | Bernheim et al. | 351/163 |
| 6,593,417 B1 | 7/2003 | Anderson et al. | 524/588 |
| 6,602,603 B2 | 8/2003 | Welch et al. | 428/412 |
| 6,639,039 B1 | 10/2003 | Fries et al. | |
| 6,916,537 B2 * | 7/2005 | Welch et al. | 428/412 |
| 6,998,072 B2 * | 2/2006 | Welch et al. | 252/586 |
| 7,189,456 B2 | 3/2007 | King | |
| 2002/0006505 A1 | 1/2002 | Nishizawa et al. | |
| 2002/0076549 A1 | 6/2002 | Welch et al. | |
| 2002/0114054 A1 | 8/2002 | Rietjens et al. | |
| 2003/0008149 A1 | 1/2003 | Moravec et al. | |
| 2003/0073755 A1 | 4/2003 | Garnett et al. | |
| 2003/0165686 A1 | 9/2003 | Blackburn et al. | |
| 2004/0207809 A1 | 10/2004 | Blackburn et al. | |
| 2005/0196616 A1 | 9/2005 | Stewart et al. | |
| 2005/0196626 A1 | 9/2005 | Knox et al. | |
| 2005/0196696 A1 | 9/2005 | King | |

FOREIGN PATENT DOCUMENTS

| | | |
|---|---|---|
| EP | 1 388 749 A1 | 2/2004 |
| EP | 1433814 A1 | 6/2004 |
| JP | 1022327 | 1/1986 |
| JP | 64-30744 | 2/1989 |
| JP | 3-35236 | 2/1991 |
| JP | 3-269507 | 12/1991 |
| JP | 7159923 | 6/1995 |
| JP | 11072808 | 3/1999 |
| JP | 2000026725 | 1/2000 |
| WO | WO94/20581 | 9/1994 |
| WO | WO96/37573 | 11/1996 |
| WO | WO97/06944 | 2/1997 |
| WO | WO97/22894 | 6/1997 |
| WO | WO99/42529 | 8/1999 |
| WO | WO 00/33111 | 6/2000 |
| WO | WO 00/34410 | 6/2000 |
| WO | WO 00/36048 | 6/2000 |
| WO | WO 00/36049 | 6/2000 |
| WO | WO 01/02449 A2 | 1/2001 |
| WO | WO 01/55269 | 8/2001 |
| WO | WO 01/57106 | 8/2001 |
| WO | WO 01/90268 A1 | 11/2001 |
| WO | WO 02/93235 A1 | 11/2002 |
| WO | WO 03/58300 A | 7/2003 |
| WO | WO 03/089487 | 10/2003 |
| WO | WO 2004/044626 A1 | 5/2004 |

OTHER PUBLICATIONS

S.C. Clark, S.Johnson and C. E. Hoyle: "Photoinitiated Polymerization of Acrylates Using Functional Maleimides"; Polymer Preprints, American Chemical Society; vol. 2, No. 37, 1996; pp. 348-349.

U.S. Appl. No. 10/793,241; Photochromic Optical Article; Michael B. Levesque, William P. Blackbum, Cathy Short, Kevin J. Stewart.

* cited by examiner

PHOTOCHROMIC OPTICAL ARTICLE

DESCRIPTION OF THE INVENTION

The present invention relates to photochromic articles comprising a rigid substrate to which is applied a photochromic polymeric coating on which is superposed a thermally cured polymeric film/coating. In particular, the present invention relates to rigid transparent substrates, e.g., glass and organic plastic substrates used for optical applications. More particularly, the present invention relates to photochromic articles used for ophthalmic applications, e.g., lenses. Still more particularly, the present invention relates to photochromic articles comprising a transparent substrate, e.g., a polymeric substrate, having a transparent photochromic organic polymeric coating appended to at least a portion of at least one surface of the substrate, and a transparent coating comprising a thermally cured thermoset polymer superposed on said photochromic coating.

In a particular embodiment, the present invention relates to photochromic articles, such as an ophthalmic plastic lens, on at least a portion of at least one surface of which has been appended sequentially, a first layer of a transparent, desirably optically clear, photochromic polymeric coating and a second layer of a transparent polymer prepared by curing thermally a curable organic composition. In a further embodiment of the present invention, there are contemplated photochromic articles having a third layer comprising at least one abrasion-resistant coating that is superposed on the second layer. In a still further embodiment, a fourth layer, e.g., an antireflective coating, is superposed on the abrasion-resistant coating. Additional layers can be applied beneath or on the fourth layer to provide additional functional properties to the photochromic article, e.g., antistatic and/or anti-wetting coatings.

Clear ophthalmic articles that provide good imaging qualities, while reducing the transmission of incident light into the eye, are needed for a variety of applications, such as sunglasses, vision correcting ophthalmic lenses, plano lenses and fashion lenses, e.g., non-prescription and prescription lenses, sport masks, face shields, goggles, visors, camera lenses, windows, automotive windshields, and aircraft and automotive transparencies, e.g., T-roofs, sidelights and backlights. Responsive to that need, photochromic articles used for optical applications have been given considerable attention. In particular, photochromic ophthalmic plastic lenses have been of interest because of the weight advantage they offer, vis-à-vis, glass lenses.

In addition, embodiments of the present invention can be used in association with plastic films and sheets, optical devices, e.g., optical switches, display devices and memory storage devices, such as those described in U.S. Pat. No. 6,589,452, and security elements, such as optically-readable data media, e.g., those described in U.S. Patent Application 2002/0142248, security elements in the form of threads or strips, as described in U.S. Pat. No. 6,474,695, and security elements in the form of verification marks that can be placed on security documents and articles of manufacture.

Photochromism is a phenomenon involving a reversible change in color of an organic or inorganic material, e.g., a chromene or silver halide salt (or an article comprising such a material) upon exposure to ultraviolet radiation. Sources of radiation that contain ultraviolet rays include, for example, sunlight and the light of a mercury lamp. When the photochromic material is exposed to ultraviolet radiation, it exhibits a change in color, and when the ultraviolet radiation is discontinued, the photochromic material returns to its original color or colorless state. Articles that have photochromic material(s) applied to or incorporated within the article exhibit this reversible change in color and a consequent reversible change in light transmission.

The mechanism responsible for the reversible change in color, e.g., the change in the absorption spectrum in the electromagnetic spectrum of visible light (400–700 nm), that is characteristic of different types of organic photochromic compounds has been described. See, for example, John C. Crano, "Chromogenic Materials (Photochromic)", Kirk-Othmer Encyclopedia of Chemical Technology, Fourth Edition, 1993, pp. 321–332. The mechanism responsible for the reversible change in color for organic photochromic compounds, such as indolino spiropyrans and indolino spirooxazines, is reported to involve an electrocyclic mechanism. When exposed to activating ultraviolet radiation, these organic photochromic compounds transform from a colorless closed ring form into a colored open ring form. In contrast, the electrocyclic mechanism responsible for the reversible change in color of photochromic fulgide compounds is reported to involve a transformation from a colorless open ring form into a colored closed ring form.

Photochromic plastic articles have been prepared by incorporating the photochromic material into the plastic substrate by surface imbibition techniques. In such method, photochromic dyes are incorporated into the subsurface region of a plastic article, such as a lens, by first applying one or more photochromic dyes/compounds to the surface of the plastic article, either as the neat photochromic dye/compound or dissolved in a polymeric or other organic solvent carrier, and then applying heat to the coated surface to cause the photochromic dye/compound(s) to diffuse into the subsurface region of the plastic article (a process commonly referred to in the art as "imbibition"). The plastic substrates of such photochromic plastic articles are reported to have sufficient free volume within the polymer matrix to allow photochromic compounds, such as the aforementioned spirooxazines, spiropyrans and fulgides, to transform from the colorless form into the colored form, and then revert to their original colorless form. There are, however, certain polymer matrices that are reported not to have sufficient free volume to allow the aforedescribed electrocyclic mechanism to occur sufficiently to permit their use as a substrate for imbibed (or internally incorporated) photochromic materials. Such substrates include, for example, thermoset polymer matrices, such as those prepared from polyol (allyl carbonate) monomers, notably allyl diglycol carbonate monomers, e.g., diethylene glycol bis(allyl carbonate), and copolymers thereof, the commonly known thermoplastic bisphenol A-based polycarbonates, and highly cross-linked optical polymers.

To allow the use of thermoset polymers, thermoplastic polycarbonates, and highly cross-linked optical polymeric materials as plastic substrates for photochromic articles, it has been proposed to apply organic photochromic coatings to the surface of such plastic substrates. It has also been proposed to apply an abrasion-resistant coating onto the exposed surface of the photochromic coating to protect the surface of the photochromic coating from scratches and other similar cosmetic defects resulting from physical or mechanical handling, cleaning and other exposure of the photochromic coating to the environment.

In certain circumstances involving ophthalmic plastic lenses having a photochromic polymeric coating and an overlay of an abrasion-resistant coating, it has been observed that when such lenses are severely scratched, cleaning of such a scratched lens with commercially available cleaning solutions containing alcohol, e.g., isopropyl alcohol, can cause imperfections in the photochromic coating. In addition, it is not uncommon to find that during manufacture of such plastic lenses, an abrasion-resistant coating that is applied to the photochromic coating, or an antireflective coating that is applied to the abrasion-resistant coating, fails to pass product requirements, or in the case of ophthalmic lenses does not meet commercially acceptable "cosmetic standards" for ophthalmic lenses. Cosmetic defects in a coated lens can include spots, scratches, inclusions, cracks and crazing. When this occurs, it is economically desirable to remove the defective coating, e.g., by chemical treatment with an aqueous caustic solution, and thereafter to apply a new coating. In the process of chemically removing the unacceptable coating, the underlying coatings, e.g., the photochromic coating, can be damaged, thereby destroying the value of the article, e.g., the lens. As is readily evident to those skilled in the art, sequential application of the abrasion-resistant and the antireflective coatings to the photochromic coating of an ophthalmic lens is one of the last in a series of multiple manufacturing steps, each of which adds value and increases the cost of the lens being produced. To scrap the lens at this near final stage of the production process because an appended coating fails to meet product requirements increases production costs and increases the final cost of the lens product. Avoidance of such product losses is, therefore, economically desirable.

Further, some manufacturers of photochromic ophthalmic lenses desire to place their own proprietary abrasion-resistant and/or antireflective coatings on the photochromic coated lenses that have been prepared by another manufacturer. It is possible for the photochromic coating to become scratched or blemished as a consequence of packaging, shipment, unpacking, cleaning or other physical/mechanical handling of the lens in preparation for the application of such abrasion-resistant and/or antireflective coatings. Consequently, it is desirable that a lens that is shipped to such manufacturers be resistant to scratches or other cosmetic imperfections that can be caused during packaging, unpacking, shipment, cleaning and/or handling of the photochromic coated lens, e.g., be scratch resistant.

To attenuate some of the foregoing difficulties, it has been proposed to apply a radiation-cured acrylate-based film between the photochromic coating and the abrasion resistant coating, thereby to lessen certain manufacturing problems associated with removing defective abrasion resistant coatings and/or antireflective coatings from the photochromic coating, and to protect a photochromic coating having no abrasion-resistant coating during handling and shipment. The radiation-cured acrylate-based film is described as being (a) scratch resistant, (b) resistant to treatment with dilute aqueous inorganic caustic solutions, and (c) compatible with abrasion-resistant, organo silane-containing coatings. Use of radiation curing for the acrylate-based film attenuates possible migration, if any, of the photochromic material in the photochromic coating into the acrylate-based film because of the short curing time required for radiation-cured acrylate-based films, vis-à-vis, the longer curing times typically associated with chemical compositions that are thermally cured.

It has now been discovered that transparent coatings/films prepared from polymerizable compositions that can be cured thermally can be used to attenuate the aforedescribed manufacturing problems, and that migration of photochromic materials into such coatings does not occur significantly as a consequence of the thermal curing process. Such coatings/films are placed between the photochromic polymeric coating and the abrasion-resistant coating. The thermally cured polymer coating/film is superposed on, e.g., adheres to, the photochromic coating, is typically harder than the photochromic coating, and is compatible with abrasion-resistant coatings comprising an organo silane material; namely, the applied abrasion-resistant coating does not craze, e.g., exhibit fine cracks. In a further embodiment, it is desirable, although not imperative, that the thermally cured polymer coating/film is resistant to treatment by dilute aqueous inorganic caustic.

In accordance with an embodiment of the present invention, there is contemplated a photochromic article, e.g., a lens, comprising:

(a) a rigid transparent substrate;

(b) a photochromic organic polymeric coating appended to at least a portion of at least one surface of said polymeric substrate, said polymeric coating comprising at least one organic photochromic material; and (c) a cured transparent polymer coating/film comprising a thermally cured polymerizable composition superposed on, e.g., appended coherently to, said photochromic polymeric coating.

In another embodiment of the present invention, there is contemplated the above-described photochromic article further comprising an abrasion-resistant coating, such as a hard coating comprising an organo silane, appended to the exposed surface of the thermally cured transparent polymer coating/film (c). In a further embodiment of the present invention, there is contemplated a photochromic article that has an antireflective coating applied to the abrasion-resistant coating. Other coatings, such as antistatic and/or antiwetting coatings can also be applied to the antireflective coating, or to the abrasion-resistant coating, e.g., below the antireflective coating.

In a still further embodiment of the present invention, there is contemplated an ophthalmic photochromic article comprising:

(a) a transparent organic plastic substrate, such as a thermoset substrate prepared from a polymerizable composition comprising an allyl diglycol carbonate, e.g., diethylene glycol bis(allyl carbonate), a substrate prepared from thermoplastic polycarbonate, a substrate prepared from a polyurea urethane, or a substrate prepared from compositions comprising the reaction product of polyfunctional isocyanate(s) and/or isothiocyanates and polythiols or polyepisulfide monomer(s);

(b) an optically clear photochromic organic polymeric coating, such as an acrylic-based, polyurethane-based, polyurea urethane-based, aminoplast or polyepoxy-based photochromic coating, appended to at least a portion of at least one surface of said plastic substrate, said polymeric coating comprising a photochromic amount of at least one organic photochromic material;

(c) an optically clear, thermally cured coating/film, comprising a thermally curable polymerizable composition adhered coherently to said photochromic coating; and (d) optionally, an abrasion resistant coating, such as a hard coating comprising an organo silane, adhered to said thermally cured coating/film. In yet a further contemplated embodiment, an antireflective coating is adhered to said abrasion-resistant coating, assuming that the abrasion-resistant coating is present.

DETAILED DESCRIPTION OF THE INVENTION

In accordance with the present invention, there are provided photochromic articles comprising a rigid substrate to which has been applied a photochromic polymeric coating on which is superposed a thermally cured polymer film/coating. In particular, the rigid substrate is a transparent rigid substrate, e.g., glass or a polymeric substrate; a transparent photochromic polymeric coating affixed to at least a portion of at least one surface of the substrate; and a transparent layer, e.g., coating/film, comprising a thermally cured polymerizable composition superposed on, e.g., adhered to, the photochromic coating. The thermally cured coating/film is typically (a) harder than the photochromic coating, e.g., it is less likely to be penetrated, marred or scratched than the photochromic coating when subjected to rubbing or scraping, and (b) compatible with abrasion-resistant, organo silane-containing coatings. In a further embodiment, the thermally cured coating/film is resistant to treatment with dilute aqueous inorganic caustic solutions.

For purposes of this specification (other than in the operating examples), unless otherwise indicated, all numbers expressing quantities and ranges of ingredients, reaction conditions, etc., such as those expressing refractive indices and wavelengths, are to be understood as modified in all instances by the term "about". Accordingly, unless indicated to the contrary, the numerical parameters set forth in this specification and attached claims are approximations that can vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Further, as used in this specification and the appended claims, the singular forms "a", "an" and "the" are intended to include plural referents, unless expressly and unequivocally limited to one referent.

As used herein, the term "cure", "cured" or similar terms, as used in connection with a cured or curable composition, e.g., a "cured composition" of some specific description is intended to mean that at least a portion of the polymerizable and/or crosslinkable components that form the curable composition are at least partially polymerized and/or crosslinked. In certain embodiments, the crosslink density of the crosslinkable components, e.g., the degree of crosslinking, can range from 5% to 100% of complete crosslinking. In other embodiments, the crosslink density can range from 35% to 85%, e.g., 50% to 85%, of full crosslinking. The degree of crosslinking can range between any combination of the previously stated values, inclusive of the recited values.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Also, it should be understood that any numerical range recited herein is intended to include all sub-ranges subsumed therein. For example, a range of "1 to 10" is intended to include all sub-ranges between and including the recited minimum value of 1 and the recited maximum value of 10, that is having a minimum value equal to or grater than 1 and a maximum value of equal to or less than 10. Because the disclosed numerical ranges are continuous, they include every value between the minimum and maximum values. Unless expressly indicated otherwise, the various numerical ranges specified in this application are approximations.

As used herein, the term "thermosetting" is meant to mean and include a composition that "sets" irreversibly upon curing or crosslinking, and wherein the polymer chains of the polymeric components are joined together by covalent bonds. Once cured or crosslinked, a thermosetting composition will not melt upon the application of heat and is insoluble in conventional solvents. As used herein, the term "polymer" is meant to encompass oligomers, and includes without limitation both homopolymers and copolymers. Also, as used herein, the term "reactive", as it pertains to a functional group, refers to a functional group that forms a covalent bond with another functional group under conditions sufficient to cure the composition. The term "(meth) acrylate" and like terms is intended to include both acrylates and methacrylates; and the term "polyisocyanate", unless otherwise indicated, is intended to included blocked (or capped) isocyanates as well as unblocked (poly)isocyanates.

The specific citation in this specification of patent applications, published or granted patents and published articles, such as the disclosures in identified patents that are referred to by column and line number, which describe relevant methods for preparing monomers, polymerizates, coatings, articles of manufacture, photochromic compounds, etc. are incorporated herein, in toto, by reference.

In accordance with an embodiment of the present invention, a transparent, thermally cured polymer coating/film is superposed, e.g., superimposed, on the photochromic coating. In a particular embodiment of the present invention, an abrasion-resistant coating is superposed on the thermally cured polymer coating/film. Since, in the later described embodiment, the thermally cured polymer coating/film is interposed between the photochromic coating and the abrasion-resistant coating, it serves to tie together these layers and serves as a barrier to protect the photochromic coating. In that described embodiment, the thermally cured polymer coating/film can be referred to as a "tie layer". As used herein, the term "coating/film" is intended to mean that the thickness of the thermally cured polymer can vary, and that such thickness can be that of a coating or film, as hereinafter defined with more particularity.

The transparent thermally cured polymer coating/film (hereinafter referred to as a tie layer, coating or film) can be prepared from various polymerizable compositions. In accordance with the present invention, the cured tie layer is (a) transparent, (b) is harder than the photochromic coating, e.g., more abrasion-resistant than the photochromic coating, and (c) is compatible with abrasion-resistant coatings comprising an organo silane. Thermally curable polymerizable compositions that produce cured coatings of the type described above are known to those skilled in the art. For reasons of brevity, the tie layer will be referred to herein primarily as a "coating".

Non-limiting examples of such polymerizable compositions include: (1) liquid crosslinkable compositions comprising a polyepoxide and a polyacid curing agent, which curing agent can comprise a half-ester formed from reacting an acid anhydride with a polyol; (2) thermosetting polyurethane compositions, e.g., polyesterurethane compositions, such as those based on a polymeric polyol and an organic polyisocyanate, including blocked polyisocyanates; (3) crosslinkable compositions comprising (i) a material containing a plurality of carbamate and/or urea functional groups and (ii) an aminoplast crosslinking agent; (4) curable film-forming compositions comprising acrylic polyols, aminoplast and carbamoyl triazines; (5) thermosetting powder clear coating compositions comprising (i) an epoxy functional acrylic polymer or copolymer as the predominant film-forming polymer and (ii) polycarboxylic acid crosslinking agent; (6) polysiloxane-based coatings; (7) and film-forming thermosetting resin compositions comprising a latex emulsion that includes crosslinked polymeric microparticles dispersed in an aqueous continuous phase. This film-forming thermosetting resin composition can comprise (i) a first reactant comprising reactive functional groups, (ii) a curing agent having functional groups reactive with the functional groups of the first reactant (i), and the latex emulsion of crosslinked polymeric microparticles. In a further embodiment, the film-forming thermosetting resin composition comprises an aqueous polyurethane dispersion, such as a dispersion that includes polyurethane acrylate particles.

Clear film-forming compositions comprising a polyepoxide and polyacid curing agent are known in the art. See, for example, U.S. Pat. Nos. 4,681,811 and 4,650,718, among others. Among the polyepoxides which can be used for such compositions are epoxy-containing acrylic polymers, epoxy condensation polymers, such as polyglycidyl ethers of alcohols and phenols, and certain polyepoxide monomers and oligomers. The epoxy-containing acrylic polymer is a copolymer of an ethylenically unsaturated monomer having at least one epoxy group and at least one polymerizable ethylenically unsaturated monomer that is free of epoxy groups, e.g., esters of (meth)acrylic acid.

Non-limiting examples of ethylenically unsaturated monomers containing epoxy groups are those containing 1,2-epoxy groups and include glycidyl acrylate, glycidyl methacrylate and allyl glycidyl ether. Non-limiting examples of ethylenically unsaturated monomers that do not contain epoxy groups are alkyl esters of acrylic and methacrylic acid containing from 1 to 20 atoms in the alkyl group. Specific non-limiting examples of these acrylates and methacrylates include methyl methacrylate, ethyl methacrylate, butyl methacrylate, ethyl acrylate, butyl acrylate and 2-ethylhexyl acrylate. Non-limiting examples of other copolymerizable ethylenically unsaturated monomers are vinyl aromatic compounds, such as styrene and vinyl toluene, nitriles such as acrylonitrile and methacrylonitrile, vinyl and vinylidene halides, such as vinyl chloride and vinylidene fluoride, and vinyl esters such as vinyl acetate. Acid group-containing copolymerizable ethylenically unsaturated monomers such as acrylic and methacrylic acid are typically not used because of the possible reactivity of the epoxy and acid group.

The epoxy group-containing ethylenically unsaturated monomer is desirably used in amounts of from 5 to 60, more desirably from 20 to 50, percent by weight of the total monomers used in preparing the epoxy-containing acrylic polymer. Of the remaining polymerizable ethylenically unsaturated monomers, desirably from 40 to 95 percent, more desirably from 50 to 80 percent, by weight of the total monomers are the alkyl esters of acrylic and methacrylic acid.

In preparing the epoxy-containing acrylic polymer, the epoxide functional monomers and the other ethylenically unsaturated monomers can be mixed and reacted by conventional free radical initiated organic solution polymerization, as is known in the art. The epoxy-containing acrylic polymer typically has a number average molecular weight between 1000 and 20,000, desirably 1000 to 10,000, and more desirably 1000 to 5000. The molecular weight is determined by gel permeation chromatography using a polystyrene standard.

The epoxy condensation polymers that can be used are polyepoxides having a 1,2-epoxy equivalency greater than 1, desirably greater than 1 and up to 3.0. Non-limiting examples of such epoxides are polyglycidyl ethers of polyhydric phenols and of aliphatic alcohols. These polyepoxides can be produced by etherification of the polyhydric phenol or aliphatic alcohol with an epihalohydrin, such as epichlorohydrin, in the presence of alkali. Non-limiting examples of polyphenols are 2,2-bis(4-hydroxyphenyl)propane (Bisphenol A) and 1,1-bis(4-hydroxyphenyl)ethane. Non-limiting examples of aliphatic alcohols are ethylene glycol, diethylene glycol, 1,2-propylene glycol and 1,4-butylene glycol. Also, cycloaliphatic polyols, such as 1,2-cyclohexanediol, 1,4-cyclohexanediol, 1,2-bis(hydroxymethyl)cyclohexane and hydrogenated Bisphenol A, can also be used.

In addition to the epoxy-containing polymers described above, certain polyepoxide monomers and oligomers can also be used. Examples of these materials are described in U.S. Pat. No. 4,102,942 in column 3, lines 1–16. Specific examples of such polyepoxides are 3,4-epoxycyclohexylmethyl-3,4-epoxycyclohexanecarboxylate and bis(3,4-epoxy-6-methylcyclohexylmethyl) adipate. These materials are aliphatic polyepoxides as are the epoxy-containing acrylic polymers.

Desirably, the polyepoxides are those that have a glass transition temperature less than 50° C., usually less than 30° C. The glass transition temperature (Tg) is described in PRINCIPLES OF POLYMER CHEMISTRY, Flory, Cornell University Press, Ithaca, N.Y., 1953, pages 52–57. The Tg can be calculated as described by Fox in Bull. Amer. Physic. Soc., 1, 3, page 123 (1956). The Tg can be determined experimentally such as by using a penetrometer, e.g., a DuPont 940 Thermomedian Analyzer. The Tg of the polymers as used herein refers to the calculated values unless otherwise indicated.

In one contemplated embodiment, the polyepoxide is a mixture of epoxy-containing acrylic polymer and a lower molecular weight polyepoxide, desirably an epoxy condensation polymer, as mentioned above, which has a molecular weight less than 800. The polyepoxide is present in the liquid crosslinkable composition in amounts of from 10 to 90 weight percent, based on the total weight of resin solids. When the lower molecular weight polyepoxide is used, it is used in amounts of from 1 to 40, desirably 5 to 30, percent by weight, based on the total weight of resin solids.

The polyacid curing agent contains two or more acid groups per molecule that are reactive with the polyepoxide to form a crosslinked coating as indicated by its resistance to organic solvent. The acid functionality is typically carboxylic acid, although acids such as sulfonic acid can be used. Desirably, the polyacid curing agent is a carboxyl-terminated material having at least two carboxyl groups per molecule. Non-limiting examples of polyacid curing agents that can be used are carboxylic acid group-containing polymers, such as acrylic polymers, polyesters, and polyurethanes, and oligomers, such as ester group-containing oligomers and monomers. Desirably, the polyacid curing agent has a Tg less than 30° C. Non-limiting examples of epoxy-reactive monomers are acrylic acid, methacrylic acid, maleic acid and partial esters of maleic acid.

When the polyacid curing agent is an acrylic polymer, copolymers of (a) an ethylenically unsaturated monomer containing at least one carboxylic acid and (b) a different ethylenically unsaturated monomer that is free from carboxylic acid groups can be used. Desirably, the acrylic polymer has an acid number of from 30 to 150, more desirably from 60 to 120.

The other monomeric component (b) is characterized by the group, H2C=C=, and can be styrene, alpha-substituted lower alkyl styrenes, such as alpha-methylstyrene, alkyl esters of acrylic and methacrylic acids, especially the lower alkyl esters thereof, e.g., methyl methacrylate, methyl and ethyl acrylate, and mixtures of these materials. The relative amounts of monomers (a) and (b) in the copolymer can be varied but, in any event, the copolymer should have sufficient amounts of monomers (a) and (b) to give an acid number within the limits indicated heretofore.

The acrylic copolymer can be prepared in conventional fashion, e.g., by heating monomers (a) and (b) at elevated temperatures, usually on the order of 90° C. to 140° C., typically 115° C. to 125° C. This polymerization can be carried out in bulk or in solution using such conventional solvents as aromatic hydrocarbons, typically benzene, toluene and xylene, or alcohols (e.g. butyl alcohol or monoalkyl ethers of ethylene glycol) and the like. The polymerization is usually carried out in the presence of a polymerization catalyst, typically, peroxides such as benzoyl peroxide, di-tertiarybutyl-peroxide, di-cumene peroxide and methyl-ethyl ketone peroxide, or other catalysts of the free-radical type.

Desirably, the carboxylic acid group-containing acrylic polymer will have a relatively low molecular weight. These products are non-gelled and typically will have number average molecular weights, as determined by gel permeation chromatography using a polystyrene standard, of from 500 to 5000, more typically 700 to 3000. The reaction products will also have a uniform molecular weight distribution that is evidenced by polydispersity values that are desirably less than 4, more desirably from 2 to 3. The polydispersity value is the ratio of the weight average molecular weight to the number average molecular weight, each being determined by gel permeation chromatography using a polystyrene standard as described above.

Commonly, the acid functional acrylic polymer is not the sole polyacid curing agent, because it is difficult to formulate high solids compositions with the acid functional acrylic polymers. The acid functional acrylic polymer is desirably used with other polyacid curing agents, e.g., the half-ester mentioned below. Besides acid group-containing acrylic polymers, acid group-containing polyesters can be used as the polyacid curing agents. Acid group-containing polyesters can be formed by reacting a polyol with a polycarboxylic acid or anhydride. With regard to the polyol-polycarboxylic acid or polycarboxylic acid anhydride, various polyols can be used including, but not limited to, ethylene glycol, neopentyl glycol, glycerol, pentaerythritol, trimethylolpropane and the like. Also, acid group-containing polyols such as dimethylolpropionic acid can be used.

Various polycarboxylic acids can be used as the curing agent, including but not limited to dicarboxylic acids such as phthalic acid, tetrahydrophthalic acid, hexahydrophthalic acid, maleic acid, itaconic acid, adipic acid, sebacic acid and the like. Also anhydrides of the polycarboxylic acids where they exist can be used.

The preparation of acid group-containing polyesters is well known in the art and usually involves preparation in an organic solvent with sufficient acid group-containing ingredients to form an acid group-containing material at the completion of the reaction. A sufficient excess of the acid component is employed in forming the polymers to provide an acid value of from 10 to 120 with a desired acid value being from 30 to 60. Besides acid group-containing polyesters, ester group-containing oligomers can be used. Non-limiting examples include half-esters formed from reacting polyols and 1,2-acid anhydrides. The half-esters are desired because they are of relatively low molecular weight and are quite reactive with epoxy functionality enabling the formulation of high solids fluid compositions.

The half-ester is obtained by reaction between a polyol and a 1,2-acid anhydride under conditions sufficient to ring open the anhydride, thereby forming the half-ester with substantially no polyesterification occurring. Such reaction products are of relatively low molecular weight with a narrow molecular weight. By "substantially no polyesterification occurring" is meant that the carboxyl groups of the anhydride are not esterified by the polyol in a recurring manner. By this is meant that less than 10 percent, desirably less than 5 percent, by weight polyester is formed.

Two reactions can occur when combining the anhydride and the polyol. The desired reaction involves ring opening the anhydride ring with hydroxyl, such as, X—(O—C(O)—R—C(O)—OH)a, wherein X is the residue of the polyol after reaction with the 1,2-dicarboxylic acid anhydride, R is an organic moiety associated with the anhydride and a is equal to at least 2. To achieve the desired reaction, the 1,2-acid anhydride and polyol are contacted together, usually by mixing the two ingredients together in a reaction vessel. Typically, the reaction is conducted in the presence of an inert atmosphere such as nitrogen and in the presence of a solvent to dissolve the solid ingredients and/or to lower the viscosity of the reaction mixture. Non-limiting examples of solvents are high boiling materials and include ketones, such as methyl amyl ketone, diisobutyl ketone, methyl isobutyl-ketone; aromatic hydrocarbons, such as toluene and xylene; as well as other organic solvents such as dimethyl formamide and N-methyl-pyrrolidone.

For the desired ring opening reaction and half-ester formation, a 1,2-dicarboxylic anhydride is used. The reaction temperature is desirably low, e.g., no greater than 135° C., more desirably less than 120° C., and usually within the range of 70° C.–135° C., e.g., 90° C.–120° C. Temperatures greater than 135° C. promote polyesterification, whereas temperatures less than 70° C. result in a sluggish reaction. The time of reaction can vary somewhat depending principally upon the temperature of reaction. Usually, the reaction time will vary from 10 minutes to 24 hours.

The equivalent ratio of anhydride to hydroxy on the polyol is desirably at least about 0.8:1 (the anhydride being considered monofunctional) to obtain maximum conversion to the desired half-ester. Ratios less than 0.8:1 can be used but such ratios result in increased formation of less desired half-esters.

Among the anhydrides that can be used in the formation of the desired polyesters are those that, exclusive of the carbon atoms and the anhydride moiety, contain from 2 to 30 carbon atoms. Non-limiting examples include aliphatic, including cycloaliphatic, olefinic and cycloolefinic anhydrides and aromatic anhydrides. Substituted aliphatic and aromatic anhydrides are also included within the definition of aliphatic and aromatic, provided the substituents do not adversely affect the reactivity of the anhydride or the properties of the resultant polyester. Non-limiting examples of substituents include: chloro, alkyl and alkoxy. Non-limiting examples of anhydrides include succinic anhydride, methyl succinic anhydride, dodecenyl succinic anhydride, octadecenyl succinic anhydride, phthalic anhydride, tetrahydrophthalic anhydride, methyl tetrahydrophthalic anhydride, hexahydrophthalic anhydride, alkyl hexahydrophthalic anhydrides such as methyl hexahydrophthalic anhydride, tetrachlorophthalic anhydride, endomethylene tetrahydrophthalic anhydride, chlorendic anhydride, itaconic anhydride, citraconic anhydride and maleic anhydride.

Among the polyols that can be used are those that contain from 2 to 20 carbon atoms. Desired are diols, triols and mixtures thereof. Non-limiting examples include polyols containing from 2 to 10 carbon atoms. Examples include, but are not limited to, aliphatic polyols such as ethylene glycol, 1,2-propanediol, 1,3-propanediol, 1,4-butanediol, 1,5-pentanediol, glycerol, 1,2,3-butanetriol, 1,6-hexanedial, neopentyl glycol, diethylene glycol, dipropylene glycol, 1,4-cyclohexanedimethanol, trimethylolpropane, 2,2,4-trimethylpentane-1,3-diol, and pentaerythritol, a tetrol. Aromatic polyols such as Bisphenol A and bis(hydroxymethyl) xylene can also be used.

In addition to the acid group-containing polymers and oligomers mentioned above, monomers containing at least two acid groups can be used. Non-limiting examples of monomeric polycarboxylic acids are those containing from 5 to 20 carbon atoms and include open chain, cyclic, saturated, unsaturated and aromatic acids. Examples include, but are not limited to, succinic acid, adipic acid, azelaic acid, sebacic acid, hexahydrophthalic acid, maleic acid, cyclohexene-1,2-dicarboxylic acid and phthalic acid.

The polyacid curing agent is present in the coating composition in amounts of from 10 to 90, usually 25 to 75, percent by weight based on the total weight of resin solids. The polyepoxide-polyacid composition also desirably contains an anhydride, more desirably an anhydride that is a liquid at 25° C. The presence of such an anhydride in the compositions provides an improved cure response. Non-limiting examples of anhydrides include alkyl-substituted hexahydrophthalic anhydrides wherein the alkyl group contains up to 7 carbons, more typically up to 4 carbons, such as methyl hexahydrophthalic anhydride and dodecenyl succinic anhydride. The amount of the anhydride that is used can vary from 0 to 40, desirably from 5 to 25, percent by weight, based on total weight of resin solids. The equivalent ratio of carboxyl to epoxy in the tie layer-forming compositions is typically adjusted so that there are about 0.3 to 3.0, usually from 0.8 to 1.5, equivalents of carboxyl (anhydride being considered monofunctional) per equivalent of epoxy.

The compositions will also commonly contain catalysts to accelerate the cure of the epoxy and acid groups. Non-limiting examples of such catalysts are basic materials and include organic amines and quaternary ammonium compounds such as pyridine, piperidine, dimethylaniline, diethylenetriamine, tetramethylammonium chloride, tetramethylammonium acetate, tetramethylbenzylammonium acetate, tetrabutylammonium fluoride, and tetrabutylammonium bromide. The amount of catalyst is typically from 0 to 10, more typically from 0.5 to 3, percent by weight based on resin solids.

The polyepoxide-polyacid compositions are liquid compositions and are desirably formulated into liquid high solids coating compositions. These coating compositions contain greater than 40 percent, desirably greater than 50 percent, more desirably greater than 60 percent, by weight resin solids. The solids content is determined by heating the composition to 105–110° C. for 1 to 2 hours to drive off the volatile material.

The crosslinkable tie layer composition can be applied to the photochromic coating by any of the conventionally known coating techniques, such as brushing, spraying, spin coating, dipping or flowing. Desirably, spray methods and spin coating are used. Any of the known spray techniques can be used, such as compressed air spraying, and electrostatic spraying, which methods can be either in a manual or automatic mode.

After application of the polyepoxide-polyacid tie layer composition to the photochromic coating, the tie layer is heated to cure it. In the curing operation, solvents are driven off and the film-forming material of the tie layer is crosslinked with the aid of any crosslinking agents present. The heating or curing operation is usually carried out at temperatures in the range of from 160° F.–350° F. (71° C.–177° C.) If required, lower or higher temperatures can be used depending upon whether it is sufficient to activate any necessary crosslinking mechanisms.

Thermosetting polyurethane compositions used to prepare transparent tie layers are those based on a polymeric polyol and an organic polyisocyanate including blocked polyisocyanates. These compositions are described in U.S. Pat. No. 5,300,334, among others. Non-limiting examples of polymeric polyols are polyether polyols, polyester polyols, acrylic polyols and mixtures of such polyols. Typically, polyester polyols and acrylic polyols are used. Non-limiting examples of organic polyisocyanates are monomeric polyisocyanates and polymeric isocyanates, with polymeric polyisocyanates being desired because they are less likely to leave extractable low molecular weight materials.

Polyester polyols are prepared by the polyesterification of an organic polycarboxylic acid or anhydride thereof with organic polyols and/or an epoxide. Usually, the polycarboxylic acids and polyols are aliphatic or aromatic dibasic acids and diols. The diols that are usually employed in making the polyester include, but are not limited to, acyclic alkylene glycols, such as ethylene glycol and neopentyl glycol, and cyclic glycols such as hydrogenated Bisphenol A, cyclohexanediol and cyclohexanedimethanol. Polyols of higher functionality can also be used. Non-limiting examples include trimethylolpropane and pentaerythritol, as well as higher molecular weight polyols such as those produced by oxyalkylating low molecular weight polyols.

The acid component of the polyester consists primarily of monomeric carboxylic acids or anhydrides having 2 to 18 carbon atoms per molecule. Among the acids that can be used are phthalic acid, terephthalic acid, hexahydrophthalic acid, adipic acid, azelaic acid, sebacic acid, maleic acid, glutaric acid, chlorendic acid, decanoic acid and dodecanoic acid. Higher polycarboxylic acids, such as trimellitic acid and tricarballylic acid, can also be used. Where acids are referred to above, it is understood that anhydrides of those acids that form anhydrides can be used in place of the acid. Also, lower alkyl esters of the acids such as dimethyl glutarate and dimethyl-terephthalate can be used.

Besides polyester polyols formed from polybasic acids and polyols, polylactone-type polyesters can also be employed. These products are formed from the reaction of a lactone, such as epsilon-caprolactone, and an active hydrogen-containing compound such as a polyol. Such products are described in U.S. Pat. No. 3,169,945. In addition to the polyester polyols, hydroxy-containing acrylic polymers or acrylic polyols can be used as the polyol component.

Among the acrylic polymers that can be used are interpolymers of 2 to 30 percent by weight hydroxy-containing vinyl monomers, such as hydroxyalkyl acrylate and methacrylate having 2 to 6 carbon atoms in the alkyl group, and 70 to 98 percent by weight of other ethylenically unsaturated copolymerizable materials such as alkyl acrylates and methacrylates, the percentages by weight being based on the total weight of the monomeric charge. Non-limiting examples of suitable alkyl acrylates and methacrylates are methyl methacrylate, lauryl methacrylate, 2-ethylhexyl methacrylate and n-butyl acrylate.

Besides the acrylates and methacrylates, other copolymerizable monomers that can be copolymerized with the hydroxyalkyl acrylates and methacrylates are ethylenically unsaturated materials such as monoolefinic and diolefinic hydrocarbons, halogenated monoolefinic and diolefinic hydrocarbons, unsaturated esters of organic and inorganic acids, amides and esters of unsaturated acids, nitriles and unsaturated acids and the like. Non-limiting examples of such monomers include styrene, 1,3-butadiene, acrylamide, acrylonitrile, alpha-methyl styrene, alpha-methyl chlorostyrene, vinyl butyrate, vinyl acetate, allyl chloride, divinyl benzene, diallyl itaconate, triallyl cyanurate and mixtures of such monomers. Usually these other ethylenically unsaturated materials are used in admixture with the above-mentioned acrylates and methacrylates.

Examples of polyether polyols are polyalkylene ether polyols which include those having the following general formula:

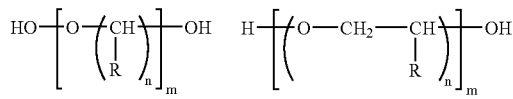

where the substituent R is hydrogen or lower alkyl containing from 1 to 5 carbon atoms including mixed substituents, and n is typically from 2 to 6 and m is from 10 to 100 or even higher. Included are poly(oxytetramethylene)glycols, poly(oxyethylene)glycols, poly(oxy-1,2-propylene)glycols and the reaction products of ethylene glycol with a mixture of 1,2-propylene oxide and ethylene oxide.

The polyisocyanates that can be used include aromatic and aliphatic polyisocyanates with aliphatic polyisocyanates being more desirable because of their superior ultraviolet light stability and non-yellowing tendencies. Non-limiting examples of such polyisocyanates include monomeric polyisocyanates, such as toluene diisocyanate, and 4,4'-methylene-bis-(cyclohexyl isocyanate), isophorone diisocyanate and NCO-prepolymers, e.g., the reaction products of monomeric polyisocyanates, such as those mentioned above, with polyester or polyether polyols. Particularly desired are the isocyanurates from isophorone isocyanate and 1,6-hexamethylene diisocyanate, both of which are commercially available.

Polyfunctional isocyanates with free isocyanate groups can be used to form two-package room temperature curable systems. In these systems, the polyester and isocyanate curing agents are mixed just prior to their application. Two-package systems are desired because of their reactivity at low temperature. The thermosetting polyurethane tie layer can be applied as a continuous film by a coating process. For coating applications, a liquid diluent is usually present with the polyurethane to form a coating composition. By "liquid diluent" is meant a solvent or non-solvent which is volatile and is removed after the coating is applied, e.g., by brushing, spin coating, or spraying, and is needed to reduce viscosity sufficiently to allow the coating to spread evenly over the applied surface to obtain a coating of uniform thickness. Generally, a diluent is present in the composition in amounts of about 20 to 90, usually 50 to 80, percent by weight based on the total weight of diluent and polyurethane. Non-limiting examples of suitable liquid diluents include aromatic hydrocarbons, such as toluene and xylene, and ketones such as methyl amyl ketone and methyl isobutyl ketone.

When water is employed as a diluent, either alone or in admixture with water-miscible solvents, the coating compositions should be modified so that they are dispersible in the aqueous diluent. This can be accomplished by the use of an externally added emulsifier incorporating water-solubilizing groups, such as ethylene oxide moieties or ionic salt groups, into one or more of the components of the coating composition. See, for example, the ionic salt groups described in column 5, lines 40–50 of U.S. Pat. No. 5,300,334. Ionic salt groups can be incorporated into the components of the coating compositions by techniques described in U.S. Pat. Nos. 4,147,679 and 3,479,310. Cationic polyurethanes are particularly desired because of their resistance to caustic.

For low temperature curing, a catalyst such as a tin compound, e.g., dibutyltin dilaurate, is usually present in the coating compositions. The catalyst is typically used in amounts of 0.25 to 0.30 percent by weight based on weight of resin solids. The polyurethane coating compositions can be applied by conventional methods, including spraying, spin coating, brushing, dipping, flow coating, etc., but typically are applied by spin coating or spraying. The coating operation can be conducted either in a single stage or by a multiple stage coating procedure, as is well known in the art.

The conditions adopted for curing the thermosetting polyurethane coating can vary. Typically, the coating is cured at a temperature of from about 20° to 60° C. for from 30 seconds to 4 hours. Generally, lower temperatures require longer cure times. Infrared heating can be used to shorten the time until the coating can be handled.

Crosslinkable coating compositions comprising (i) a material containing a plurality of carbamate and/or urea functional groups and (ii) an aminoplast crosslinking agent are described in U.S. Pat. No. 5,814,410, among others. More particularly, the crosslinkable composition comprises (1) a material containing a plurality of pendant or terminal groups of the general formulae:

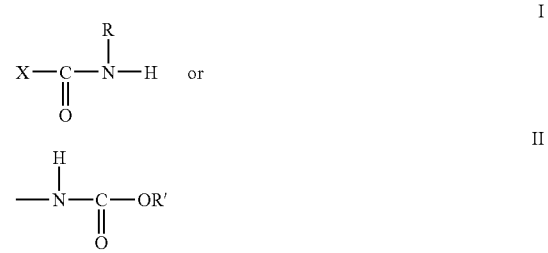

wherein X is —N or —O and R is H or alkyl of 1 to 18, e.g., 1 to 6, carbon atoms, or R is bonded to X and forms part of a five- or six-membered ring and R' is alkyl of 1 to 18, e.g., 1 to 6, carbon atoms; and (2) an aminoplast crosslinking agent containing methylol and/or methylol ether groups. The material of (1) has on average at least two pendant or terminal groups of structure I and/or II, desirably structure I, per molecule. Typically, X=—O. The material of (1) can be a polymer or oligomer, such as an acrylic polymer, a polyester polymer or oligomer, a polyurethane polymer or oligomer, or a blend of two or more of these materials. Acrylic polymers are desired. Prior to crosslinking, the tie layer-forming composition of (1) and (2) has a calculated hydroxyl value of less than 50, usually less than 25, and more usually 0, based on the solid weight of the film-forming composition, excluding any hydroxyl functionality associated with N-methylol groups, such as those in the aminoplast and any hydroxyl functionality that can be associated with N-methylol groups incorporated into the material of (1), such as N-methylol acrylamide groups in the acrylic polymer. By calculated hydroxyl value is meant the calculated value based on the relative amounts of the various ingredients used in making the tie layer-forming composition, rather than the actual hydroxyl value which is measured on the tie layer-forming composition itself by conventional techniques. The resultant crosslinked transparent tie layer coating/film contains a substantial number of urethane and/or urea crosslinks that arise from reaction of the terminal or pendant groups of structure I or II with the aminoplast.

The acrylic materials are copolymers of one or more alkyl esters of acrylic acid or methacrylic acid, and, optionally, one or more other polymerizable ethylenically unsaturated monomers. Non-limiting examples of alkyl esters of acrylic or methacrylic acid include methyl methacrylate, ethyl methacrylate, butyl methacrylate, ethyl acrylate, butyl acrylate, and 2-ethylhexyl acrylate. Non-limiting examples of other polymerizable ethylenically unsaturated monomers include vinyl aromatic compounds such as styrene and vinyl toluene; nitriles such as acrylonitrile and methacrylonitrile; vinyl and vinylidene halides such as vinyl chloride and vinylidene fluoride; vinyl esters such as vinyl acetate; and acid functional monomers such as acrylic and methacrylic acid.

Hydroxyl functional monomers such as hydroxyethyl acrylate, hydroxypropyl acrylate, hydroxyethyl methacrylate, and hydroxypropyl methacrylate, can be copolymerized with the acrylic monomers to impart hydroxyl functionality to the acrylic material in accordance with the calculated hydroxyl values mentioned above.

Pendant carbamate functional groups of structure I (X=—O) can be incorporated into the acrylic polymer by copolymerizing the acrylic monomers with a carbamate functional vinyl monomer, e.g., a carbamate functional alkyl ester of methacrylic acid. These carbamate functional alkyl esters are prepared by reacting, for example, a hydroxyalkyl carbamate, such as the reaction product of ammonia and ethylene carbonate or propylene carbonate, with methacrylic anhydride. Other carbamate functional vinyl monomers are, for instance, the reaction product of hydroxyethyl methacrylate, isophorone diisocyanate, and hydroxypropyl carbamate (yielding structure I), or the reaction product of hydroxypropyl methacrylate, isophorone diisocyanate, and methanol (yielding structure II). Still other carbamate functional vinyl monomers can be used, such as the reaction product of isocyanic acid (HNCO) with a hydroxyl functional acrylic or methacrylic monomer, such as hydroxyethyl acrylate, and those carbamate functional vinyl monomers described in U.S. Pat. No. 3,479,328. Pendant carbamate groups can also be incorporated into the acrylic polymer by reacting a hydroxyl functional acrylic polymer with a low molecular weight alkyl carbamate, such as methyl carbamate. Also, hydroxyl functional acrylic polymers can be reacted with isocyanic acid, thereby yielding pendant carbamate groups. Likewise, hydroxyl functional acrylic polymers can be reacted with urea to give an acrylic polymer with pendant carbamate groups.

Pendant urea groups of structure I (X=—N) can be incorporated into the acrylic polymer by copolymerizing the acrylic monomers with urea functional vinyl monomers, such as urea functional alkyl esters of acrylic acid or methacrylic acid. A non-limiting example of such a copolymerization reaction includes the condensation product of acrylic acid or methacrylic acid with a hydroxyalkyl ethylene urea, such as hydroxyethyl ethylene urea. Another urea functional monomer is, for example, the reaction product of hydroxyethyl methacrylate, isophorone diisocyanate, and hydroxyethyl ethylene urea. Mixed pendant carbamate and urea groups can also be used.

The acrylic polymer material can be prepared by solution polymerization techniques in the presence of suitable catalysts, such as organic peroxides or azo compounds, e.g., benzoyl peroxide or N,N-azobis(isobutyronitrile). The polymerization can be carried out in an organic solution in which the monomers are soluble by techniques conventional in the art. Alternately, the acrylic polymer can be prepared by aqueous emulsion or dispersion polymerization techniques well known in the art.

The acrylic material typically has a number average molecular weight of from 900 to 13,000, more particularly from 1000 to 5000, as determined by gel permeation chromatography using a polystyrene standard, and an equivalent weight of less than 5000, e.g., within the range of 140 to 2500, based on equivalents of reactive pendant or terminal carbamate or carbamate and/or urea groups. The equivalent weight is a calculated value based on the relative amounts of the various ingredients used in making the acrylic material and is based on solids of the acrylic material.

Polyesters can also be used in the formulation of the tie layer-forming composition and can be prepared by the polyesterification of a polycarboxylic acid or anhydride thereof with polyols and/or an epoxide. Usually, the polycarboxylic acids and polyols are aliphatic or aromatic dibasic acids and diols.

Non-limiting examples of the polyols that are typically employed in making the polyester include alkylene glycols, such as ethylene glycol, 1,6-hexanediol, neopentyl glycol, 2,2-dimethyl-3-hydroxypropyl-2,2-dimethyl-3-hydroxypropionate and other glycols, such as hydrogenated Bisphenol A, cyclohexanediol, cyclohexanedimethanol, caprolactone-based diols, for example, the reaction product of epsilon-caprolactone and ethylene glycol, hydroxy-alkylated bisphenols, polyether glycols, for example, poly (oxytetramethylene)glycol and the like. Polyols of higher functionality can also be used. Non-limiting examples of such polyols include trimethylolpropane, trimethylolethane, pentaerythritol and the like.

The acid component of the polyester is comprised primarily of monomeric carboxylic acids or anhydrides thereof having 2 to 18 carbon atoms per molecule. Non-limiting examples of such acids include phthalic acid, isophthalic acid, terephthalic acid, tetrahydrophthalic acid, hexahydrophthalic acid, methyl hexahydrophthalic anhydride, adipic acid, azelaic acid, sebacic acid, maleic acid, glutaric acid, decanoic diacid, dodecanoic diacid and other dicarboxylic acids of various types. The polyester can include minor amounts of monobasic acids such as benzoic acid, stearic acid, acetic acid and oleic acid. Also, there can be employed higher carboxylic acids, such as trimellitic acid and tricarballylic acid. Where carboxylic acids are referred to, it is understood that anhydrides thereof that exist can be used in place of the acid. Also, lower alkyl esters of the carboxylic acids such as dimethyl glutarate and dimethyl terephthalate can be used.

Pendant carbamate functional groups of structure I can be incorporated into the polyester by first forming a hydroxyalkyl carbamate, which then can be reacted with the polyacids and polyols used in forming the polyester. A polyester oligomer can be prepared by reacting a polycarboxylic acid, such as those mentioned above, with a hydroxyalkyl carbamate. A non-limiting example of a hydroxyalkyl carbamate is the reaction product of ammonia and ethylene carbonate or propylene carbonate. The hydroxyalkyl carbamate is condensed with the acid functionality on the polyester or polycarboxylic acid, yielding pendant carbamate functionality. Pendant carbamate functional groups of structure I can also be incorporated into the polyester by reacting isocyanic acid or a low molecular weight alkyl carbamate, such as methyl carbamate, with a hydroxyl functional polyester. Also, pendant carbamate functionality can be incorporated into the polyester by reacting a hydroxy functional polyester with urea.

Pendant urea groups of structure I can be incorporated into the polyester by reacting a hydroxyl functional urea such as a hydroxyalkyl ethylene urea with the polyacids and polyols used in making the polyester. A polyester oligomer can be prepared by reacting a polyacid with a hydroxyl functional urea. Also, isocyanate terminated polyurethane or polyester prepolymers can be reacted with primary amines, aminoalkyl ethylene urea, or hydroxyalkyl ethylene urea to yield materials with pendant urea groups. Preparation of these polymers is known in the art and is described in U.S. Pat. No. 3,563,957. Mixed pendant carbamate and urea groups can also be used in the polyester material.

Polyurethanes can be formed by reacting a polyisocyanate with a polyester having hydroxyl functionality and containing the pendant carbamate and/or urea groups. Alternatively, the polyurethane can be prepared by reacting a polyisocyanate with a polyester polyol and a hydroxyalkyl carbamate or isocyanic acid as separate reactants. Examples of polyisocyanates are aromatic and aliphatic polyisocyanates, with aliphatic being desired. Non-limiting examples of suitable aromatic diisocyanates include 4,4'-diphenylmethane diisocyanate, 1,3-phenylene diisocyanate, 1,4-phenylene diisocyanate, and toluene diisocyanate. Non-limiting examples of suitable aliphatic diisocyanates include straight chain aliphatic diisocyanates, such as 1,4-tetramethylene diisocyanate and 1,6-hexamethylene diisocyanate. Also, cycloaliphatic diisocyanates such as 1,4-cyclohexyl diisocyanate, isophorone diisocyanate, alpha, alpha-xylylene diisocyanate and 4,4'-methylene-bis-(cyclohexyl isocyanate) can be employed.

The polyester or polyurethane materials typically have number average molecular weights of from 300 to 3000, usually from 300 to 600, in solvent borne systems and from 900 to 1500 in water borne systems, as determined by gel permeation chromatography using a polystyrene standard, and an equivalent weight of from about 140 to 2500, based on equivalents of pendant carbamate and/or urea groups. The equivalent weight is a calculated value based on the relative amounts of the various ingredients used in making the polyester or polyurethane and is based on solids of the material.

Besides polymeric materials, relatively low molecular weight materials containing pendant carbamate functional groups of structure II can be formed by reacting isocyanate terminated monomers or oligomers, such as an isocyanurate of polymeric 1,6-hexamethylene diisocyanate, with an alcohol. Alcohols that can be used include aliphatic, cycloaliphatic, aromatic alkyl monoalcohol and phenolic compounds. Non-limiting examples of such alcohols include aliphatic alcohols containing from 1 to 18, usually lower aliphatic alcohols containing from 1 to 6 carbon atoms, such as methanol, ethanol, n-butyl alcohol and n-hexanol; cycloaliphatic alcohols such as cyclohexanol; aromatic- alkyl alcohols, such as phenyl carbinol and methylphenyl carbinol; phenolic compounds, such as phenol itself and substituted phenols in which the substituents do not adversely affect coating operations. Non-limiting examples include cresol and nitrophenol.

Blends of the acrylic, polyester, and polyurethane materials containing pendant or terminal carbamate and/or urea groups described above can also be prepared. Blends of the low molecular weight materials containing pendant carbamate and/or urea groups with the polymeric materials containing pendant carbamate and/or urea groups can also be prepared. The weight ratio of low molecular weight materials to polymeric materials can range from 10:90 to 90:10, usually from 10:90 to 40:60.

The tie layer-forming composition also includes an aminoplast crosslinking agent containing methylol and/or methylol ether groups. Aminoplast condensates are obtained from the reaction of formaldehyde with an amine or amide. The most common amines or amides are melamine, urea, or benzoguanamine, and these are the materials generally used. However, condensates with other amines or amides can be used, for example, aldehyde condensates of glycoluril. While the aldehyde used is most often formaldehyde, other aldehydes such as acetaldehyde, crotonaldehyde, and benzaldehyde can be used.

The aminoplast contains methylol groups and usually at least a portion of these groups are etherified with an alcohol to modify the cure response. Any monohydric alcohol can be employed for this purpose. Non-limiting examples thereof include methanol, ethanol, butanol, and hexanol. Typically, the aminoplasts that are used are melamine-, urea-, or benzoguanamine-formaldehyde condensates etherified with an alcohol containing from 1 to 6 carbon atoms. The aminoplast is present in amounts of about 1 to 80, usually 10 to 50, percent by weight based on weight of resin solids in the tie layer-forming composition. The equivalent ratio of pendant or terminal carbamate and/or urea functional groups of structure I and II above to methylol or methylol ether groups is 0.5 to 2:1, based on calculated equivalent weights, and is sufficient to form a crosslinked coating or film.

The tie layer-forming composition can be solvent borne, in which the carbamate and/or urea functional materials are dissolved in one or more non-reactive organic solvents. Suitable components of the solvent system that can be used are alcohols, such as n-propanol and n-butanol; ethers such as ethylene glycol dibutyl ether and diethylene glycol dibutyl ether; ketones such as methyl ethyl ketone, methyl isobutyl ketone, methyl amyl ketone and methyl N-butyl ketone; esters such as butyl acetate, 2-ethoxyethyl acetate and hexyl acetate; aliphatic and alicyclic hydrocarbons such as the various petroleum naphthas and cyclohexane; and aromatic hydrocarbons such as toluene and xylene. The amount of solvent used generally can range from 0 to 55 percent, usually from about 0 to 50 percent, and more usually from 40 to 50 percent, by weight based on the total weight of the tie layer-forming composition.

The tie layer-forming composition can also be waterborne. For example, acid-functional materials having terminal or pendant carbamate and/or urea groups can be neutralized with amines and dissolved or dispersed in water. Also, it is possible to prepare an aqueous dispersion of a blend of acrylic and polyester and/or polyurethane materials with pendant carbamate and/or urea groups in microparticulate form by a high stress technique using a homogenizer. This technique is described in U.S. Pat. No. 5,071,904.

The tie layer-forming composition will also generally contain catalysts to accelerate the cure of the aminoplast and carbamate or urea groups. Non-limiting examples of suitable catalysts are acidic materials and include sulfonic acids or substituted sulfonic acids, such as para-toluenesulfonic acid. The catalyst is usually present in an amount of from 0.5 to 5.0 percent by weight, usually from 1 to 2 percent by weight, based on weight of total resin solids. Optional ingredients such as, for example, plasticizers, flow controllers, antioxidants, UV light absorbers and similar additives conventional in the art can be included in the composition. These ingredients are typically present at up to 25% by weight based on total resin solids.

The tie layer-forming composition can be superposed on, e.g., applied to, the photochromic coating by any conventional coating technique, such as brushing, spin coating, spraying, dipping or flowing, but spin coating and spray applications are typically used. Any of the known spraying techniques can be employed, such as compressed air spraying and electrostatic spraying. The spraying can be either manual or automatic.

After application of the tie layer-forming composition to the photochromic coating, the tie layer is heated to cure it. The heating or curing operation is usually carried out at temperatures in the range of from 160–350° F. (71–177° C.) but, if needed, lower or higher temperatures can be used as necessary to activate crosslinking mechanisms.

Another example of a transparent tie layer is the coating obtained by compositions comprising acrylic polyols, aminoplast and carbamoyl triazines. Such compositions are described in U.S. Pat. No. 5,965,670 and typically comprise:

(a) up to 70, usually 55 to 70, percent by weight, more usually 60 to 70 percent by weight, most usually 65 to 70 percent by weight, based on the total weight of resin solids, of an acrylic polyol polymer;

(b) 20 to 35 percent by weight, usually 20 to 30 percent by weight, based on total weight of resin solids, of an aminoplast; and (c) 1 to 20, usually 3 to 20, percent by weight, more usually 5 to 15 percent by weight, most usually 5 to 10 percent by weight, based on total weight of resin solids, of a triazine compound of the formula: C3N3(NHCOXR)3, wherein X is nitrogen, oxygen, sulfur, phosphorus or carbon, and R is a lower alkyl group having 1 to 12, e.g., 1–5, carbon atoms, or mixtures of lower alkyl groups. The total of components (b) and (c) is greater than 25 and less than 45, usually from 30 to 40, percent by weight, more usually from 30 to 35 percent by weight, based on the total weight of resin solids.

The composition can optionally contain an additional polyol polymer or oligomer different from the acrylic polyol polymer of component (a). In this embodiment, the amount of acrylic polyol polymer of component (a) can be less than 55 percent by weight; and the total of acrylic polyol and additional polyol can be between 55 and 70 percent by weight, based on the total weight of resin solids in the film-forming composition.

The acrylic polymers are copolymers of one or more alkyl esters of acrylic acid or methacrylic acid optionally together with one or more other polymerizable ethylenically unsaturated monomers. The alkyl esters of acrylic acid or methacrylic acid include aliphatic alkyl esters containing from 1–30, usually 4–18 carbon atoms in the alkyl group. Non-limiting examples include methyl methacrylate, ethyl methacrylate, butyl methacrylate, ethyl acrylate, butyl acrylate, 2-ethylhexyl acrylate and 2-ethylhexyl methacrylate. Non-limiting examples of other copolymerizable ethylenically unsaturated monomers include vinyl aromatic compounds such as styrene and vinyl toluene; nitriles such acrylonitrile and methacrylonitrile; vinyl and vinylidene halides such as vinyl chloride and vinylidene fluoride; and vinyl esters such as vinyl acetate.

Hydroxyl functional groups are often incorporated into the polymer by using functional monomers, such as hydroxyalkyl acrylates and methacrylates, having 2 to 4 carbon atoms in the hydroxyalkyl group. Non-limiting examples of such materials including hydroxyethyl acrylate, hydroxyethyl methacrylate, hydroxypropyl acrylate, hydroxypropyl methacrylate, 4-hydroxybutyl acrylate, 4-hydroxybutyl methacrylate and the like. Also hydroxy functional adducts of caprolactone and hydroxyalkyl acrylates and methacrylates can be used. Mixtures of these hydroxyalkyl functional monomers can also be used.

The acrylic polyol polymer usually has beta-hydroxy ester functionality, and in a typical embodiment comprises a polymer of:

(1) ethylenically unsaturated, beta-hydroxy ester functional monomer;

(2) 5 to 50, usually from 10 to 30, percent by weight, based on total solid weight of monomers used to prepare the polymer, of a polymerizable ethylenically unsaturated, hydroxyalkyl functional monomer different from (1);

(3) 0 to 40 percent by weight, based on the total solid weight of monomers used to prepare the monomer, of a vinyl aromatic monomer;

(4) 0 to 60, usually 0 to 30, percent by weight, based on the total solid weight of monomers used to prepare the polymer, of at least one alkyl ester of acrylic acid or methacrylic acid; and (5) 0 to 20 percent by weight, based on the total solid weight of monomers used to prepare the polymer, of at least one ethylenically unsaturated monomer different from (1), (2), (3), and (4) above;

The beta-hydroxy ester functional monomer is chosen from:

a) ethylenically unsaturated, epoxy functional monomer and a saturated carboxylic acid having from 13 to 20 carbon atoms; and b) ethylenically unsaturated acid functional monomer and an epoxy compound containing at least 5 carbon atoms, that is not polymerizable with the ethylenically unsaturated acid functional monomer.

The beta-hydroxy ester functional monomer is typically present in the polymer in an amount of up to 70, usually 10 to 70, more usually 20 to 55, percent by weight, based on the total solid weight of monomers used to prepare the polymer.

Non-limiting examples of ethylenically unsaturated epoxy functional monomers include glycidyl acrylate, glycidyl methacrylate, allyl glycidyl ether, methallyl glycidyl ether, 1:1 (molar) adducts of ethylenically unsaturated monoisocyanates, such as meta-isopropenyl-alpha, alpha,-dimethylbenzyl isocyanate, with hydroxyl functional monoepoxides, such as glycidol, and glycidyl esters of polymerizable polycarboxylic acid, e.g., maleic acid, fumaric acid, and crotonic acid. Desired are the epoxy-functional acrylates such as glycidyl acrylate, epoxy functional methacrylates, e.g., glycidyl methacrylates, or mixtures thereof. Glycidyl methacrylate is particularly desirable.

Non-limiting examples of saturated carboxylic acids include saturated monocarboxylic acids such as those which are noncrystalline at room temperature, particularly those having branched structures. Isostearic acid is particularly desired. As used herein, the term "saturated" as in the phrase "saturated monocarboxylic acid" is intended to denote the absence of ethylenic unsaturation, but is not intended to exclude aromatic unsaturation as found, for example, in a benzene ring.

Non-limiting examples of ethylenically unsaturated acid functional monomers include monocarboxylic acids such as acrylic acid, methacrylic acid and crotonic acid; dicarboxylic acids such as itaconic acid, maleic acid, and fumaric acid; and monoesters of dicarboxylic acids such as monobutyl maleate and monobutyl itaconate. Acrylic acid and methacrylic acid are particularly desired.

The epoxy compound does not contain ethylenic unsaturation, which would participate in free radical initiated polymerization with the unsaturated acid monomer. Non-limiting examples of such epoxy compounds are glycidyl esters and ethers, usually those containing from 8 to 30 carbon atoms. Non-limiting examples of glycidyl ethers are glycidyl ethers of alcohols and phenols such as butyl glycidyl ether, octyl glycidyl ether, phenyl glycidyl ether and para(tertiary-butyl)phenyl glycidyl ether.

Non-limiting examples of glycidyl esters are those of the general formula:

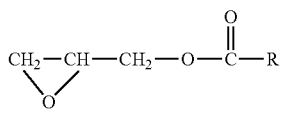

wherein R is a hydrocarbon radical having from 4 to 26 carbon atoms. Usually, R is a branched hydrocarbon radical, more usually a tertiary aliphatic group of from 8 to 10 carbon atoms, such as neopentanoate, neoheptanoate and neodecanoate. Glycidyl esters of commercially available mixtures of tertiary aliphatic carboxylic acids, such as those available from Shell Chemical Company as VERSATIC ACID 911, are particularly desired. The glycidyl esters themselves are also commercially available from Shell Chemical Company as CARDURA E. Non-limiting examples of other epoxy compounds are 1,2-pentene oxide and styrene oxide.

The ethylenically unsaturated acid functional monomer and epoxy compound are typically used in an equivalent ratio (acid to epoxy) of about 1:1. The ethylenically unsaturated acid functional monomer and epoxy compound can be pre-esterified prior to free radical initiated polymerization, or esterification and polymerization can take place simultaneously.

In addition to hydroxyl groups, the polymer can have carbamate functional groups. Such groups can be incorporated into the polymer in several ways. Carbamate functional groups can be incorporated into the polymer by copolymerizing the acrylic monomers with a carbamate functional vinyl monomer, e.g., a carbamate functional alkyl ester of methacrylic acid. These carbamate functional alkyl esters are prepared by reacting, for example, a hydroxyalkyl carbamate with methacrylic anhydride. Other carbamate functional vinyl monomers are, for instance, the reaction product of a hydroxyalkyl(meth)acrylate such as hydroxyethyl methacrylate, a diisocyanate such as isophorone diisocyanate, and a carbamate functional alcohol such as hydroxypropyl carbamate. Such monomers are disclosed in U.S. Pat. No. 5,098,947. Still other carbamate functional vinyl monomers, such as the reaction product of isocyanic acid (HNCO) with a hydroxyl functional acrylic or methacrylic monomer such as hydroxyethyl acrylate, can be used. Carbamate groups can also be incorporated into the acrylic polymer by reacting a hydroxyl functional acrylic polymer with a low molecular weight carbamate functional material via a "transcarbamoylation" reaction. Such a reaction can be performed at about 130 to about 170° C. In this reaction, a low molecular weight carbamate functional material derived from an alcohol or glycol ether is reacted with the hydroxyl groups of the acrylic polymer, yielding a carbamate functional acrylic polymer and the original alcohol or glycol ether.

The acrylic polyol polymer can be prepared by solution polymerization techniques. In conducting the reaction, the monomers are heated, typically in the presence of a free radical initiator and optionally a chain transfer agent, in an organic solvent in which the ingredients as well as the resultant polymer product are compatible. Typically, the organic solvent is charged to a reaction vessel and heated to reflux, optionally under an inert atmosphere. The monomers and other free radical initiator are added slowly to the refluxing reaction mixture. After the addition is complete, some additional initiator can be added and the reaction mixture held at an elevated temperature to complete the reaction.

The acrylic polymer used in the tie layer-forming composition typically has a weight average molecular weight of from 2,000 to 25,000, usually from 3,000 to 10,000, as determined by gel permeation chromatography using a polystyrene standard. The hydroxyl equivalent weight of the polymer is generally from 200 to 800, usually from 300 to 500.

The tie layer-forming composition further includes an aminoplast crosslinking agent. Aminoplast crosslinking agents are well known in the art and are described in U.S. Pat. No. 5,256,452, col. 9, lines 10–28. The aminoplast crosslinking agent can be monomeric or polymeric and can be partially or fully alkylated.

The triazine compound in the curable composition of the present invention has the formula C3N3(NHCOXR)3, wherein X is nitrogen, oxygen, sulfur, phosphorus, or carbon, and R is a lower alkyl group having 1 to 12, e.g., 1 to 5 or 8, carbon atoms, or mixtures of lower alkyl groups. The X moiety is usually oxygen or carbon, more usually oxygen. The R moiety usually has one to eight carbon atoms, e.g., methyl, ethyl, n-propyl, i-propyl, butyl, n-octyl, and 2-ethylhexyl. R is desirably a mixture of methyl and butyl groups. Such compounds and the preparation thereof are described in detail in U.S. Pat. No. 5,084,541. The triazine compound in the curable composition of the present invention can be added to the tie layer-forming composition neat, e.g., added by itself or in other resinous ingredients, or with solvents or other diluents.

The curable tie layer-forming composition of the present invention can optionally further contain an additional polyol polymer or oligomer different from the acrylic polyol polymer of component (a). The additional polyol polymer or oligomer can be chosen from acrylic polymers, polyester polymers and oligomers, polyurethane polymers and oligomers, and mixtures thereof.

The acrylic polymer can be prepared as generally described above (but with different monomers).

When the additional polyol polymer or oligomer is a polyester, the polyester can be prepared in a known manner by condensation of polyhydric alcohols and polycarboxylic acids. Non-limiting examples of polyhydric alcohols include ethylene glycol, propylene glycol, butylene glycol, 1,6-hexylene glycol, neopentyl glycol, diethylene glycol, glycerol, trimethylol propane, pentaerythritol and cyclohexane dimethanol.

Non-limiting examples of suitable polycarboxylic acids used to prepare the polyester include succinic acid, adipic acid, azelaic acid, sebacic acid, maleic acid, fumaric acid, phthalic acid, tetrahydrophthalic acid, hexahydrophthalic acid, and trimellitic acid. Besides the polycarboxylic acids mentioned above, functional equivalents of the acids such as anhydrides, when they exist, or lower alkyl esters of the acids such as the methyl esters can be used.

The polyesters contain a portion of free hydroxyl groups (done by using excess polyhydric alcohol during preparation of the polyester), which are available for crosslinking reactions.

Polyurethanes can also be used as the additional polyol polymer or oligomer in the tie layer-forming composition. Among the polyurethanes that can be used are polymeric polyols, which are prepared by reacting polyester polyols or acrylic polyols, such as those mentioned above, with a polyisocyanate such that the OH/NCO equivalent ratio is greater than 1:1 so that free hydroxyl groups are present in the product.

The organic polyisocyanate that is used to prepare the polyurethane polyol can be an aliphatic, substituted aliphatic, including aromatic substituted aliphatic polyisocyanates or mixtures thereof. Diisocyanates and/or higher polyisocyanates are suitable. Non-limiting examples of suitable aliphatic diisocyanates are straight chain aliphatic diisocyanates, such as 1,6-hexamethylene diisocyanate. Also, cycloaliphatic diisocyanates can be employed. Non-limiting examples of diisocyanates include isophorone diisocyanate and 4,4'-methylene-bis-(cyclohexyl isocyanate). An example of a substituted aliphatic polyisocyanate is meta-tetramethyl xylylene diisocyanate.

When the curable film-forming composition of the present invention contains an additional polyol polymer or oligomer, it is present in the film-forming composition in amounts up to 30, usually from 5 to 20, more usually from 5 to 10, percent by weight, based on the total weight of resin solids in the tie layer-forming composition.

Other optional ingredients, such as plasticizers, antioxidants, hindered amine light stabilizers, UV light absorbers and stabilizers can be formulated into the curable compositions of the tie layer forming composition. These ingredients can be present (on an individual basis) in amounts up to 10, usually from 0.1 to 5, percent by weight, based on total weight of resin solids of the curable composition.

Usually, the tie layer-forming composition is organic solvent based. It can however be dispersed or solubilized in aqueous based solvents. The tie layer-forming composition is typically applied to the photochromic coating by spin coating or spray application, but other application methods can, of course, be used. The composition is then heated to cure it. Typical curing conditions are from 265 to 300° F. (129 to 149° C.) for from 20 to 30 minutes.

Thermosetting powder clear coating compositions are described in U.S. Pat. No. 6,277,917 B1. Typically, these compositions comprise: (I) at least one epoxy functional acrylic polymer or copolymer (hereinafter referred to as "epoxy acrylic polymer") as the predominant film-forming polymer of the powder coating, and (II) polycarboxylic acid crosslinking agent, the ratio of epoxy functionality of (I) to acid functionality of (II) being from 1:0.6 to 1.4. Generally, the amount of the at least one particulate film-forming epoxy acrylic polymer is from 60 to 99.99 percent by weight, based on the solids of the curable clear powder coating composition. Generally, the amount of the polycarboxylic acid crosslinking agent is in the range of from 10 to 40 weight percent, based on the weight of solids of the curable clear powder coating composition.

When a single epoxy acrylic polymer is the predominant film-forming polymer, the polymer has a number average molecular weight ("Mn") range, a glass transition temperature (Tg) range, and an epoxy content range, all as shown in Table A. When a blend of more than one epoxy acrylic polymer is the predominant film-forming polymer of the curable powder coating composition, two of the epoxy acrylic polymers in the blend have the Mn, Tg, and epoxy content of one and the other epoxy acrylic polymers are as shown in Table A as "A" and "B".

TABLE A

| | Mn (grams) | Tg ° C. | Epoxy Content 2 |
|---|---|---|---|
| Single Epoxy Acrylic Polymer | 1000 to about 5500 | 30 to 60° C. as measured or 50 to 85° C. 1 | 35 to 85 |
| Blend of Epoxy Acrylic Polymers | A) 1000 to 10,000 | 40 to 851 | 40–60 |
| | B) 500 to 3000 | 35 to 1251 | 50–100 |

1 As calculated by the Acrylic Glass Transition Temperature Analyzer from Rohm and Haas Company which is based on the Fox equation.
2 (GMA) As weight percent of the monomers to prepare the epoxy acrylic polymer.

In the blend, two epoxy acrylic polymers have relatively low molecular weights and one polymer has a higher epoxy content within the higher range shown in Table A. If the epoxy acrylic polymer B of Table A has the epoxy content of 50 weight percent, the epoxy acrylic polymer A has a lower epoxy content within the range of 40 to almost 50. Also, when the higher epoxy content epoxy acrylic polymer has an epoxy content from 50 to 60, the epoxy content of the lower epoxy content epoxy acrylic polymer is in the range from 40 up to almost the value of epoxy content for the higher epoxy content epoxy acrylic polymer. Of course, with the epoxy content of greater than 60 for the higher epoxy content epoxy acrylic polymer, the epoxy content for the lower epoxy content epoxy acrylic polymer is in the range of from about 40 to 60. Also, the higher epoxy content epoxy acrylic polymer usually has the lower molecular weight between the two polymers "A" and "B" in the blend. Generally, the ratio of the low epoxy content polymer to the higher epoxy content polymer is in the range of 90:10 to 10:90.

The one or more epoxy acrylic polymers typically are formed by addition polymerization under free radical initiated conditions from at least the following: (i) from 20 to 100 percent by weight of the total monomers of a glycidyl functional copolymerizable ethylenically unsaturated monomer, and (ii) up to 65 percent by weight of one or more copolymerizable ethylenically unsaturated monomer or mixture of monomers. The exact amount of each monomer (i) and (ii) depends on the desired epoxy content for the epoxy acrylic polymer and on whether one or a blend of the epoxy acrylic polymers is used as the predominant film-forming polymer for the powder coating composition. With a single polymer, the particular amounts of (i) and (ii) monomers are from 35 to 85 percent by weight of (i) and from 15 to 65 percent by weight of (ii). The monomers of (ii) that are free of glycidyl functionality are of a type and are in an effective amount with the other monomers to yield the desired Tg for the epoxy acrylic polymer. The percents by weight for the monomers of (i) and (ii) are based on the total weight of (i) and (ii) for each polymer of the blend. As with the single epoxy acrylic polymer, the epoxy acrylic polymers of the blend have amounts of (i) and (ii) that vary according to the desired values of the parameters of Table A for each of the polymers of the blend.

Also, the epoxy acrylic polymer as a single epoxy acrylic polymer or in the blend can have the addition type of polymerization residue of styrene. For the single epoxy acrylic polymer, this can be resulting from an amount of styrene monomer in one or more of the (ii) monomers of up 25 weight percent of the total monomers used to prepare the epoxy acrylic polymer. For the epoxy acrylic polymers in the blend, the amount of styrene can be that resulting from an amount of styrene monomer in one or more of the (ii) monomers of up to about 39 weight percent of the total monomers used to prepare the epoxy acrylic polymers of the blend. In the blend, the polymer with the lower epoxy content generally has less than 25 weight percent of such a polymerization residue from styrene based on the total monomers used to prepare that epoxy acrylic polymer.

In the following discussion, unless explicitly stated otherwise, by the term "film-forming", is meant that (1) the particulate polymeric material of a powder coating upon melting and curing at elevated temperature or (2) the polymeric material dispersed or solubilized in a solvent or carrier upon drying or evaporation of the solvent or carrier and curing of the polymeric material forms a self-supporting continuous film on at least a horizontal surface. Also by the term "powder", is meant a particulate, finely divided solid polymeric material generally having a particle size of 0.005 to 100 microns. The terms "epoxy content" refer to a determination through the determination of epoxide equivalent weight in non-aqueous resins and their solutions by differential titration with perchloric acid using crystal violet as an indicator. The epoxy content is the epoxy equivalent weight divided by the molecular weight of the polyepoxide sample.

For the film-forming polymeric epoxy acrylic polymer for the predominant film-forming polymer of the curable powder coating, whether as the single polymer or the blend, the Tg's of Table A can generally be calculated by any method known to those skilled in the art. Tg is described in PRINCIPLES OF POLYMER CHEMISTRY (1953), Cornell University Press. The Tg can actually be measured or it can be calculated as described by Fox in Bull. Amer. Physics Soc., 1, 3 page 123 (1956). The Tg of the high Tg monomers mentioned herein refers to the calculated value of the homopolymer made from the monomer calculated as described above by Fox. For example, the Tg of methylmethacrylate monomer is 221° F. (105° C.) and that of styrene monomer is 212° F. (100° C.). The Tg of the copolymer from these monomers and the glycidyl-containing monomer in appropriate amounts is typically between 30° C. and 60° C., and more typically between 35° C. and 55° C. The actual measured values for Tg are obtainable by differential scanning calorimetry (DSC) usually at a rate of heating of 18° F. (10° C.) per minute, where the Tg is taken at the first inflection point. Also, the Tg can be measured experimentally by using a penetrometer, such as a DuPont 940 Thermomedian Analyzer or comparable equipment from Perkin-Elmer Corporation. The Tg of the polymers as used herein refers to the calculated values in accordance with the Fox equation as part of the tables of the "Acrylic Glass Transition Temperature Analyzer" from Rohm and Haas Company, unless otherwise indicated.

The epoxy acrylic polymer can be prepared by copolymerizing a glycidyl functional ethylenically unsaturated monomer (i), typically a glycidyl functional acrylic monomer, such as glycidyl acrylate or glycidyl methacrylate [glycidyl(meth)acrylate], with (ii) an ethylenically unsaturated monomer or mixture of monomers free of glycidyl functionality. Usually, when the polymer is the single main film-forming polymer of the coating composition, the glycidyl functional monomer (i) can be copolymerized with one or more (ii) monomers having a Tg greater than 200° F. (93° C.). Usually, the measured Tg for the single epoxy acrylic polymer is 30° C. to 60° C. Non-limiting examples of monomers free of glycidyl functionality include methylmethacrylate and methacrylic acid ester or acrylic acid ester [(meth)acrylic acid ester] having an alicyclic hydrocarbon group having 5 to 22 carbon atoms, more usually 5 to 10 carbon atoms in the ester portion. Non-limiting examples include cyclopentyl methacrylate, cyclohexyl methacrylate, methylcyclohexyl-methacrylate, trimethylcyclohexyl methacrylate, norbornylmethacrylate, norbornylmethyl methacrylate, isobornyl methacrylate and the like. The amount of styrene on a weight percent basis of the total monomers for the single type epoxy acrylic polymer is desirably up to 20 weight percent of the total monomers. When styrene is absent from the epoxy copolymer, it is desired to have at least one of the aforementioned high Tg ethylenically unsaturated monomers as monomers to prepare the epoxy acrylic polymer. Also, other ethylenically unsaturated monomers can be used in the preparation of the one or more epoxy acrylic polymers such as hydroxyalkylacrylates and hydroxyalkylmethacrylates such as hydroxypropylacrylate, hydroxypropylmethacrylate, and hydroxybutylacrylate.

The epoxy acrylic polymer can be prepared by traditional free radical initiated polymerization techniques using catalysts that include organic peroxides and azo-type compounds and chain transfer agents, such as alpha-methyl styrene dimer and tertiary dodecyl mercaptan. The preparation of the epoxy copolymer as an epoxy-containing acrylic polymer can be performed, as disclosed in U.S. Pat. No. 4,650,718 (column 1, line 61 through column 3, line 40, and column 4, line 55 through column 9, line 15). The preparation of the epoxy acrylic polymer utilized as the single copolymer for the main film-forming polymer of the powder composition usually has amounts of the (i) and (ii) monomers in the following ranges. Typically, this polymer has: (i) 35 to 65 percent by weight of the glycidyl functional monomer and (ii) 35 to 65 percent by weight of one or more copolymerizable ethylenically unsaturated monomers free of glycidyl functionality. Typically, the (ii) monomer is methylmethacrylate or trimethylcyclohexyl methacrylate. In addition to the (i) and (ii) monomers, the epoxy acrylic polymer can also have from 5 to 20 percent by weight, based on weight of the total monomers for the polymer, of one or more additional copolymerizable monomers different from the (i) and (ii) monomers, like butylmethacrylate. Although other ethylenically unsaturated monomers can be present in the epoxy acrylic polymer, the percentages by weight of the aforementioned monomers including any styrene preferably are based on the total weight of (i), and (ii) monomers, to achieve a total of 100 percent.

In addition to the aforementioned Mn, the single type of epoxy acrylic polymer usually has a weight average molecular weight between 1000 and 5500 and more usually from 2000 to 4000, with a peak molecular weight in the range of 2000 to 5500. Also, the single type of epoxy acrylic polymer usually has the aforelisted epoxy content so that there is from 3.0 to 5.9 moles of glycidyl functional ethylenically unsaturated monomer per kilogram of epoxy functional copolymer, more usually between 3.5 and 5.1 moles of glycidyl functional monomer per kilogram of epoxy copolymer.

When the predominant film-forming polymer of the powder coating is a blend of the epoxy acrylic polymers, the lower epoxy content polymer can have a peak molecular weight in the range of 4500 to 8000 and a measured Tg of 40° C. to 60° C. The higher epoxy content polymer can have a peak molecular weight of 2000 to 4500 and a measured Tg in the range of 40° C. to 60° C. The blend typically has a range from around 25 to 75 to 75 to 25 of the two aforementioned epoxy acrylic polymers wherein the molecular weight range, Tg range, epoxy equivalent weight and epoxy content are as shown in Table B.

TABLE B

| Mn (grams) | Tg ° C. | Epoxy Equivalent Weight | Epoxy Content |
|---|---|---|---|
| A) 1000 to 3000 | 50 to 85 (calculated) 30 to 60 (measured) | 240–350 | 50 |
| B) 800 to 2000 | 35 to 120 (calculated) 0 to about 40 | 142–285 | 90 |

The epoxy acrylic polymers for the blend are usually two epoxy copolymers that are prepared in a similar manner as the single epoxy acrylic polymer. The blend has a total styrene content for the two or more epoxy acrylic polymers, based on the weight of the total epoxy acrylic polymers, of from 0 up to 39 weight percent taking into consideration both epoxy acrylic polymers. This means that one of the epoxy acrylic polymers in the blend can have a styrene content greater than these ranges, but when considering the lower styrene content of the other epoxy acrylic polymer in the blend and the ratios of each epoxy acrylic polymer in the blend, the blend usually does not have a styrene content greater than the aforementioned range. The amounts of the (i) and (ii) monomers for one of the epoxy acrylic polymers in the blend are generally the same as those for the single type of epoxy acrylic polymer. While the other epoxy acrylic polymer in the blend has amounts of the (i) and (ii) monomers in the range to result in the higher epoxy content and the preferred Tg and molecular weight as listed in Table B.

The polyacid crosslinking agent in the film-forming resinous material is in amounts of about 10 to 90, usually 25 to 75, percent by weight based on total weight of resin solids in the powder coating composition. The polyacid crosslinking agent has a high average acid functionality. More specifically, the polyacid crosslinking agent on average contains more than two acid groups per molecule, more typically three or more, and most typically four or more, per molecule, such acid groups being reactive with the polyepoxide to form a crosslinked coating as indicated by its resistance to organic solvent. The parameter of greater than two acid groups per molecule is intended to encompass mixtures of polyacid crosslinking agents in which difunctional curing agents are mixed with tri- or higher functionality polyacid crosslinking agents. Polyacid crosslinking agent mixtures including up to about 50 percent of a difunctional curing agent with a trifunctional curing agent can be used. Higher percentages of difunctional materials can be used if the remainder of the curing agent mixture is higher than trifunctional or if the polyacid crosslinking agent mixture is used with a highly functional polyepoxide component. The acid functionality is usually carboxylic acid, although acids such as phosphorus-based acid can be used. Usually, the polyacid crosslinking agent is a carboxylic acid terminated material having, on average, greater than two carboxylic acid groups per molecule. Among the polyacid crosslinking agents that can be used are carboxylic acid group-containing polymers, such as acrylic polymers, polyesters, and polyurethanes, and oligomers such as ester group-containing oligomers. Art-recognized polyacid crosslinking agents include those described in U.S. Pat. No. 4,650,718 to Simpson et al. (column 1, line 61 through column 3, line 40 and column 4, line 55 through column 9, line 15); U.S. Pat. No. 4,681,811 to Simpson et al. (column 1, line 63 through column 10, line 65); U.S. Pat. No. 4,703,101 to Singer et al. (column 3, line 26 to column 6, line 5); U.S. Pat. No. 4,804,581 to Pettit et al. (column 5, line 12 through column 7, line 34); and U.S. Pat. No. 5,407,707 to Simeone et al. (column 3, line 50 through column 4, line 10).

Typically, the polycarboxylic acid is a crystalline material, more typically a crystalline aliphatic material containing from 4 to 20 carbon atoms. Non-limiting examples of suitable acids include adipic, succinic, sebacic, azelaic and dodecanedioic acid. In addition, carboxylic acid functional polyesters can be used to crosslink the powder coating composition. Low molecular weight polyesters and half-acid esters can be used which are based on the condensation of aliphatic polyols with aliphatic and/or aromatic polycarboxylic acids or anhydrides, or the reaction of aliphatic polyols and aliphatic and/or aromatic anhydrides, respectively. Non-limiting examples of suitable aliphatic polyols include ethylene glycol, propylene glycol, butylene glycol, 1,6-hexanediol, trimethylol propane, di-trimethylol propane, neopentyl glycol, 1,4-cyclo-hexanedimethanol, pentaerythritol and the like. The polycarboxylic acids and anhydrides can include those mentioned above, as well as terephthalic acid, isophthalic acid, phthalic acid, phthalic anhydride, tetrahydrophthalic acid, tetrahydrophthalic anhydride, hexahydrophthalic acid, methyltetrahexahydrophthalic anhydride, alkylhexahydrophthalic anhydride, chlorendic anhydride and the like. Mixtures of the polycarboxylic acids, anhydrides, and polyols can also be used.

The use of aliphatic crystalline dicarboxylic acids, such as dodecanedioic acid, is particularly desirable. The advantage of crystalline crosslinkers, particularly at the higher levels, is that generally they are incompatible with the epoxy functional copolymer providing for a more stable powder coating composition. However, when the powder coating composition is melted, the polyacid crosslinking agent is compatible and soluble in the acrylic copolymer acting somewhat as a diluent and allowing for improved flow.

The powder coating composition is prepared by combining approximately 60 to 90 percent by weight of the epoxy copolymer with from 10 to 40 percent by weight, based on total weight of the powder coating, of a polycarboxylic acid crosslinking agent. When the epoxy copolymer is in an amount in the lower portion of the aforementioned range, minor amounts of other film-forming polymers known to those skilled in the art to be useful in powder coating can be used.

Typically, a suitable range of epoxy copolymer to polycarboxylic acid crosslinking agent can be between 70 to 85, more usually 70 to 80, percent by weight epoxy copolymer and between 15 to 30, more usually 20 to 30, percent by weight polycarboxylic acid crosslinking agent, based on total weight of the powder coating. Also, it is desirable that the equivalent ratio of the reactants present in the powder composition is adjusted such that for each equivalent of epoxy there are around 0.3 to around 3.0, usually 0.75 to 1.5, equivalents of carboxyl (anhydride, if present, is considered monofunctional). The powder coating composition can also contain additional materials as known to those skilled in the art. For example, an anhydride and a copolymer of an alpha olefin and olefinically unsaturated anhydride can be used.

Additionally, polymer or copolymer flow control or flow modifying agents known to those skilled in the art can be used in the powder coating of the present invention. Suitable examples and amounts are described in U.S. Pat. No. 5,212,245 (columns 2–4). Also, commercially available flow control polymers and copolymers can be used such as Modaflow (or Resiflow) flow additives, available from Monsanto Chemical Company of St. Louis, Mo. and the like. Generally, the weight average molecular weight of the copolymer flow control agents can range from 1000 to 40,000, usually 1000 to 15,000. Generally, the glass transition temperature (Tg) of the copolymer is less than 10° C. and usually less than 0° C. and more usually in the range of −60° C. to −10° C. The Tg can be calculated and measured in the aforedescribed manner. The Tg of the copolymer is not limiting of its performance as a flow additive but Tg's greater than 10° C. are not recommended because of decreased flow on coating application. A suitable amount of the flow control agent can be in the range of from 0.01 to 10 percent by weight, based on total resin solids for the curable powder composition. Typically, the flow control copolymer will be included in the powder coating composition in amounts of 0.1 to 3 percent by weight, more usually from 0.5 to 2 percent by weight.

The thermosetting powder coating compositions described herein can optionally include other materials such as light stabilizers and antioxidants, such as those shown in U.S. Pat. No. 5,407,707.

Thermosetting powder coating compositions are prepared by melt blending the ingredients. This can be accomplished by first blending the ingredients in a high shear mixer such as a planetary mixture, and then melt blending in an extruder from about 80° C. to about 130° C. The extrudate is then cooled and pulverized into a particulate blend. Such a particulate mixture can be applied preferably by spraying techniques. After application of the powder coating composition to the photochromic coating, the powder coating is heated to a temperature sufficient to cure the coating, typically at about 250° F. to about 400° F. (121° C. to 204° C.) for about 1 to 60 minutes, and usually at about 275° F. to 350° F. (135° C. to 177° C.) for about 10 to 30 minutes.

In accordance with a further embodiment of the present invention, the thermally cured tie layer polymer can be applied as a latex emulsion that includes crosslinked polymeric microparticles dispersed in an aqueous continuous phase, as described in International Patent Publication WO 03/089487 A1. The polymeric microparticles can be prepared from a monomer mix that includes:

(a) a crosslinking monomer having two or more sites of reactive unsaturation and/or monomers having one or more functional groups capable of reacting to form crosslinks after polymerization;

(b) a polymerizable ethylenically unsaturated monomer having hydrophilic functional groups having the following structures (I) and/or (II):

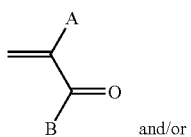

and/or

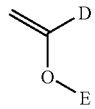

wherein A is chosen from H and C1–C3 alkyl; B is chosen from —NR1R2, —OR3 and —SR4, wherein R1 and R2 are independently chosen from H, C1–C18 alkyl, C1–C18 alkylol and C1–C18 alkylamino, R3 and R4 are independently chosen from C1–C18 alkylol, C1–C18 alkylamino, —CH2CH2-(OCH2CH2)n-OH, wherein n is 0 to 30, and —CH2CH2-(OC(CH3)HCH2)m-OH, wherein m is 0 to 30, D is chosen from H and C1–C3 alkyl; and E is chosen from —CH2CHOHCH2OH, C1–C18 alkylol, —CH2CH2-(OCH2CH2)n-OH, wherein n is 0 to 30, and —CH2CH2-(OC(CH3)HCH2)m-OH, wherein m is 0 to 30; and, optionally, (c) one or more polymerizable ethylenically unsaturated monomers, where (a), (b) and (c) are different from each other.

By "alkylol" is meant a hydrocarbon radical that contains one or more hydroxyl groups. By "alkylamino" is meant a hydrocarbon radical that contains one or more amine groups.

Crosslinking monomers that can be used as the crosslinking monomer (a) can include any monomer having two or more sites of reactive unsaturation, or any monomer that has one or more functional groups capable of reacting to form crosslinks after polymerization. As used herein, functional groups that are capable of reacting to form crosslinks after polymerization refer to functional groups on a first polymer molecule that can react under appropriate conditions to form covalent bonds with functional groups on a second polymer molecule to form a crosslinked polymer. Functional groups that can react to form crosslinks include, but are not limited to N-alkoxymethyl amides, N-methylolamides, lactones, lactams, mercaptans, hydroxyls, epoxides and the like. Non-limiting examples of such monomers include, N-alkoxymethyl(meth)acrylamides, γ-methylol(meth)acryloxytrialkoxysilane, N-methylol(meth)acrylamide, N-butoxymethyl (meth)acrylamide, (meth)acryliclactones, N-substituted (meth)acrylamide lactones, (meth)acryliclactams, and N-substituted (meth)acrylamide lactams and glycidyl(meth)acrylate.

As mentioned, the crosslinking monomer can have two sites of reactive unsaturation. In a further embodiment, the crosslinking monomer can be one or more of ethylene glycol di(meth)acrylate, triethylene glycol di(meth)acrylate, tetraethylene glycol di(meth)acrylate, 1,3-butylene glycol di(meth)acrylate, trimethylolpropane tri(meth)acrylate, 1,4-butanediol di(meth)acrylate, neopentyl glycol di(meth)acrylate, 1,6-hexanediol di(meth)acrylate, pentaerythritol di(meth)acrylate, pentaerythritol tri(meth)acrylate, pentaerythritol tetra(meth)acrylate, glycerol di(meth)acrylate, glycerol allyloxy di(meth)acrylate, 1,1,1-tris(hydroxymethyl)ethane di(meth)acrylate, 1,1,1-tris(hydroxymethyl) ethane tri(meth)acrylate, 1,1,1-tris(hydroxymethyl)propane di(meth)acrylate, 1,1,1-tris(hydroxymethyl)propane tri(meth)acrylate, triallyl cyanurate, triallyl isocyanurate, triallyl trimellitate, diallyl phthalate, diallyl terephthalate, divinyl benzene, methylol (meth)acrylamide, triallylamine, and methylenebis(meth) acrylamide.

The crosslinking monomer (a) comprises at least 15 weight percent, typically at least 20 weight percent, in many cases at least 22.5 weight percent, and in some cases at least 25 weight percent of the monomer mix used to prepare the polymeric microparticles. Also, the crosslinking monomer comprises not more than 45 weight percent, in many cases not more than 40 weight percent, typically not more than 35 weight percent, and in some cases not more than 30 weight percent of the monomer mix used to prepare the polymeric microparticles. The level of the crosslinking monomer (a) used is determined by the desired properties that are to be incorporated into the resulting microparticle. The crosslinking monomer can be present in the monomer mix at any value or in any combination of the recited ranges inclusive of those values stated above.

Any of the polymerizable ethylenically unsaturated monomers having hydrophilic functional groups described by structures I and/or II above can be used as monomer (b) provided that the monomer can be polymerized in a latex emulsion polymerization system and does not substantially affect the stability of the latex emulsion or the polymerization process.

Polymerizable ethylenically unsaturated monomers having hydrophilic functional groups that can be used as monomer (b) in the preparation of the polymeric microparticles include, but are not limited to, (meth)acrylamide, hydroxyethyl(meth)acrylate, hydroxypropyl(meth)acrylate, dimethylaminoethyl (meth)acrylate, allyl glycerol ether, methallyl glycerol ether and polyethyleneoxide allyl ether. In one embodiment, the polymerizable ethylenically unsaturated monomers having hydrophilic functional groups (b) include only monomers described by structure (I) above. In another embodiment, the polymerizable ethylenically unsaturated monomers having hydrophilic functional groups (b) include only monomers described by structure (II) above.

The polymerizable ethylenically unsaturated monomer having hydrophilic functional groups (b) comprises at least 2 weight percent, sometimes greater than 2 weight percent, often at least 5 weight percent, often greater than 5 weight percent, usually at least 7 weight percent, and typically at least 8 weight percent of the monomer mix used to prepare the polymeric microparticles. The polymerizable ethylenically unsaturated monomer having hydrophilic functional groups comprises not more than 35 weight percent, in many cases not more than 30 weight percent, typically not more than 20 weight percent, and often not more than 15 weight percent of the monomer mix used to prepare the polymeric microparticles. The level of the polymerizable ethylenically unsaturated monomer having hydrophilic functional groups used is determined by the properties that are to be incorporated into the resulting microparticle. The level of the polymerizable ethylenically unsaturated monomer having hydrophilic functional groups present in the monomer mix can range between any combination of the recited values inclusive of the recited values.

Polymerizable ethylenically unsaturated monomers that can be used as monomer (c) which, optionally, make up the remainder of the monomer mix, and which are different from the crosslinking monomer (a) and the monomer having hydrophilic functional groups (b), can be included in the polymeric microparticles of the present invention. Any polymerizable ethylenically unsaturated monomer that it is capable of being polymerized in a latex emulsion polymerization system and does not substantially affect the stability of the latex emulsion or the polymerization process can be used. Examples of polymerizable ethylenically unsaturated monomers include, but are not limited to, methyl(meth) acrylate, ethyl(meth)acrylate, propyl(meth)acrylate, N-butyl (meth)acrylate, t-butyl(meth)acrylate, 2-ethylhexyl(meth) acrylate, isobornyl (meth)acrylate, dimethylaminoethyl (meth)acrylate, styrene, (meth)acrylonitrile, lauryl (meth) acrylate, cyclohexyl (meth)acrylate, and 3,3,5-trimethylcyclohexyl (meth)acrylate.

The polymerizable ethylenically unsaturated monomer (c) can comprise at least 20 weight percent, typically at least 30 weight percent, in many cases at least 40 weight percent, and in some cases at least 50 weight percent of the monomer mix used to prepare the polymeric microparticles. The polymerizable ethylenically unsaturated monomers can comprise not more than 80 weight percent, in many cases not more than 75 weight percent, typically not more than 70.5 weight percent, and in some cases not more than 67 weight percent of the monomer mix used to prepare the polymeric microparticles. The level of the polymerizable ethylenically unsaturated monomer (c) that can be used is determined by the properties that are to be incorporated into the resulting microparticle. The level of the polymerizable ethylenically unsaturated monomer (c) present in the monomer mix can range between any combination of the recited values inclusive of the recited values.

In a particular embodiment, the crosslinking monomer (a) comprises one or more of glycol di(meth)acrylates and glycol tri(meth)acrylates; the polymerizable ethylenically unsaturated monomer having hydrophilic functional groups (b) comprises (meth)acrylamide; and the polymerizable ethylenically unsaturated monomer (c) comprises one or more alkyl(meth)acrylates.

The latex emulsion of crosslinked polymeric microparticles dispersed in an aqueous continuous phase is prepared by latex emulsion polymerization of (a), (b) and optionally, (c) as described above. In many cases, the monomer mixture of (a), (b) and (c) will readily disperse into stable monomer droplets and micelles as would be expected in a Smith-Ewart type of process. In such cases, no monomeric or polymeric emulsifiers and/or protective colloids are added to the latex emulsion, and the latex emulsion is substantially free of polymeric emulsifiers and/or protective colloids. It should be understood, however, that in some cases, a surface active agent can be added to the aqueous continuous phase to stabilize, or prevent coagulation or agglomeration of the monomer droplets, especially during polymerization.

The surface active agent can be present in the latex emulsion of the present invention at any level that stabilizes the emulsion. The surface active agent can be present at least 0.001 percent by weight, often times at least 0.005 percent by weight, typically at least 0.01 percent by weight, and in some cases at least 0.05 percent by weight based on the total weight of the latex emulsion. The surface active agent can be present at up to 10 percent by weight, often times up to 7.5 percent by weight, typically up to 5 percent by weight, and in some cases up to 3 percent by weight based on the total weight of the latex emulsion. The level of the surface active agent used is determined by the amount required to stabilize the latex emulsion. The surface active agent can be present in the latex emulsion at any level or in any range of levels inclusive of those stated above.

The surface active agent can be an anionic, cationic, or nonionic surfactant or dispersing agent, or compatible mixtures thereof, such as a mixture of an anionic and a nonionic surfactant. Examples of cationic dispersion agents include, but are not limited to, lauryl pyridinium chloride, cetyldimethyl amine acetate, and alkyldimethylbenzylammonium chloride, in which the alkyl group has from 8 to 18 carbon atoms. Examples of anionic dispersing agents include, but are not limited to, alkali fatty alcohol sulfates, such as sodium lauryl sulfate, and the like; arylalkyl sulfonates, such as potassium isopropylbenzene sulfonate, and the like; alkali alkyl sulfosuccinates, such as sodium octyl sulfosuccinate, and the like; and alkali arylalkylpolyethoxyethanol sulfates or sulfonates, such as sodium octylphenoxypolyethoxyethyl sulfate, having 1 to 5 oxyethylene units, and the like. Examples of non-ionic surface active agents include but are not limited to alkyl phenoxypolyethoxy ethanols having alkyl groups of from about 7 to 18 carbon atoms and from about 6 to about 60 oxyethylene units such as, for example, heptyl phenoxypolyethoxyethanols; ethylene oxide derivatives of long chained carboxylic acids such as lauric acid, myristic acid, palmitic acid, oleic acid, and the like, or mixtures of acids such as those found in tall oil containing from 6 to 60 oxyethylene units; ethylene oxide condensates of long chained alcohols such as octyl, decyl, lauryl, or cetyl alcohols containing from 6 to 60 oxyethylene units; ethylene oxide condensates of long-chain or branched chain amines such as dodecyl amine, hexadecyl amine, and octadecyl amine, containing from 6 to 60 oxyethylene units; and block copolymers of ethylene oxide sections combined with one or more hydrophobic propylene oxide sections. High molecular weight polymers such as hydroxyethyl cellulose, methyl cellulose, polyacrylic acid, polyvinyl alcohol, and the like, can be used as emulsion stabilizers and protective colloids.

A free radical initiator typically is used in the latex emulsion polymerization process. Examples of free radical initiators include, but are not limited to, thermal initiators, photoinitiators and oxidation-reduction initiators, all of which can be otherwise categorized as being water-soluble initiators or non-water-soluble initiators. Examples of thermal initiators include, but are not limited to, azo compounds, peroxides and persulfates. Examples of persulfates include, but are not limited to, sodium persulfate and ammonium persulfate. Oxidation-reduction initiators can include, as non-limiting examples persulfate-sulfite systems as well as systems utilizing thermal initiators in combination with appropriate metal ions such as iron or copper.

Examples of azo compounds include, but are not limited to, non-water-soluble azo compounds such as 1–1'-azobiscyclohexanecarbonitrile), 2–2'-azobisisobutyronitrile, 2–2'-azobis(2-methylbutyronitrile), 2–2'-azobis(propionitrile), 2-2'-azobis(2,4-dimethylvaleronitrile), 2–2'-azobis(valeronitrile), 2-(carbamoylazo)-isobutyronitrile and mixtures thereof; and water-soluble azo compounds such as azobis tertiary alkyl compounds include, but are not limited to, 4–4'-azobis(4-cyanovaleric acid), 2–2'-azobis(2-methylpropionamidine)dihydrochloride, 2,2'-azobis[2-methyl-N-(2-hydroxyethyl)propionamide], 4,4'-azobis(4-cyanopentanoic acid), 2,2'-azobis(N,N'-dimethyleneisobutyramidine), 2,2'-azobis(2-amidinopropane)dihydrochloride, 2,2'-azobis(N, N'-dimethyleneisobutyramidine)dihydrochloride and mixtures thereof.

Examples of peroxides include, but are not limited to, hydrogen peroxide, methyl ethyl ketone peroxides, benzoyl peroxides, di-t-butyl peroxides, di-t-amyl peroxides, dicumyl peroxides, diacyl peroxides, decanoyl peroxide, lauroyl peroxide, peroxydicarbonates, peroxyesters, dialkyl peroxides, hydroperoxides, peroxyketals and mixtures thereof.

The average particle size of the polymeric microparticles can be at least 0.001 microns, in many cases at least 0.005 microns, typically at least 0.01 and in some cases at least 0.02 microns. The average particle size of the polymeric microparticles typically is no more than 1 micron, in many cases less than 1 micron, often not more than 0.9 microns and usually not more than 0.8 microns. When the average particle size is too large, the microparticles can tend to settle from the latex emulsion upon storage. The average particle size of the polymeric microparticles can be any value or in any range of values inclusive of those stated above.

In a further embodiment, the thermally cured tie layer is directed to an aqueous dispersion comprising a thermosetting composition comprising:

(I) a first reactant comprising reactive functional groups;
(II) a curing agent having functional groups reactive with the functional groups of the first reactant (I); and
(III) the latex emulsion of crosslinked polymeric microparticles dispersed in an aqueous continuous phase as described in detail above.

The thermosetting composition can be in any suitable physical form, for example in liquid form, such as a solution, dispersion or emulsions, and in solid form, for example, a dry particulate powder.

The first reactant (I) of the thermosetting composition can include various reactive functional groups. For example, the functional groups can comprise one or more of epoxy, carboxylic acid, hydroxy, amide, oxazoline, aceto acetate, isocyanate, methylol, amino, methylol ether, and carbamate. Likewise, the functional groups of the curing agent (II) can vary, provided such groups are reactive with those of the first reactant (I). For example, the functional groups of the curing agent (II) can comprise one or more of epoxy, carboxylic acid, hydroxy, isocyanate, capped isocyanate, amine, methylol, methylol ether, and beta-hydroxyalkylamide. Generally, the functional groups of (I) and (II) will be different from and reactive with each other.

Examples of the first reactant (I) include, but are not limited to, film-forming polymers with at least one reactive functional group. Such polymers can include any of a variety of functional polymers known in the art. For example, hydroxyl group-containing polymers such as acrylic polyols, polyester polyols, polyurethane polyols, polyether polyols, and mixtures thereof can be used. In particular, the film-forming polymer can comprise an acrylic polyol having a hydroxyl equivalent weight ranging from 1000 to 100 grams per solid equivalent, typically 500 to 150 grams per solid equivalent.

Hydroxyl group and/or carboxyl group-containing acrylic polymers can be prepared from polymerizable ethylenically unsaturated monomers, and are typically copolymers of (meth)acrylic acid and/or hydroxylalkyl esters of (meth) acrylic acid with one or more other polymerizable ethylenically unsaturated monomers such as alkyl esters of (meth) acrylic acid including methyl(meth)acrylate, ethyl(meth) acrylate, butyl (meth)acrylate and 2-ethyl hexylacrylate, and vinyl aromatic compounds, such as styrene, alpha-methyl styrene and vinyl toluene.

An acrylic polymer can be prepared from ethylenically unsaturated, beta-hydroxy ester functional monomers. Such monomers can be derived from the reaction of an ethylenically unsaturated acid functional monomer, such as monocarboxylic acids, for example, acrylic acid; and an epoxy compound that does not participate in the free radical initiated polymerization with the unsaturated acid monomer. Examples of such epoxy compounds include, but are not limited to, glycidyl ethers and esters. Non-limiting examples of glycidyl ethers include glycidyl ethers of alcohols and phenols, such as butyl glycidyl ether, octyl glycidyl ether, phenyl glycidyl ether and the like. Non-limiting examples of glycidyl esters include those that are commercially available from Shell Chemical Company under the tradename CARDURA E; and from Exxon Chemical Company under the tradename GLYDEXX-10. Alternatively, the beta-hydroxy ester functional monomers can be prepared from an ethylenically unsaturated, epoxy functional monomer, for example glycidyl(meth)acrylate and allyl glycidyl ether, and a saturated carboxylic acid, such as a saturated monocarboxylic acid, for example isostearic acid.

Epoxy functional groups can be incorporated into the polymer prepared from polymerizable ethylenically unsaturated monomers by copolymerizing oxirane group-containing monomers, for example glycidyl(meth)acrylate and allyl glycidyl ether, with other polymerizable ethylenically unsaturated monomers, such as those discussed above. Preparation of such epoxy functional acrylic polymers is described in detail in U.S. Pat. No. 4,001,156 at columns 3 to 6.

Carbamate functional groups can be incorporated into the polymer prepared from polymerizable ethylenically unsaturated monomers by copolymerizing, for example, the above-described ethylenically unsaturated monomers with a carbamate functional vinyl monomer such as a carbamate functional alkyl ester of methacrylic acid. Carbamate functional alkyl esters can be prepared by reacting, for example, a hydroxyalkyl carbamate, such as the reaction product of ammonia and ethylene carbonate or propylene carbonate, with methacrylic anhydride. Other carbamate functional vinyl monomers include, but are not limited to, the reaction product of hydroxyethyl methacrylate, isophorone diisocyanate, and hydroxypropyl carbamate; or the reaction product of hydroxypropyl methacrylate, isophorone diisocyanate, and methanol. Still other carbamate functional vinyl monomers can be used, such as the reaction product of isocyanic acid (HNCO) with a hydroxyl functional acrylic or methacrylic monomer, such as hydroxyethyl acrylate and those described in U.S. Pat. No. 3,479,328. Carbamate functional groups can also be incorporated into the acrylic polymer by reacting a hydroxyl functional acrylic polymer with a low molecular weight alkyl carbamate such as methyl carbamate. Pendant carbamate groups can also be incorporated into the acrylic polymer by a "transcarbamoylation" reaction in which a hydroxyl functional acrylic polymer is reacted with a low molecular weight carbamate derived from an alcohol or a glycol ether. The carbamate groups exchange with the hydroxyl groups yielding the carbamate functional acrylic polymer and the original alcohol or glycol ether. Also, hydroxyl functional acrylic polymers can be reacted with isocyanic acid to provide pendent carbamate groups. Likewise, hydroxyl functional acrylic polymers can be reacted with urea to provide pendent carbamate groups.

The acrylic polymers can be prepared by solution polymerization techniques, which are well-known to those skilled in the art, in the presence of suitable catalysts such as organic peroxides or azo compounds, as described above. The polymerization can be carried out in an organic solution in which the monomers are soluble by techniques conventional in the art. Alternatively, these polymers can be prepared by aqueous emulsion or dispersion polymerization techniques, which are well known in the art. The ratio of reactants and reaction conditions are chosen to result in an acrylic polymer with the desired pendent functionality.

Polyester polymers can also be used as the film-forming polymer in the coating composition. Polyester polymers typically include the condensation products of polyhydric alcohols and polycarboxylic acids. Non-limiting examples of polyhydric alcohols include ethylene glycol, neopentyl glycol, trimethylol propane, and pentaerythritol. Non-limiting examples of polycarboxylic acids include adipic acid, 1,4-cyclohexyl dicarboxylic acid and hexahydrophthalic acid. Besides the polycarboxylic acids mentioned above, functional equivalents of the acids such as anhydrides where they exist or lower alkyl esters of the acids such as the methyl esters can be used. Also, small amounts of monocarboxylic acids such as stearic acid can be used. The ratio of reactants and reaction conditions are chosen to result in a polyester polymer with the desired pendent functionality, e.g., carboxyl or hydroxyl functionality.

Hydroxyl group-containing polyesters can be prepared by reacting an anhydride of a dicarboxylic acid such as hexahydrophthalic anhydride with a diol such as neopentyl glycol in a 1:2 molar ratio. Where it is desired to enhance air-drying, suitable drying oil fatty acids can be used and include those derived from linseed oil, soy bean oil, tall oil, dehydrated castor oil or tung oil.

Carbamate functional polyesters can be prepared by first forming a hydroxyalkyl carbamate that can be reacted with the polyacids and polyols used in forming the polyester. Alternatively, terminal carbamate functional groups can be incorporated into the polyester by reacting isocyanic acid with a hydroxy functional polyester. Also, carbamate functionality can be incorporated into the polyester by reacting a hydroxyl polyester with a urea. Additionally, carbamate groups can be incorporated into the polyester by a transcarbamoylation reaction. Preparation of carbamate functional group-containing polyesters is described in U.S. Pat. No. 5,593,733 at column 2, line 40 to column 4, line 9.

Polyurethane polymers containing terminal isocyanate or hydroxyl groups also can be used in the tie layer coating composition. The polyurethane polyols or NCO-terminated polyurethanes that can be used are those prepared by reacting polyols including polymeric polyols with polyisocyanates. Polyureas containing terminal isocyanate or primary and/or secondary amine groups that also can be used are those prepared by reacting polyamines including polymeric polyamines with polyisocyanates. The hydroxyl/isocyanate or amine/isocyanate equivalent ratio is adjusted and reaction conditions are chosen to obtain the desired terminal groups. Examples of such polyisocyanates include, but are not limited to, those described in U.S. Pat. No. 4,046,729 at column 5, line 26 to column 6, line 28. Non-limiting examples of polyols include those described in U.S. Pat. No. 4,046,729 at column 7, line 52 to column 10, line 35. Non-limiting examples of suitable polyamines include those described in U.S. Pat. No. 4,046,729 at column 6, line 61 to column 7, line 32 and in U.S. Pat. No. 3,799,854 at column 3, lines 13 to 50.

Carbamate functional groups can be introduced into the polyurethane polymers by reacting a polyisocyanate with a polyester having hydroxyl functionality and containing pendent carbamate groups. Alternatively, the polyurethane can be prepared by reacting a polyisocyanate with a polyester polyol and a hydroxyalkyl carbamate or isocyanic acid as separate reactants. Non-limiting examples of suitable polyisocyanates are aromatic isocyanates, such as 4,4'-diphenylmethane diisocyanate, 1,3-phenylene diisocyanate and toluene diisocyanate, and aliphatic polyisocyanates, such as 1,4-tetramethylene diisocyanate and 1,6-hexamethylene diisocyanate. Cycloaliphatic diisocyanates, such as 1,4-cyclohexyl diisocyanate and isophorone diisocyanate also can be used.

Non-limiting examples of useful polyether polyols include polyalkylene ether polyols such as those having the following general formulae (III) or (IV):

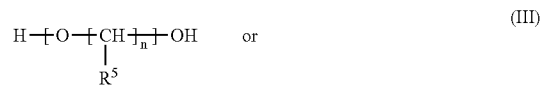

-continued

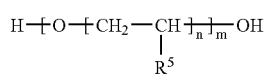

(IV)

wherein the substituent R5 is hydrogen or a lower alkyl group containing from 1 to 5 carbon atoms including mixed substituents, n has a value typically ranging from 2 to 6, and m has a value ranging from 8 to 100 or higher. Non-limiting examples of polyalkylene ether polyols include poly(oxytetramethylene)glycols, poly(oxytetraethylene)glycols, poly(oxy-1,2-propylene)glycols, and poly(oxy-1,2-butylene)glycols.

Also, polyether polyols formed from oxyalkylation of various polyols, for example, glycols such as ethylene glycol, 1,6-hexanediol, Bisphenol A, and the like, or other higher polyols such as trimethylolpropane, pentaerythritol, and the like can be used. Polyols of higher functionality that can be utilized can be made, for instance, by oxyalkylation of compounds such as sucrose or sorbitol. One commonly utilized oxyalkylation method is reaction of a polyol with an alkylene oxide, for example, propylene or ethylene oxide, in the presence of an acidic or basic catalyst. Non-limiting examples of polyethers include those sold under the tradenames TERATHANE and TERACOL, available from E. I. duPont de Nemours and Company, Inc.

Generally, when the first reactant (I) of the thermosetting composition comprises a polymer having reactive functional groups, the polymer will have a weight average molecular weight (Mw) typically ranging from 1,000 to 20,000, typically 1,500 to 15,000 and in many cases 2,000 to 12,000, as determined by gel permeation chromatography using a polystyrene standard.

Polyepoxides, such as those described below with reference to the curing agent (II) for the thermosetting composition, can also be used as the first reactant (I).

The first reactant (I) can be present in the thermosetting compositions of the present invention in an amount of at least 2 percent by weight, usually at least 5 percent by weight, and typically at least 10 percent by weight, based on the weight of total resin solids in the coating composition. Also, the first reactant (I) can be present in the thermosetting compositions of the invention in an amount of not more than 80 percent by weight, usually not more than 60 percent by weight, and typically not more than 50 percent by weight based on weight of total resin solids in the thermosetting composition. The amount of the first reactant (I) in the thermosetting compositions can range between any combination of these values inclusive of the recited values.

In addition to the first reactant (I) and the latex emulsion of crosslinked polymeric microparticles (III), the thermosetting composition further includes at least one curing agent (II) having functional groups reactive with the functional groups of the first reactant (I).

Depending on the particular reactive functional groups of the first reactant (I), the curing agent (II) can be chosen from an aminoplast resin, a polyisocyanate, a blocked isocyanate, a polyepoxide, a polyacid, an anhydride, an amine, a polyol, a carboxylic acid, an hydroxy containing compound, a methylol containing compound, a methylol ether containing compound, a beta-hydroxyalkylamide, and mixtures of any of the foregoing.

In one embodiment, the curing agent (II) includes an aminoplast resin. Aminoplast resins, which can include phenoplasts, as curing agents for hydroxyl, carboxylic acid, and carbamate functional group-containing materials are well known in the art. Aminoplasts can be obtained from the condensation reaction of formaldehyde with an amine or amide. Non-limiting examples of amines or amides include melamine, urea or benzoguanamine. Condensates with other amines or amides can be used. While the aldehyde used is most often formaldehyde, other aldehydes such as acetaldehyde, crotonaldehyde, and benzaldehyde can be used.

The aminoplast resin can contain imino and methylol groups and in certain instances at least a portion of the methylol groups are etherified with an alcohol to modify the cure response. Any monohydric alcohol can be employed for this purpose including, but not limited to, methanol, ethanol, n-butyl alcohol, isobutanol, and hexanol.

Non-limiting examples of aminoplasts include melamine-, urea-, or benzoguanamine-formaldehyde condensates, which in certain instances are monomeric and at least partially etherified with one or more alcohols containing from one to four carbon atoms. Non-limiting examples of aminoplast resins are commercially available, for example, from Cytec Industries, Inc. under the trademark CYMEL® and from Solutia, Inc. under the trademark RESIMENE®.

In another embodiment, the curing agent (II) includes an aminoplast resin which, when added to the other components that form the thermosetting composition, is generally present in an amount ranging from 2 weight percent to 65 weight percent, can be present in an amount ranging from 5 weight percent to 50 weight percent, and typically is present in an amount ranging from 5 weight percent to 40 weight percent, based on the total weight of resin solids present in the thermosetting composition.

In yet another embodiment, the curing agent (II) includes a polyisocyanate curing agent. The polyisocyanate can be an aliphatic or an aromatic polyisocyanate, or a mixture of the foregoing two. Diisocyanates can be used, although higher polyisocyanates such as isocyanurates of diisocyanates are often used. Higher polyisocyanates also can be used in combination with diisocyanates. Isocyanate prepolymers, for example, reaction products of polyisocyanates with polyols also can be used. Mixtures of polyisocyanate curing agents can be used.

If the polyisocyanate is blocked (or capped), any suitable aliphatic, cycloaliphatic, or aromatic alkyl monoalcohol known to those skilled in the art can be used as a blocking agent for the polyisocyanate. Other suitable blocking agents include oximes and lactams. When used, the polyisocyanate curing agent (II) typically is present, when added to the other components which form the thermosetting composition in an amount ranging from 5 to 65 weight percent, can be present in an amount ranging from 10 to 45 weight percent, and often is present in an amount ranging from 15 to 40 percent by weight based on the total weight of resin solids present in the thermosetting composition.

Other curing agents that can be used include, but are not limited to, blocked isocyanate compounds such as, for example, the tricarbamoyl triazine compounds described in detail in U.S. Pat. No. 5,084,541. When used, such blocked isocyante curing agent can be present, when added to the other components in the thermosetting composition, in an amount ranging up to 20 weight percent, and can be present in an amount ranging from 1 to 20 weight percent, based on the total weight of resin solids present in the thermosetting composition.

In one embodiment, the curing agent (II) includes both an aminoplast resin and a polyisocyanate.

Anhydrides as curing agents for hydroxyl functional group-containing materials also are well known in the art and can be used. Non-limiting examples of anhydrides that can be used as curing agents include those having at least two carboxylic acid anhydride groups per molecule, which are derived from a mixture of monomers comprising an ethylenically unsaturated carboxylic acid anhydride and at least one vinyl co-monomer, as for example, styrene, alpha-methyl styrene, vinyl toluene, and the like. Non-limiting examples of suitable ethylenically unsaturated carboxylic acid anhydrides include maleic anhydride, citraconic anhydride and itaconic anhydride. Alternatively, the anhydride can be an anhydride adduct of a diene polymer such as maleimized polybutadiene or a maleimized copolymer of butadiene, for example, a butadiene/styrene copolymer. These and other anhydride curing agents are described in U.S. Pat. No. 4,798,746 at column 10, lines 16–50; and in U.S. Pat. No. 4,732,790 at column 3, lines 41–57. Polyepoxides as curing agents for carboxylic acid functional group-containing materials are well known in the art. Non-limiting examples of polyepoxides comprise polyglycidyl esters (such as acrylics from glycidyl methacrylate), polyglycidyl ethers of polyhydric phenols and of aliphatic alcohols, which can be prepared by etherification of the polyhydric phenol, or aliphatic alcohol with an epihalohydrin such as epichlorohydrin in the presence of alkali. These and other suitable polyepoxides are described in U.S. Pat. No. 4,681,811 at column 5, lines 33 to 58.

Suitable curing agents for epoxy functional group-containing materials comprise polyacid curing agents, such as the acid group-containing acrylic polymers prepared from an ethylenically unsaturated monomer containing at least one carboxylic acid group and at least one ethylenically unsaturated monomer that is free from carboxylic acid groups. Such acid functional acrylic polymers can have an acid number ranging from 30 to 150. Acid functional group-containing polyesters can be used as well. The above-described polyacid curing agents are described in further detail in U.S. Pat. No. 4,681,811 at column 6, line 45 to column 9, line 54.

Also well known in the art as curing agents for isocyanate functional group-containing materials are polyols, that is, materials having two or more hydroxyl groups per molecule. Non-limiting examples of such materials include polyalkylene ether polyols, including thio ethers; polyester polyols, including polyhydroxy polyesteramides; and hydroxyl-containing polycaprolactones and hydroxy-containing acrylic copolymers. Also useful are polyether polyols formed from the oxyalkylation of various polyols, for example, glycols such as ethylene glycol, 1,6-hexanediol, Bisphenol A and the like, or higher polyols such as trimethylolpropane, pentaerythritol, and the like. Polyester polyols also can be used. These and other suitable polyol curing agents are described in U.S. Pat. No. 4,046,729 at column 7, line 52 to column 8, line 9; column 8, line 29 to column 9, line 66; and U.S. Pat. No. 3,919,315 at column 2, line 64 to column 3, line 33.

Polyamines also can be used as curing agents for isocyanate functional group-containing materials. Non-limiting examples of suitable polyamine curing agents include primary or secondary diamines or polyamines in which the radicals attached to the nitrogen atoms can be saturated or unsaturated, aliphatic, alicyclic, aromatic, aromatic-substituted-aliphatic, aliphatic-substituted-aromatic, and heterocyclic. Non-limiting examples of suitable aliphatic and alicyclic diamines include 1,2-ethylene diamine, 1,2-propylene diamine, 1,8-octane diamine, isophorone diamine, propane-2,2-cyclohexyl amine, and the like. Non-limiting examples of suitable aromatic diamines include phenylene diamines and the toluene diamines, for example, o-phenylene diamine and p-tolylene diamine. These and other suitable polyamines are described in detail in U.S. Pat. No. 4,046,729 at column 6, line 61 to column 7, line 26.

When desired, appropriate mixtures of curing agents can be used. Thermosetting compositions can be formulated as a one-component composition where a curing agent such as an aminoplast resin and/or a blocked isocyanate compound, such as those described above, is admixed with other composition components. The one component composition can be storage stable as formulated. Alternatively, the thermosetting composition can be formulated as a two-component composition where a polyisocyanate curing agent, such as those described above, can be added to a pre-formed admixture of the other composition components just prior to application. The pre-formed admixture can comprise curing agents such as aminoplast resins and/or blocked isocyanate compounds such as those described above.

In a further embodiment, the thermosetting composition comprises a first reactant (I), which includes a polymer containing hydroxyl functional groups, and a curing agent (II), which includes one or more materials chosen from polyamines, aminoplast resins and polyisocyanates. In particular, the thermosetting composition further comprises an aqueous polyurethane dispersion.

When employed, the polyurethane dispersion is present in an amount of at least 1 percent by weight, in some cases at least 2 percent by weight, in other cases at least 3 percent by weight, some instances at least 5 percent by weight, and in other instances at least 10 percent by weight, based on weight of total resin solids present in the thermosetting composition. Also, when present, the polyurethane dispersion is present in the thermosetting composition in an amount of up to 50 percent by weight, in some cases up to 40 percent by weight, in other cases up to 30 percent by weight, in some instances up to 25 percent by weight and in other instances up to 20 percent by weight based on weight of total resin solids present in the thermosetting composition. The level of polyurethane dispersion present in the thermosetting composition of the present invention can range between any combination of these values inclusive of the recited values.

When the thermosetting composition includes a polyurethane dispersion, it can be an aqueous polyurethane dispersion. In a particular embodiment, the aqueous polyurethane dispersion includes polyurethane-acrylate particles dispersed in an aqueous medium. The dispersed particles include the reaction product obtained by polymerizing the components of a pre-emulsion formed from:

(A) an active hydrogen-containing polyurethane acrylate prepolymer that includes a reaction product obtained by reacting:
  (i) a polyol;
  (ii) a polymerizable ethylenically unsaturated monomer containing at least one hydroxyl group;
  (iii) a compound comprising a C1–C30 alkyl group having at least two active hydrogen groups chosen from carboxylic acid groups and hydroxyl groups, wherein at least one active hydrogen group is a hydroxyl group; and
  (iv) a polyisocyanate;

(B) a hydrophobic polymerizable ethylenically unsaturated monomers; and (C) a crosslinking monomer.

The active hydrogen-containing polyurethane acrylate prepolymer (A) in the polyurethane-acrylate particles is present in an amount of at least 20 percent by weight, in some cases at least 25 percent by weight, in other cases at least 30 percent by weight, in some instances at least 35 percent by weight and in other instances at least 40 percent by weight of the solids of the polyurethane-acrylate particles. Further, the active hydrogen-containing polyurethane acrylate prepolymer (A) can be present in an amount of up to 80 percent by weight, in some cases up to 75 percent by weight, in other cases up to 70 percent by weight, in some instances up to 65 percent by weight, and in other instances up to 60 percent by weight, of the solids of the polyurethane-acrylate particles. The level of active hydrogen-containing polyurethane acrylate prepolymer (A) in the polyurethane-acrylate particles can be any value or range between any combination of these values inclusive of the recited values.

The hydrophobic polymerizable ethylenically unsaturated monomers (B) in the pre-emulsion are present in an amount of at least 20 percent by weight, in some cases at least 25 percent by weight, in other cases at least 30 percent by weight, in some instances at least 35 percent by weight and in other instances at least 40 percent by weight of the solids of the polyurethane-acrylate particles. Further, the hydrophobic polymerizable ethylenically unsaturated monomers (B) can be present in an amount of up to 80 percent by weight, in some cases up to 75 percent by weight, in other cases up to 70 percent by weight, in some instances up to 65 percent by weight, and in other instances up to 60 percent by weight, of the solids of the polyurethane-acrylate particles. The level of hydrophobic polymerizable ethylenically unsaturated monomers (B) in the pre-emulsion can be any value or range between any combination of these values inclusive of the recited values.

The crosslinking monomer (C) in the pre-emulsion is present in an amount of at least 1 percent by weight, in some cases at least 2 percent by weight, in other cases at least 3 percent by weight, in some instances at least 4 percent by weight, and in other instances at least 5 percent by weight, of the solids of the polyurethane-acrylate particles. Further, the crosslinking monomer (C) can be present in an amount of up to 20 percent by weight, in some cases up to 17.5 percent by weight, in other cases up to 15 percent by weight, in some instances up to 12.5 percent by weight, and in other instances up to 10 percent by weight, of the solids of the polyurethane-acrylate particles. The level of crosslinking monomer (C) in the pre-emulsion can be any value or range between any combination of these values inclusive of the recited values.

The value of (A)+(B)+(C) will typically be 100%, but will be less than 100% when other components as are known to those skilled in the art are also included in the pre-emulsion.

The polyol of A(i) can be one or more polyols chosen from polyetherpolyols, polyesterpolyols and acrylic polyols. In a particular embodiment, the polyol is one or more polyetherpolyols represented by the following general formula:

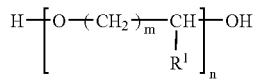

wherein R1 is H or C1–C5 alkyl, n is from 1 to 200 and m is from 1 to 5. Examples of suitable polyetherpolyols that can be used include, but are not limited to, poly(oxytetramethylene)glycols; poly(oxyethylene)glycols; poly(oxy-1,2-propylene) glycols; poly(tetrahydrofuran); the reaction products of ethylene glycol with a mixture of 1,2-propylene oxide and ethylene oxide; and the reaction products obtained by the polymerization of ethylene oxide, propylene oxide and tetrahydrofuran and mixtures of polyols.

In a further embodiment, the polymerizable ethylenically unsaturated monomer containing at least one hydroxyl group of A(ii) can be one or more monomers represented by the following formula:

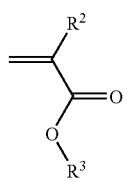

wherein R2 is H or C1–C4 alkyl, and R3 is chosen from —(CHR4)p-OH,         —CH2CH2-(O—CH2-CHR4)p-OH, —CH2-CHOH—CH2-O—CO—CR5R6R7, and —CH2-CHR4-O—CH2—CHOH—CH2-O—CO—CR5R6R7, wherein R4 is H or C1–C4 alkyl, R5, R6 and R7 are H or C1–C20 linear or branched alkyl, and p is an integer from 0 to 20. Examples of polymerizable ethylenically unsaturated monomers containing at least one hydroxyl group that can be used as component A(ii) include, but are not limited to, hydroxyethyl(meth)acrylate, hydroxypropyl(meth)acrylate, hydroxybutyl(meth)acrylate, polyethyleneglycol ester of (meth)acrylic acid, polypropyleneglycol ester of (meth)acrylic acid, the reaction product of (meth)acrylic acid and the glycidyl ester of versatic acid, the reaction product of hydroxyethyl(meth)acrylate and the glycidyl ester of versatic acid, and the reaction product of hydroxypropyl(meth)acrylate and the glycidyl ester of versatic acid. The glycidyl ester of versatic acid is available as CARDURA™ Resin E-10 from Resolution Performance Products, Houston, Tex. Mixtures of such hydroxyl group-containing monomers can be used.

Non-limiting examples of the compound of A(iii) can include dimethylol propionic acid and/or 12-hydroxy stearic acid.

The polyisocyanate A(iv) can be an aliphatic and/or an aromatic polyisocyanate. Examples of polyisocyanates that can be used as the polyisocyanate A(iv) include, but are not limited to, isophorone diisocyanate, 4,4'-diphenylmethane diisocyanate, 1,3-phenylene diisocyanate, 1,4-phenylene diisocyanate, tolylene diisocyanate, 1,4-tetramethylene diisocyanate, 1,6-hexamethylene diisocyanate, 1,4-cyclohexyl diisocyanate, alpha, alpha-xylylene diisocyanate, 4,4'-methylene-bis(cyclohexyl isocyanate), 1,2,4-benzene triisocyanate, and polymethylene polyphenyl isocyanate. Mixtures of such polyisocyanates also can be used.

The hydrophobic polymerizable ethylenically unsaturated monomer (B) can be any suitable hydrophobic polymerizable ethylenically unsaturated monomer. As used herein, the term "hydrophobic monomer" means a monomer that is substantially insoluble in water. By "substantially insoluble in water" is meant that the monomer has a solubility in distilled water of less than 6 g/100 g at 25° C. Such solubility is determined by placing 3 g of water and 0.18 g of monomer in a test tube at 25° C. and shaking the test tube. On visual examination, if two distinct layers form, the monomer is considered to be hydrophobic. If a cloudy solution forms, the turbidity of the mixture is measured using a turbidimeter or nephelometer, e.g., a Hach Model 2100AN, available from the Hach Company, Loveland, Colo. A reading of greater than 10 nephelometric turbidity units (NTU) indicates that the monomer is considered to be hydrophobic. Examples of suitable hydrophobic monomers include, but are not limited to, methyl(meth)acrylate, ethyl(meth)acrylate, propyl(meth)acrylate, N-butyl(meth)acrylate, t-butyl (meth)acrylate, 2-ethylhexyl(meth)acrylate, isobornyl (meth)acrylate, glycidyl(meth)acrylate, N-butoxy methyl (meth)acrylamide, styrene, (meth)acrylonitrile, lauryl(meth) acrylate, cyclohexyl(meth)acrylate, and 3,3,5-trimethylcyclohexyl(meth)acrylate. Mixtures of such hydrophobic monomers also can be used.

The crosslinking monomer (C) has two or more sites of polymerizable ethylenic unsaturation. Crosslinking monomers that can be used to prepare polyurethane acrylate particles of the aqueous polyurethane dispersion include, but are not limited to, ethylene glycol di(meth)acrylate, triethylene glycol di(meth)acrylate, tetraethylene glycol di(meth) acrylate, 1,3-butylene glycol di(meth)acrylate, trimethylolpropane tri(meth)acrylate, 1,4-butanediol di(meth)acrylate, neopentyl glycol di(meth)acrylate, 1,6-hexanediol di(meth) acrylate, pentaerythritol di(meth)acrylate, pentaerythritol tri (meth)acrylate, pentaerythritol tetra(meth)acrylate, glycerol di(meth)acrylate, glycerol allyloxy di(meth)acrylate, 1,1,1-tris(hydroxymethyl)ethane di(meth)acrylate, 1,1,1-tris(hydroxymethyl)ethane tri(meth)acrylate, 1,1,1-tris(hydroxymethyl)propane di(meth)acrylate, 1,1,1-tris(hydroxymethyl) propane tri(meth)acrylate, triallyl cyanurate, triallyl isocyanurate, triallyl trimellitate, diallyl phthalate, diallyl terephthalate, divinyl benzene, methylol (meth)acrylamide, triallylamine, and methylene bis(meth)acrylamide. Mixtures of such crosslinking monomers also can be used.

A statistical distribution of three types of prepolymer molecules can result from the preparation of the polyurethane acrylate prepolymer. One type of prepolymer that can be formed is a first surfactant-like prepolymer, which has a hydroxyl and/or carboxylic functional group at one end of the prepolymer and a polymerizable ethylenically unsaturated group at the opposite end of the prepolymer. Additionally, a second surfactant-like prepolymer can result, which has a hydroxyl and/or carboxylic functional group at both ends of the prepolymer. Another type of prepolymer that can result is a hydrophobic prepolymer that does not contain any carboxylic acid groups, and which has polymerizable ethylenically unsaturated groups at both ends of the prepolymer molecule. It should be understood that the reaction product (A) is considered to be a mixture of the aforementioned three types of prepolymers as well as any unreacted portions of components (i), (ii), (iii) and (iv) and any reaction by-products.

During preparation of the aqueous polyurethane dispersion, the hydrophobic polymerizable ethylenically unsaturated monomer (B) and the crosslinking monomer (C) are added to the active hydrogen-containing polyurethane acrylate prepolymer (A) and passed through a high shear fluid processor for deagglomeration and dispersion of uniform submicron particles, thereby resulting in a stable emulsion or dispersion. Suitable processors include, but are not limited to those sold under the trade name MICROFLUIDIZER®, available from the MICROFLUIDICS™ division of MFIC Corporation, Newton, Mass. The submicron particles that are formed contain the monomers (B) and (C) and the various prepolymers (A), as described above.

Polymerization is conducted using at least one free radical initiator, as defined above. The acid-functional polyurethane acrylate prepolymer (A) can include at least 30 percent, in some cases at least 35 percent, in other cases at least 40 percent, in some instances at least 45 percent and in other instances at least 50 percent, by weight of the first surfactant-like prepolymer. The acid-functional polyurethane acrylate prepolymer (A) can include up to 80 percent, in some cases up to 75 percent, in other cases up to 70 percent, in some instances up to 65 percent and in other instances up to 60 percent, by weight of the first surfactant-like prepolymer. The first surfactant-like prepolymer can be present in the acid-functional polyurethane acrylate prepolymer (A) at any value or range between the recited values inclusive of those stated above.

The acid-functional polyurethane acrylate prepolymer (A) can include at least 1 percent, in some cases at least 5 percent, in other cases at least 10 percent, in some instances at least 15 percent and in other instances at least 20 percent, by weight of the second surfactant-like prepolymer. The acid-functional polyurethane acrylate prepolymer (A) can include up to 40 percent, in some cases up to 37 percent, in other cases up to 35 percent, in some instances up to 33 percent and in other instances up to 30 percent, by weight of the second surfactant-like prepolymer. The second surfactant-like prepolymer can be present in the acid-functional polyurethane acrylate prepolymer (A) at any value or range between any of the recited values inclusive of those stated above.

The acid-functional polyurethane acrylate prepolymer (A) can include at least 10 percent, in some cases at least 12.5 percent, in other cases at least 15 percent, in some instances at least 17.5 percent and in other instances at least 20 percent, by weight of the hydrophobic prepolymer as described above. The acid-functional polyurethane acrylate prepolymer (A) can include up to 50 percent, in some cases up to 45 percent, in other cases up to 40 percent, in some instances up to 37.5 percent and in other instances up to 35 percent, by weight of the hydrophobic prepolymer. The hydrophobic prepolymer can be present in the acid-functional polyurethane acrylate prepolymer (A) at any value or range between any of the values, inclusive of those stated above.

The molecular weight of the active hydrogen-containing polyurethane acrylate prepolymer can be measured by gel permeation chromatography (GPC) using polystyrene standards. However, because of the structural and chemical differences between the active hydrogen-containing polyurethane acrylate prepolymer and the polystyrene standard used to calibrate the GPC instrument, the values for the molecular weight of the active hydrogen-containing polyurethane acrylate prepolymer is an estimate, and it should be understood that the actual values can be smaller. When the GPC methods described above are used to determine the weight average molecular weight of the active hydrogen-containing polyurethane acrylate prepolymer, the molecular weight is at least 2,000, in some cases at least 2,100, in other cases at least 2,200, in some instances at least 2,250 and in other instances at least 2,500. The molecular weight, as measured by GPC of the active hydrogen-containing polyurethane acrylate prepolymer can be up to 10,000, in some cases up to 9,000, in other cases up to 7,500, in some instances up to 6,000 and in other instances up to 5,000. The molecular weight of the active hydrogen-containing polyurethane acrylate prepolymer can be any value or range between any of the recited values, inclusive of those stated above.

The average particle size of the polyurethane-acrylate particles of the aqueous polyurethane dispersion can be at least 50 nanometers, in some cases at least 60 nanometers, in other cases at least 75 nanometers, in some instances at least 100 nanometers and in other instances at least 150 nanometers. The average particle size of the polyurethane-acrylate particles of the present aqueous polyurethane dispersion can be up to one micron, in some cases up to 500 nanometers, in other cases up to 400 nanometers, in some instances up to 300 nanometers and in other instances up to 250 nanometers. The particle size of the polyurethane-acrylate particles can be any value or range between any of the recited values inclusive of those stated above.

In a further embodiment of the present invention, the thermally cured tie layer can be a polysiloxane that is transparent, harder than the photochromic polymeric coating on which it is superposed, e.g., appended to, and compatible with abrasion resistant organo silane-containing coatings. Typically, the abrasion resistant coating is harder than the polysiloxane tie layer. In a particular embodiment, the polysiloxane coating is prepared from a composition comprising:

(a) from 5 to 75 weight percent, based on the total weight of the coating composition, of a silane monomer mixture of:
  (i) a first silane monomer chosen from:
   (1) glycidoxy(C1–C3)alkyl(R2)aSi(OR3)b, wherein each R2 is a monovalent hydrocarbon radical having less than 20 carbon atoms, which is chosen from aliphatic radicals, aromatic radicals or mixtures of such hydrocarbon radicals; each R3 is a monovalent organic radical of less than 20 carbon atoms, which is chosen from aliphatic hydrocarbon radicals, aromatic hydrocarbon radicals, alkoxyalkyl radicals, acyl radicals or mixtures of such radicals; a is an integer of from 0 to 2 and b is the integer 2 or 3, provided that b is 3 only when a is 0 or 1;
   (2) an organofunctional silane represented by the formula: (R1)c (R2)d Si(OR3)e, wherein each R1 is an organofunctional radical chosen from vinyl, allyl, vinyl-functional hydrocarbon radical, allyl-functional hydrocarbon radical, (meth)acryloyl-functional hydrocarbon radical, styryl-functional hydrocarbon radical, mercapto-functional hydrocarbon radical or mixtures of such organofunctional radicals, said hydrocarbon radicals being chosen from aliphatic radicals, aromatic radicals and mixtures of such hydrocarbon radicals and having less than 20 carbon atoms; each R2 and each R3 is the same as in (a)(i)(1); the letter c is 1 or 2, d is 0, 1 or 2 and e is 1, 2 or 3, provided that the sum of c+d+e equals 4; or
   (3) mixtures of said silane monomers; and
  (ii) a second silane monomer having the general formula (X)f(R2)g(R2)h(OR3)iSi4-(g+h+i), wherein X is chosen from amino or chloro; each R2 is the same as in (a)(i)(1); f and g are each the integers 0 or 1, h is the integer 1 or 2, and i is the integer 2 or 3, the weight ratio of (i):(ii) being from 100:1 to 1:1;
(b) a catalytic amount of water-soluble acid; and
(c) water in an amount sufficient to form hydrolysates of said silane monomers and to solubilize said acid.

The composition used to prepare the polysiloxane coating can further comprise a tetra(C1–C4)alkoxysilane in an amount ranging from 0 to 25 weight percent, based on the total weight of the coating composition; from 1 to 10 weight percent, based on the total weight of the coating composition, of a silane monomer-compatible water-soluble organic polymer; a leveling amount of nonionic surfactant; from 10 to 50 weight percent, based on the total weight of the coating composition, of a polyepoxy compound chosen from diglycidyl ethers of bifunctional alcohols, diglycidyl ethers of trifunctional alcohols, diglycidyl ethers of bifunctional phenols, diglycidyl esters of dicarboxylic acids or mixtures of such polyepoxy compounds; and colloidal dispersions of metal oxide nanoparticles.

The composition used to prepare the polysiloxane coating can further comprise from 0 to 25 weight percent of at least one material represented by the general formula:

M(T)q wherein M is a metal chosen from aluminum, antimony, tantalum, titanium or zirconium; T is a C 1–C10 alkoxy and q is an integer equivalent to the valence of M. Typically, M is chosen from aluminum, titanium or zirconium and T is C1–C5 alkoxy, e.g., propoxy.

Non-limiting examples of the first silane monomer (a)(i)(1) include: glycidoxymethyltriethoxysilane, alpha-glycidoxyethyltrimethoxysilane, alpha-glycidoxyethyl-triethoxysilane, beta-glycidoxyethyltrimethoxysilane, beta-glycidoxyethyltriethoxysilane, alpha-glycidoxypropyltrimethoxysilane, alpha-glycidoxypropyltriethoxysilane, beta-glycidoxypropyltrimethoxysilane, beta-glycidoxypropyltriethoxysilane, gamma-glycidoxypropyltrimethoxysilane, gamma-glycidoxypropylmethyldimethoxysilane, gamma-glycidoxypropyldimethylethoxysilane, hydrolysates thereof and mixtures of such silane monomers and/or hydrolysates thereof.

Non-limiting examples of the organofunctional silane monomer (a)(i)(2) include: vinyltriacetoxysilane vinyltrimethoxysilane, vinyltri(2-methoxyethoxy)silane, vinyltriphenoxysilane, vinyltriisopropoxysilane, vinyltri-t-butoxysilane, divinyldiethoxysilane, allytriethoxysilane, allytrimethoxysilane, (3-acryloxypropyl)dimethylmethoxysilane, (3-acryloxypropyl)methyldimethoxysilane, (3-acryloxypropyl)trimethoxysilane, (methacryloxymethyl)dimethylethoxysilane, methacryloxymethyltriethoxysilane, methacryloxymethyltrimethoxysilane, methacryloxypropyldimethylethoxysilane, methacryloxypropyltrimethoxysilane, styrlethyltrimethoxysilane, mercaptomethylmethyldiethoxysilane, 3-mercaptopropylmethyldimethoxysilane, 3-mercaptopropyl-triethoxysilane, 3-mercaptopropyltrimethoxysilane, hydrolysates thereof and mixtures of such silane monomers and/or hydrolysates thereof.

The weight ratio in the mixtures of the first silane monomers (a)(i)(1) and (a)(i)(2) can vary from 1:100 to 100:1, and any range between these values.

Non-limiting examples of the second silane monomer include methyltrimethoxysilane, methyltriethoxysilane, methyltri-acetoxysilane, methyltripropoxysilane, methyltributoxysilane, ethyltrimethoxysilane, ethyltriethoxysilane, γ-aminopropyltri-methoxysilane, γ-aminopropyltriethoxysilane, chloromethyltrimethoxysilane, chloromethytriethoxysilane, dimethyldiethoxysilane, γ-chloropropylmethyldimethoxysilane, γ-chloropropyl-methyldiethoxysilane, hydrolysates thereof and mixtures of such silane monomers and/or hydrolysates thereof.

The weight ratio in mixtures of the first silane monomers and the second silane monomers can vary from 100:1 to 1:1, and any range between these values.

The coating composition typically also contains a catalytic amount of a water-soluble acid. A catalytic amount is that amount that is sufficient to result in polycondensation of the silane monomers. When water-soluble polymer is present, the catalytic amount of water-soluble acid results in the subsequent crosslinking of the silane monomers with the water-soluble polymer. Typically, in one non-limiting embodiment, the catalytic amount of acid ranges from 0.01 to 10.0 weight percent of the coating composition. The water-soluble acid can be an organic carboxylic acid or inorganic acid chosen from acetic, formic, glutaric, maleic, nitric, hydrochloric, phosphoric, hydrofluoric, or sulfuric acid. In an alternate non-limiting embodiment, the catalytic amount of water-soluble acid can be provided by an acidic sol of particulate metal oxides. Non-limiting examples include acidic sols of zirconia, alumina, titania, silica, antimony oxide or mixtures thereof.

Water is also present in the coating composition in an amount sufficient to form hydrolysates of the silane monomers and to solubilize the water-soluble polymer component and the catalytic amount of water-soluble acid. Of course, the sum total of all of the components of the coating composition equals 100 weight percent.

Non-limiting examples of tetra(C1–C4)alkoxysilanes, when present in the coating composition, include tetramethoxysilane, tetraethoxysilane, tetra-n-propoxysilane, tetra-n-butoxysilane, hydrolysates thereof and mixtures of such silane monomers and/or hydrolysates thereof.

Water-soluble organic polymers can be present in the coating composition in amounts sufficient to bind and form the coating or film resulting from polycondensation of the various silane components of the coating composition, e.g., binding amounts. Non-limiting examples of suitable water-soluble organic polymers are those polymers that have a solubility in water of at least 1 to 10 weight percent at 25° C. In another non-limiting embodiment, the water-soluble polymers are chemically compatible with the silane monomers in the coating composition, e.g., capable of forming siloxane organic hybrid polymers, are optically clear and mechanically strong, e.g., provide sufficient mechanical strength and integrity to the coating.

Non-limiting examples of water-soluble polymers include natural gums such as guar gums, locust bean gums, and xanthan gums; hydroxyalkylcelluloses such as hydroxyethylcellulose and hydroxypropylcellulose, the synthesis and structure of which are described in U.S. Pat. Nos. 3,278,521 and 4,661,589; cellulosic polymers, such as carboxymethyl cellulose, methyl cellulose, and ethylmethyl cellulose; polyvinyls such as, polyvinyl maleic anhydride copolymers, polyvinyl alcohols, copolymers of polyvinyl alcohol and polyvinyl amine having up to 30 weight percent of polyvinyl amine, polyvinylamines, and polyvinyl pyrrolidones; polyacrylates and related systems such as polyacrylic acids, polymethacrylic acids, polyacrylamides, polycarboxylates, and polyvinyl ethyl ether; polyimines and related systems such as polyethylenimine, polyethylene oxides, polyethylene glycols and mixtures of such water-soluble polymers.

The polyepoxy compound used in the siloxane coating composition is a compound having two or more epoxy groups. Non-limiting examples of such compounds include a polyglycidyl ether or a polyglycidyl ester group. The polyglycidyl ether compound can be prepared by the reaction of epichlorohydrin with a polyfunctional phenol such as Bisphenol A or a polyfunctional aliphatic or alicyclic alcohol having 15 carbon atoms or less to produce diglycidyl ethers of bifunctional phenols, diglycidyl ethers of bifunctional alcohols, diglycidyl ethers of trifunctional alcohols, triglycidyl ethers of trifunctional alcohols, etc. Non-limiting examples of such polyfunctional aliphatic and alicyclic alcohols include polyethylene glycol, polypropylene glycol, neopentylglycol, glycerol, diglycerol, erythritol, pentaerythritol, dipentaerythritol, trimethylolethane, trimethylolpropane, sorbitol, mannitol, butanediol, hexanediol, 1,4-dihydroxymethylcyclohexane and 2,2-di(4-hydroxy cyclohexyl) propane.

The polyglycidyl ester compound can be prepared by the reaction of epichlorohydrin with polyfunctional aliphatic or alicyclic carboxylic acids having 8 carbons or less to produce diglycidyl esters of dicarboxylic acids. Non-limiting examples of such carboxylic acids include succinic acid, glutaric acid, adipic acid, tetrahydrophthalic acid, hexahydrophthalic acid and hexahydroterephthalic acid.

In one embodiment, the polyepoxy compound used in the tie layer coating composition can be a single polyglycidyl ether compound, a mixture of polyglycidyl ether compounds, a single polyglycidyl ester compound, a mixture of polyglycidyl ester compounds or a mixture of polyglycidyl ether and polyglycidyl ester compounds. Non-limiting examples of the polyepoxy compound are chosen from diglycidyl ethers of polyethylene glycol, polypropylene glycol, neopentylglycol, glycerol, trimethylolpropane, Bisphenol A or mixtures of diglycidyl ethers of such compounds. Such materials can be synthesized by the reaction of epichlorohydrin with the polyfunctional alcohols or phenols, as described in U.S. Pat. No. 4,211,323.

A leveling amount of nonionic surfactant(s) can be present as a component in the coating composition of the present invention. A leveling amount is that amount that is sufficient to allow the coating to spread evenly on the surface to which it is applied, and provide uniform contact of the coating to that surface. The nonionic surfactant is typically a liquid at the conditions of use and is used in amounts from about 0.05 to about 1.0 weight percent based on the amount of the silane monomer mixture. Non-limiting examples of suitable nonionic surfactants are described in the Kirk Othmer Encyclopedia of Chemical Technology, 3rd Edition, Volume 22, pages 360 to 377.

Non-limiting examples of commercially available nonionic surfactants include ethoxylated alkyl phenols, such as the IGEPAL® DM surfactants, or octyl-phenoxypolyethoxyethanol (available as TRITON® X-100), an acetylenic diol such as 2,4,7,9-tetramethyl-5-decyne-4,7-diol (available as SURFYNOL® 104), ethoxylated acetylenic diols, such as the SURFYNOL® 400 surfactant series, fluoro-surfactants, such as the FLUORAD® fluorochemical surfactant series, and capped nonionics such as the benzyl capped octyl phenol ethoxylates (available as TRITON® CF87), the propylene oxide capped alkyl ethoxylates, which are available as the PLURAFAC® RA series of surfactants, and octylphenoxyhexadecylethoxy benzyl ether.

A solvating amount of lower aliphatic alcohol solvent can also be present as a component in the coating composition. A solvating amount is that amount which is sufficient to solubilize the silane monomers in the coating composition. In one embodiment, the solvating amount can represent up to about 40 weight percent of the coating composition. Non-limiting examples of solvents include methanol, ethanol, 2-ethoxyethanol, 2-(2-methoxyethoxy)ethanol, 2-methoxyethanol, 2-(2-ethoxymethoxy)ethanol, 1-propanol, 2-propanol, 1-methoxy-2-propanol and mixtures such alcohols.

The addition of colloidal dispersions of metal oxide nanoparticles can also be used in the polysiloxane tie layer coating composition. Non-limiting examples include oxides of zirconium, aluminum, titanium, silicon, antimony, etc. These can be used at a level of from 0 to 25 weight percent, based on the total weight of the coating composition.

When the catalytic amount of water-soluble acid is provided by an acidic sol of a metal oxide, the amount used is that amount that is to catalyze or enhance the curing of the coating composition. In a particular embodiment, the acidid sol is an alumina sol. Typically, an acidic alumina sol is characterized by having an acidic pH, e.g., a pH less than 7.0, usually less than 6.0 and more usually, less than 5.0. The sol comprises alumina particles, e.g., spherical and/or non-spherical particles of alumina, which can be alumina and/or particles coated with alumina, e.g., alumina coated silica, that have a positive surface charge and an average particle size, e.g., diameter, of not more than 200 nanometers. As used herein, the term "alumina sol" means a colloidal dispersion of finely divided solid inorganic alumina particles in an aqueous-containing liquid, e.g., water. Such alumina sols can be prepared by hydrolyzing a metal salt precursor, e.g., an aluminum halide such as aluminum chloride, for a time sufficient to form the desired particle size. A process for preparing alumina sols and alumina coated silica sols is disclosed in U.S. Pat. No. 3,864,142. Alternatively, pre-formed alumina particles can be used with other components that when combined produce the aforedescribed alumina sol.

Examples of commercially available alumina sols that can be used include, but are not limited to, NALCO® colloidal sols (available from NALCO Chemical Co.), e.g., NALCO® 1056 alumina-coated silica sol and NALCO® 8676 colloidal alumina, REMASOL® colloidal sols (available from Remet Corp.), and LUDOX® colloidal sols (available from E. I. du Pont de Nemours Co., Inc.).

As disclosed in copending U.S. patent application Ser. No. 10/793,241 filed on even date hereof by W. Blackburn et al and titled "Photochromic Optical Article", it is contemplated that an adhesion-enhancing amount of at least one adhesion promoting material (adhesion promoter) can be incorporated into the composition comprising the thermally curable tie layer. By adhesion-enhancing amount is meant that the compatibility of the thermally cured tie layer to a superimposed organo silane-containing abrasion-resistant coating (as described herein) applied to the thermally cured tie layer is enhanced. Typically, from 0.1 to 20 weight percent of at least one adhesion promoter(s) is incorporated into the thermally curable coating composition prior to applying it onto the photochromic coating. More particularly, from 0.5 to 16, e.g., 0.5 to 10, weight percent, more particularly 0.5 to 8, e.g., 5, weight percent, of at least one adhesion promoter is incorporated into the thermally curable coating composition. The amount of adhesion promoter incorporated into the thermally curable coating composition can range between any combination of the aforesaid values, inclusive of the recited values.

Among the adhesion promoter materials that can be incorporated into the thermally curable coating composition to enhance its compatibility with an abrasion-resistant coating, e.g., an abrasion-resistant coating comprising organo-silane material, include, but are not limited to, adhesion promoting organo-silane materials, such as aminoorganosilanes, and silane coupling agents, organic titanate coupling agents and organic zirconate coupling agents.

Aminoorganosilanes that can be used are primary, secondary and tertiary aminoorganosilanes, particularly aminoorganosilanes represented by the following general formula:

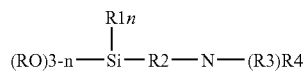

wherein n is an integer of from 0 to 2, usually 0 or 1; each R is independently chosen from C1–C8 alkyl, usually C1–C4 alkyl, such as methyl, ethyl, propyl and butyl, a C1–C4 alkoxy C1–C8 alkyl, typically C1–C3 alkoxy C1–C3 alkyl, such as methoxymethyl, methoxyethyl, ethoxymethyl, etc., or C6–C10 aryl, e.g., C6–C8 aryl; R1 is hydrogen, a C1–C8 alkyl, usually C1–C3 alkyl, or C6–C10 aryl, e.g., C6–C8 aryl; R2 is a divalent C1–C10 alkylene, C2–C10 alkenylene or phenylene, usually a C2–C5 alkylene, such as ethylene, trimethylene, etc., or C2–C5 alkenylene, such as vinylene, 1-propenylene, butenylene, 2-pentenylene, etc.; each R3 and R4 are independently chosen from hydrogen, C1–C8 alkyl, usually C1–C3 alkyl, C1–C8 hydroxyalkyl, usually C2–C3 hydroxyalkyl, C1–C8 aminoalkyl, usually C2–C3 aminoalkyl, C4–C7 cycloalkyl, e.g., C5–C6 cycloalkyl, C6–C10 aryl, e.g., C6–C8 aryl, (meth)acryloxy C1–C4 alkyl (the alkyl group being optionally substituted with a functional group such as hydroxy), e.g., (meth)acrylyloxy-2-hydroxypropyl, or R3 and R4 combine to form a cycloalkyl group of from 4 to 7 carbon atoms, e.g., 5 to 6 carbon atoms, or a C4–C7 heterocyclic group wherein the hetero atom(s) are oxygen and/or nitrogen, e.g., morpholino and piperazino, or are a group represented by the general formula:

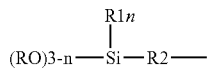

wherein R, R1, R2 and n are as previously defined with respect to the formula representing the aminoorganosilanes. Also included in such definitions are the partial and total hydrolysates of compounds represented by those formulae.

Non-limiting examples of aminoorganosilanes include: aminopropyl trimethoxysilane, aminopropyl triethoxysilane, aminoethyl trimethoxysilane, aminoethyl triethoxysilane, methylaminopropyl trimethoxysilane, aminobutylmethyl dimethoxysilane, aminopropyldimethyl methoxysilane, aminopropylmethyl dimethoxysilane, aminopropyldimethyl ethoxysilane, aminobutylmethyl dimethoxysilane, bis-(gamma-trimethoxysilylpropyl)amine, N-(3-methacryloxy-2-hydroxypropyl)-3-aminopropyl triethoxysilane, N-(3acryloxy-2-hydroxypropyl)-3-aminopropyl triethoxysilane, (N,N-dimethylaminopropyl)trimethoxysilane, (N,N-diethyl-3-aminopropyl)trimethoxysilane, diethylaminomethyl triethoxysilane, bis(2-hydroxyethyl)-3-aminopropyl triethoxysilane, γ-aminopropyl trimethoxysilane, N-(2'-aminoethyl)-3-aminopropyl trimethoxysilane, N-(2'-aminoethyl)-3-aminopropyl triethoxysilane, N-butyl-3-aminopropyl triethoxysilane, N-octyl-3-aminopropyl trimethoxysilane, N-cyclohexyl-3-aminopropyl triethoxysilane, N-(3'-triethoxysilylpropyl)-piperazine, bis-(3-triethoxysilylpropyl)amine, tris-(3-trimethoxysilylpropyl)amine, N,N-dimethyl-3-aminopropyl triethoxysilane, N-methyl-N-butyl-3-aminopropyl triethoxysilane, N-(3'-aminopropyl)-3-aminopropyl triethoxysilane, N-(3'-triethoxysilylpropyl) morpholine, N-phenyl-gamma-aminopropyl trimethoxysilane, and N-phenyl-gamma-amino-2-methylpropyl trimethoxysilane.

Silane coupling agents can be represented by the following general formula:

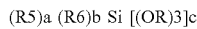

wherein each R5 is an organofunctional group independently chosen from epoxy, glycidoxy, amino, vinyl, styryl, (meth)acryloxy, mercapto, haloalkyl, e.g., chloroalkyl, ureido, or a hydrocarbon radical having not more than 10 carbon atoms substituted with said organofunctional group;

each R6 is a hydrocarbon radical of not more than 20 carbon atoms, that is independently chosen from aliphatic radicals, aromatic radicals or mixtures of such hydrocarbon radicals, e.g., C1–C20 alkyl, more particularly, C1–C10 alkyl, e.g., C1–C6 alkyl, or phenyl; each R is independently chosen from C1–C8 alkyl, usually C1–C4 alkyl, such as methyl, ethyl, propyl and butyl, a C1–C4 alkoxy C1–C8 alkyl, typically C1–C3 alkoxy C1–C3 alkyl, such as methoxymethyl, methoxyethyl, ethoxymethyl, etc., C6–C10 aryl, e.g., C6–C8 aryl or acetyl; a is the integer 1 or 2, usually 1, b is the integer 0, 1 or 2, e.g., 0, and c is the integer 1, 2, or 3, e.g., 2 or 3, provided that the sum of a +b+c equals 4.

Non-limiting examples of silane coupling agents include: vinyl triacetoxysilane, vinyl trimethoxysilane, vinyl tri(2-methoxyethoxy)silane, vinyl triphenoxysilane, vinyl triisopropoxysilane, vinyl tri-t-butoxysilane, divinyl diethoxysilane, gamma glycidoxypropyl trimethoxysilane, beta-(3,4-epoxycyclohexyl)ethyl trimethoxysilane, allyl triethoxysilane, allyl trimethoxysilane, (3-acryloxypropyl) dimethylmethoxysilane, (3-acryloxypropyl)methyldimethoxysilane, (3-acryloxypropyl)trimethoxysilane, (3-methacryloxypropyl)trimethoxysilane, (methacryloxymethyl)dimethyl ethoxysilane, methacryloxymethyl triethoxysilane, methacryloxymethyl trimethoxysilane, methacryloxypropyl dimethyl ethoxysilane, methacryloxypropyl trimethoxysilane, styrylethyl trimethoxysilane, mercaptomethyl methyldiethoxysilane, 3-mercaptopropyl methyldimethoxysilane, 3-mercaptopropyl triethoxysilane, 3-mercaptopropyl trimethoxysilane, 3,4-epoxy cyclohexylethyl trimethoxysilane, dimethyl diethoxysilane, chloropropyl triethoxysilane, 3-(trimethoxysilyl)propyl methacrylate, ureidopropyl triethoxysilane, mixtures of such silane materials, and at least partial hydrolysates of such silanes.

Non-limiting examples of organic titanate coupling agents include: tetra (2,2-diallyloxymethyl)butyl titanate, di(ditridecyl)phosphito titanate (commercially available as KR 55 from Kenrich Petrochemicals, Inc.); neopentyl(diallyl)oxy trineodecanoyl titanate; neopentyl(diallyl)oxy tri (dodecyl)benzene-sulfonyl titanate; neopentyl(diallyl)oxy tri(dioctyl)phosphato titanate; neopentyl(diallyl)oxy tri(dioctyl) pyro-phosphato titanate; neopentyl(diallyl)oxy tri(N-ethylenediamino)ethyl titanate; neopentyl(diallyl)oxy tri(m-amino)phenyl titanate; neopentyl(diallyl)oxy trihydroxy caproyl titanate; isopropyl dimethyacrylisostearoyl titanate; tetraisopropyl(dioctyl) phosphito titanate; mixtures of such titanates, and at least partial hydrolysates thereof.

Non-limiting examples of organic zirconate coupling agents include: tetra(2,2-diallyloxymethyl)butyl di(ditridecyl)phosphito zirconate (commercially available as KZ 55 from Kenrich Petrochemicals); neopentyl(diallyloxy)trineodecanoyl zirconate; neopentyl(diallyl)oxy tri(dodecyl)benzene sulfonyl zirconate; neopentyl(diallyloxy)tri(dioctyl) phosphato zirconate; neopentyl(diallyloxy) tri(dioctyl)pyrophosphato zirconate; neopentyl(diallyloxy)tri(N-ethylenediamino)ethyl zirconate; neopentyl(diallyloxy), tri (m-amino)phenyl zirconate; neopentyl(diallyloxy) trimethacryl zirconate; neopentyl(diallyloxy)triacryl zirconate; dineopentyl(diallyloxy) di(p-amino)benzoyl zirconate; dineopentyl(allyl)oxy di(3-mercapto)propionic zirconate; mixtures of such zirconates, and at least partial hydrolysates thereof.

As used in this description and claims, the term "at least partial hydrolysates" is intended to mean and include compounds that are hydrolyzed partially or hydrolyzed completely.

The thermally cured tie layer coating composition can include other additives known to those skilled in the art. These additives can include, but are not limited to, flow and leveling additives, wetting agents, antifoaming agents, UV absorbers, rheology modifiers, surfactants, e.g., fluorosurfactants, stabilizers and antioxidants. Care should be observed, however, in the case of UV absorbers that sufficient UV radiation of the appropriate wavelength is permitted to pass through the thermally cured tie layer to activate the photochromic materials(s) within the photochromic polymeric coating. Such materials are well known to those skilled in the art, and examples of some commercial surfactants and antioxidants/stabilizers can be found in column 10, lines 43–54 of the aforementioned '375 patent. Other non-limiting examples of such additives include silicones, modified silicones, silicone acrylates, hydrocarbons, and other fluorine-containing compounds.

Prior to applying the thermally curable coating composition to the photochromic coating, it is common, but not required, to treat the surface of the photochromic coating to enhance adhesion of the thermally cured tie layer to the photochromic coating. Effective treatments include activated gas treatment, such as treatment with a low temperature plasma or corona discharge. A particularly desirable surface treatment is a low temperature plasma treatment. This method allows treatment of the surface to enhance adhesion of a superimposed film or coating, and is a clean and efficient way to alter the physical surface, e.g., by roughening and/or chemically altering the surface without affecting the rest of the article. Inert gases, such as argon, and reactive gases, such as oxygen, have been used as the plasma gas. Inert gases will roughen the surface, while reactive gases such as oxygen will both roughen and chemically alter slightly the surface exposed to the plasma, e.g., by producing hydroxyl or carboxyl units on the surface. Oxygen is used as the plasma gas in one contemplated embodiment because it is considered that it provides a slight, but effective, physical roughening of the surface along with a slight, but effective, chemical modification of the surface. Naturally, the extent of the surface roughening and/or chemical modification will be a function of the plasma gas and the operating conditions of the plasma unit (including the length of time of the treatment).

It is reported that a conventional plasma treatment alters the top 20 to 200 angstroms of the surface (a few molecular layers.) The operating conditions of the plasma unit are a function of the design and size, e.g., volume, of the plasma chamber, power and construction of the plasma unit. The frequency at which the plasma operates can vary, e.g., from a low frequency such as 40 kHz to microwave frequencies such as 2.45 GHz. Similarly, the power at which the plasma unit operates can vary, e.g., from 50 to 1000 Watts, e.g., 50 to 750, such as 50 to 150 Watts. The pressure at which the plasma unit operates can also vary; however, it has been observed that low pressures are generally less destructive physically of the treated surface, which is desired. Low pressures, e.g., from 20 to 65 or 70 Pa are believed to be useful. The time that the surface is exposed to the plasma can also vary and will be a function of the type of surface being treated, e.g., the type of polymer used for the photochromic polymeric coating. However, care should be taken that the surface is not treated for too long since lengthy periods of treatment can be counterproductive. One skilled in the art can readily determine the minimum time required to provide a plasma treated surface that enhances adhesion of the tie layer coating composition to the photochromic coating. For ophthalmic articles, such as lenses, the length of the plasma treatment will generally vary from 1 to 10 minutes, e.g., 1 to 5 minutes. One contemplated plasma treatment involves use of an oxygen plasma generated by a Plasmatech machine operating at a power level of 100 Watts for from 1 to 10, e.g., 1 to 5 minutes, while introducing 100 ml/minute of oxygen into the vacuum chamber of the Plasmatech machine.

The surface of the coating or article subjected to plasma treatment will typically be at room temperature; however, if desired the surface can be preheated slightly. It should be noted that plasma treatment will tend to increase the temperature of the surface (and article) treated. Consequently, the temperature of the surface during treatment will be a direct function of the length of the plasma treatment. The temperature of the surface to be subjected to a plasma treatment should be maintained at temperatures below that at which the surface is not significantly adversely affected (other than the intended increase in surface area by roughening and slight chemical modification.) One skilled in the art can readily select the operating conditions of the plasma unit, vis-à-vis, the substrate treated, to achieve an improvement in the adhesion of a superimposed film/coating on the plasma treated surface. Examination of the treated surface can be performed by atomic force microscopy to determine the relative extent of the physical change in the surface. Generally, a low temperature, microwave frequency, oxygen plasma can be used for treatment of a photochromic coating to which a radiation-cured dendritic polyester acrylate film is applied.

The thermally curable coating composition is applied in a manner to obtain a substantially homogeneous cured coating/film, the thickness of which can vary. In one contemplated embodiment, the thickness is less than 200 microns, usually less than 100 microns, e.g., not more than 50 microns. In another contemplated embodiment, the coating/film can range in thickness from 2 to 20 or 50 microns, e.g., 2 to 15 microns, more typically from 8 to 12 microns. The coating/film thickness can range between any combinations of these values, inclusive of the recited values. The term "film" is generally considered by those skilled in the coating art to be a layer with a thickness of not more than 20 mils (500 microns); however, as used in this disclosure and claims, the term film when used in relation to the thermally cured tie layer is defined as having a thickness, as herein described.

Rigid substrates to which the photochromic polymeric coating are applied can vary and include any rigid substrate that will support a photochromic polymeric coating. Non-limiting examples of such rigid substrates include: paper, glass, ceramics, wood masonry, textiles, metals and organic polymeric materials. The particular substrate used will depend on the particular application that requires both a rigid substrate and a photochromic coating, which photochromic coating further requires the protection of a tie layer adjacent to the photochromic coating. In a desired embodiment, the rigid substrate is transparent.

Polymeric substrates that can be used in preparing the photochromic articles of the present invention include organic polymeric materials and inorganic materials, such as glass. As used herein, the term "glass" is defined as being a polymeric substance, e.g., a polymeric silicate. Glass substrates can be of any type suitable for the intended purpose; but, are desirably a clear, low colored, transparent glass such as the well-known silica type of glass, particularly soda-lime-silica glass. The nature and composition of various silica glasses is well known in the art. The glass can be strengthened by either thermal or chemical tempering. Polymeric organic substrates that can be used to prepare the photochromic articles described herein, are any of the currently known (or later discovered) plastic materials that are chemically compatible with the photochromic polymeric coating applied to the surface of the substrate. Particularly contemplated are the art-recognized synthetic resins that are useful as optical substrates, e.g., organic optical resins that are used to prepare optically clear castings for optical applications, such as ophthalmic lenses.

Non-limiting examples of organic substrates that can be used as polymeric organic substrates are polymers, e.g., homopolymers and copolymers, prepared from monomers and mixtures of monomers disclosed in U.S. Pat. Nos. 5,962,617 and 5,932,681, and in U.S. Pat. No. 5,658,501 from column 15, line 28 to column 16, line 17. Such organic substrates can be thermoplastic or thermoset polymeric substrates, e.g., transparent, more particularly optically clear, substrates having a refractive index that desirably ranges from 1.48 to 1.74, e.g., 1.50 to 1.67.

Non-limiting examples of such disclosed monomers and polymers include: polyol(allyl carbonate) monomers, e.g., allyl diglycol carbonates such as diethylene glycol bis(allyl carbonate), which monomer is sold under the trademark CR-39 by PPG Industries, Inc; polyurea-polyurethane (polyurea urethane) polymers, which are prepared, for example, by the reaction of a polyurethane prepolymer and a diamine curing agent, a composition for one such polymer being sold under the trademark TRIVEX by PPG Industries, Inc; polyol (meth)acryloyl terminated carbonate monomers; diethylene glycol dimethacrylate monomer; ethoxylated phenol methacrylate monomers; diisopropenyl benzene monomer; ethoxylated trimethylol propane triacrylate monomers; ethylene glycol bismethacrylate monomer; poly(ethylene glycol) bismethacrylate monomers; urethane acrylate monomers; poly(ethoxylated bisphenol A dimethacrylate) monomers; poly(vinyl acetate); poly(vinyl alcohol); poly (vinyl chloride); poly(vinylidene chloride); polyethylene; polypropylene; polyurethanes; polythiourethanes; thermoplastic polycarbonates, such as the carbonate-linked resin derived from Bisphenol A and phosgene, one such material being sold under the trademark LEXAN; polyesters, such as the material sold under the trademark MYLAR; poly(ethylene terephthalate); polyvinyl butyral; poly(methyl methacrylate), such as the material sold under the trademark PLEXIGLAS, polymers prepared by reacting polyfunctional isocyanates and/or isothiocyanates with polythiols or polyepisulfide monomers, either homopolymerized or co-and/or terpolymerized with polythiols, polyisocyanates, polyisothiocyanates and optionally ethylenically unsaturated monomers or halogenated aromatic-containing vinyl monomers, and other high refractive index polymers. Also contemplated are copolymers of such monomers and blends of the described polymers and copolymers with other polymers, e.g., to form interpenetrating network products. The exact chemical nature of the organic substrate is not critical to the present invention. However, the organic polymeric substrate should be chemically compatible with the photochromic polymeric coating applied to the surface of the substrate. For optical applications, the substrate should be transparent, more desirably optically clear.

The polymeric organic substrate used to prepare the photochromic articles of the present invention can have a protective coating, e.g., an abrasion-resistant coating, on its surface. For example, commercially available thermoplastic polycarbonate optical lenses are typically sold with an abrasion-resistant coating, e.g., a hard coat, already applied to its surface(s) because the surface tends to be readily scratched, abraded or scuffed. An example of such a lens is the polycarbonate lens (available from Gentex Optics) that is sold with a hard coat already applied to the polycarbonate surface. As used in this disclosure and claims, the terms "polymeric organic substrate" (or similar terms) or "surface" of such a substrate, is intended to mean and include either the polymeric organic substrate itself or such a substrate with a coating and/or primer on the substrate. Thus, when reference is made in this disclosure or claims to applying a primer coating or photochromic polymeric coating to the surface of the substrate, such reference includes applying such a coating to the polymeric organic substrate per se or to a coating, e.g., an abrasion-resistant coating, on the surface of the substrate. Hence, the term "substrate" includes substrates having a coating on its surface. The coating can be any suitable coating (other than a photochromic coating) and is not limited to an abrasion-resistant coating (hard coat), e.g., any protective coating or coating to provide additional functional properties to the article of which the substrate is a part.

The use of photochromic organic coatings on plastic substrates, particularly plastic substrates such as thermoplastic polycarbonates, has been described. In accordance with the present invention, any organic polymeric material that can be used as a coating with the chosen organic substrate and which will function as a host material for the organic photochromic materials/compounds chosen for use can be used. Normally, the host organic polymeric coating has sufficient internal free volume for the photochromic material to function efficiently, e.g., to change from a colorless form to a colored form that is visible to the naked eye in response to ultraviolet (UV) radiation, and to change back to the colorless form when the UV radiation is removed. Generally, the softer the host polymeric coating, the increased likelihood that it will contain sufficient internal free volume to allow the photochromic material to cycle efficiently between its colorless and colored form. As discussed subsequently herein, the hardness (or softness) of the photochromic polymeric coating can be expressed as a Fischer microhardness value. In accordance with the present invention, the Fischer microhardness of the photochromic polymeric coatings are typically less than 25. Other than as previously discussed, the precise chemical nature of the organic coating that is used as the host material for the photochromic material(s) is not critical.

Non-limiting examples of such organic polymeric materials include polyurethane-based coatings, such as those described in U.S. Pat. Nos. 6,107,395 and 6,187,444 B1, and International Patent Publication WO 01/55269; epoxy resin-based coatings, such as those described in U.S. Pat. No. 6,268,055 B1; acrylic/methacrylic monomer-based coatings, such as those described in U.S. Pat. No. 6,602,603, International Patent Publications WO 96/37593 and WO 97/06944, and U.S. Pat. Nos. 5,621,017 and 5,776,376; aminoplast, e.g., melamine type, resins, such as those described in U.S. Pat. Nos. 6,506,488 B1 and 6,432,544 B1; coatings comprising hydroxyl-functional components and polymeric anhydride-functional components, e.g., polyanhydride coatings, such as those described in U.S. Pat. No. 6,436,525 B1; polyurea urethane coatings, such as those described in column 2, line 27 to column 18, line 67 of U.S. Pat. No. 6,531,076B2 and coatings comprising N-alkoxymethyl(meth)acrylamide functional polymers, such as those described in U.S. Pat. No. 6,060,001.

Of particular interest are photochromic polyurethane-based coatings, photochromic polyacrylic or polymethacrylic-based coatings [referred to collectively as poly(meth)acrylic-based coatings], photochromic polyurea urethane-based coatings, photochromic aminoplast, e.g., melamine-based, coatings, and photochromic epoxy resin-based coatings. Of special interest are the optically clear photochromic polyurethane, polyurea urethane, epoxy, aminoplast and poly(meth)acrylic-based coatings for use on transparent, e.g., optically clear, substrates for optical applications, such as plano and vision correcting ophthalmic lenses, sun lenses and goggles, commercial and residential windows, automotive and aircraft transparencies, helmets, plastic sheeting, clear films, etc.

The term "transparent", as used in this disclosure and claims in connection with a substrate, film, material or coating, is intended to mean that the indicated coating, film, substrate or material, such as the plastic substrate, the non-activated photochromic coating, the thermally cured tie layer coating/film, and coatings superimposed or superposed on the thermally cured tie layer, have a light transmission of at least 70%, typically at least 80%, and more typically at least 85%. By the term "optically clear", as used in this disclosure and claims, is meant that the specified item has a light transmission that satisfies commercially accepted and regulatory values for optical, e.g., ophthalmic, articles.

Polyurethanes that can be used to prepare a photochromic polyurethane coating are those produced by the reaction of an organic polyol component and an isocyanate component, as more fully described in column 3, line 4 through column 6, line 22 of U.S. Pat. No. 6,187,444 B1. More particularly, the polyurethanes are produced from a combination of at least one hard segment producing organic polyol and at least one soft segment producing organic polyol. Generally, the hard segment results from the reaction of the isocyanate and a chain extender; and the soft segment results from the reaction of the isocyanate with a polymer backbone component such as a polycarbonate polyol, a polyester polyol or a polyether polyol, or mixtures of such polyols. The weight ratio of hard segment producing polyols to soft segment-producing polyols can vary from 10:90 to 90:10.

The relative amounts of the components comprising the polyurethane reaction mixture can be expressed as a ratio of the available number of reactive isocyanate groups to the available number of reactive hydroxyl groups, e.g., a ratio of NCO:OH groups of from 0.3:1.0 to 3.0:1.0. The isocyanate component can be an aliphatic, aromatic, cycloaliphatic or heterocyclic isocyanate, or mixtures of such isocyanates. Typically, the isocyanate component is chosen from blocked or unblocked aliphatic or cycloaliphatic isocyanates, or mixtures of such isocyanates.

As further described in U.S. Pat. No. 6,107,395, polyurethanes suitable as a photochromic host material can be prepared from an isocyanate reactive mixture comprising (i) from 40 to 85 weight percent of one or more polyols having a nominal functionality of from 2 to 4 and molecular weights of from 500 to 6000 g/mole, (ii) from 15 to 60 weight percent of one or more diols or triols or mixtures thereof having a functionality of from 2 to 3 and molecular weights of from 62 to 499, and (iii) an aliphatic polyisocyanate having a functionality of less than 3, e.g., 2.

The previously mentioned U.S. Pat. No. 6,602,603 describes reaction mixtures for poly(meth)acrylic host materials for photochromic materials as comprising at least two difunctional (meth)acrylate monomers, which can have from greater than 3 to less than 15 alkoxy units. In one described embodiment, a difunctional (meth)acrylate has the reactive acrylate groups connected by a straight or branched chain alkylene group, which usually contains from 1 to 8 carbon atoms; while a second difunctional (meth)acrylate has the reactive acrylate groups connected by ethylene oxide, propylene oxide, butylene oxide or mixtures of such oxide groups in random or block order.

Epoxy resin-based coatings described in U.S. Pat. No. 6,268,055 B1 are those prepared by the reaction of a composition comprising an epoxy resin or polyepoxide, e.g., polyglycidyl ethers of aliphatic alcohols and phenols, epoxy-containing acrylic polymers, polyglycidyl esters of polycarboxylic acids and mixtures of such epoxy-containing materials, with a curing agent, e.g., a polyacid comprising a half-ester formed from reacting an acid anhydride with an organic polyol.

Aminoplast resin-based coatings are described in U.S. Pat. Nos. 6,432,544 B1 and 6,506,488. These coatings are the reaction product of material(s) having at least two different functional groups chosen from hydroxyl, carbamate, urea or mixtures of such functional groups, and an aminoplast resin, e.g., a crosslinking agent. Materials having at least two different functional groups are described in the '444 patent from column 3, line 40 through column 12, line 23, and in the preceding disclosure with respect to the aminoplast tie layer. The aminoplast resin is a condensation product of an amine or amide with an aldehyde, e.g., formaldehyde, acetaldehyde, crotonaldehyde, benzaldehyde and furfural. The amine or amide can be melamine, benzoguanamine, glycoluril, urea and similar compounds. Melamine is typically used. Typically, the aminoplast resin has at least two reactive groups. Non-limiting examples of aminoplast resins are described in the '444 patent in column 12, lines 49 to 67.

The amount of photochromic coating applied to at least one surface of the plastic substrate is that amount which provides a sufficient quantity of organic photochromic material to produce a coating that exhibits a desired change in optical density ($\Delta OD$) when the cured coating is exposed to ultraviolet (UV) radiation, e.g., a photochromic amount. Typically, the change in optical density measured at 22° C. (72° F.) after 30 seconds of UV exposure is at least 0.05, more typically at least 0.15, and still more typically at least 0.20. The change in optical density after 15 minutes of UV exposure is typically at least 0.10, more typically at least 0.50, and still more typically at least 0.70.

Stated differently, the amount of active photochromic material used in the photochromic coating can range from 0.5 to 40.0 weight percent, based on the total weight of monomer(s)/resin(s) used to produce the coating. The relative amounts of photochromic material(s) used will vary and depend in part upon the relative intensities of the color of the activated form of the photochromic compound(s), the ultimate color desired, and the solubility or dispersibility of the photochromic material(s) in the polymeric coating. Typically, the concentration of active photochromic material(s) within the photochromic coating ranges from 1.0 to 30 weight percent, more typically, from 3 to 20 weight percent, and still more typically, from 3 to 10 weight percent (based on the total weight of monomer(s)/resin(s) used to produce the coating.) The amount of photochromic material in the coating can range between any combination of these values, inclusive of the recited values.

The bleach rate of the photochromic coating, as reported in terms of the fading half-life (T ½), is typically not more than 500 seconds, more typically not more than 190 seconds, still more typically not more than 115 seconds, and even still more typically not more than 50 seconds. The half-life bleach rate is the time interval in seconds for the change in optical density ($\Delta OD$) of the activated form of the photochromic coating to reach one half the highest $\Delta OD$ after removal of the source of activating light. The aforedescribed values for change in optical density and bleach rate are measured at 22° C. (72° F.).

The photochromic coating applied to the surface of the rigid substrate will typically have a thickness of at least 3 microns, more typically at least 5 microns, still more typically, at least 10 microns, e.g., at least 20 or 30 microns. The applied photochromic coating will also usually have a thickness of not more than 200 microns, more usually not more than 100 microns, and most usually not more than 50 microns, e.g., not more than 40 microns. The thickness of the photochromic coating can range between any combinations of these values, inclusive of the recited values. For example, the photochromic coating can range from 10 to 50 microns, e.g., 20 to 40 microns. The applied photochromic coating should most desirably be free of cosmetic defects, such as scratches, pits, spots, cracks, inclusions, etc.

Typically, the term "coating" is considered by those knowledgeable in the coating art to be a layer having a thickness of not more than 4 mils (about 100 microns). However, as used in this specification and claims in relation to the photochromic coating, the term coating is defined herein as having a thickness, such as a thickness defined hereinabove. Further, as used in this specification and claims, it is intended that the term "surface of the polymeric substrate" or like terms, e.g., the surface to which the photochromic polymeric coating is applied, include the embodiment in which only at least a portion of the surface of the substrate is coated. Hence, the photochromic coating (and the thermally cured tie layer applied to the photochromic coating) can cover only a portion of a surface of the substrate, but typically it is applied to the entire surface of at least one substrate surface.

The hardness of the photochromic coating after curing should be sufficient to allow it to be physically/mechanically handled without causing blemishes, e.g., scratches, in or on the coating. The hardness of the photochromic coating typically is less than the tie layer that is applied to the photochromic coating, which in turn is typically softer than the abrasion-resistant (hard coat) coating applied to the tie layer. Thus, the principal coatings applied to the plastic substrate (not including any primer layer that can be applied to the substrate) increase in hardness in the direction of the abrasion-resistant coating. This gradient in hardness for the foregoing coatings/film can be quantified by tests known to the skilled artisan, e.g., Fischer microhardness, Knoop hardness or pencil hardness values.

The Fischer microhardness of the photochromic polymeric coatings is typically less than 30 Newtons per mm2, more particularly, less than 25, e.g., less than 15, such as 2 or 5, Newtons per mm2. In particular, the Fischer microhardness values will be in the lower portion of the ranges described herein, e.g., from 2 to 25, such as 10 to 15, e.g., 12, Newtons per mm2. The lower range of hardness allows the electrocyclic mechanism discussed previously in relation to photochromic materials to occur with greater efficiency than at higher hardness values. The Fischer microhardness of the photochromic polymeric coatings can range between any combination of the stated values, inclusive of the recited values. Fischer microhardness values can be obtained with a Fischerscope HCV Model H-100 (available from Fischer Technology, Inc.) by taking 3 measurements in the center area of the test sample under conditions of a 100 milliNewton load, 30 load steps, and 0.5 second pauses between load steps at an indentor (Vickers diamond stylus)depth of 2 μm(microns).

Photochromic materials, e.g., photochromic dyes/compounds or compositions containing such dye/compounds, that can be utilized for the photochromic coating applied to the rigid substrate are inorganic and/or organic photochromic compounds and/or substances containing such organic photochromic compounds that are currently known to those skilled in the art (or that are later discovered). The particular photochromic material(s), e.g., compound(s), chosen is not critical, and its/their selection will depend on the ultimate application and the color or hue desired for that application. When two or more photochromic compounds are used in combination, they are generally chosen to complement one another to produce a desired color or hue.

Organic photochromic compounds used in the photochromic coating commonly have at least one activated absorption maxima within the visible spectrum of between 300 and 1000, e.g., between 400 and 700, nanometers. The organic photochromic material(s) is incorporated, e.g., dissolved or dispersed, in the photochromic coating, and color when activated, e.g., when exposed to ultraviolet radiation, the photochromic material(s) changes to the color or hue that is characteristic of the colored form of such material(s).

The inorganic photochromic material typically contains crystallites of silver halide, cadmium halide and/or copper halide. Generally, the halide material is the chloride and bromide. Other inorganic photochromic materials can be prepared by the addition of europium (II) and/or cerium (III) to a mineral glass, such as a soda-silica glass. In one embodiment, the inorganic photochromic material(s) are added to molten glass and formed into particles that are incorporated into the coating composition that is used to form the polymeric photochromic coating. Such inorganic photochromic materials are described in the Kirk Othmer Encyclopedia of Chemical Technology, 4th Edition, Volume 6, pages 322–325.

In one contemplated embodiment, the organic photochromic component of the photochromic coating comprises:

(a) at least one photochromic organic compound having a visible lambda max of from 400 to less than 550, e.g., from 400 to 525, nanometers; and (b) at least one photochromic organic compound having a visible lambda max of greater than 525 or 550 nanometers, e.g., from 525 or 550 to 700 nanometers.

Non-limiting examples of photochromic compounds that can be used in the photochromic coating include benzopyrans, chromenes, e.g., naphthopyrans, such as, naphtho[1,2-b]pyrans, and naphtho[2,1-b]pyrans, spiro-9-fluoreno[1,2-b]pyrans, phenanthropyrans, quinopyrans, and indeno-fused naphthopyrans, such as those disclosed in U.S. Pat. No. 5,645,767 at column 1, line 10 to column 12, line 57, and U.S. Pat. No. 5,658,501 at column 1, line 64 to column 13, line 36 Additional non-limiting examples of photochromic compounds that can be used include the oxazines, such as benzoxazines, naphthoxazines, and spiro(indoline)pyridobenzoxazines. Other photochromic substances contemplated for use herein are photochromic metal dithizonates, e.g., mercury dithizonates, which are described in, for example, U.S. Pat. No. 3,361,706; fulgides and fulgimides, e.g. the 3-furyl and 3-thienyl fulgides and fulgimides, which are described in U.S. Pat. No. 4,931,220 at column 20, line 5 through column 21, line 38; diarylethenes, which are described in U.S. Patent Application 2003/0174560 from paragraph [0025] to [0086]; and mixtures of any of the aforementioned photochromic materials/compounds.

Further non-limiting examples of photochromic compounds, polymerizable photochromic compounds and complementary photochromic compounds are described in the following U.S. Patents:

U.S. Pat. No. 5,166,345 at column 3, line 36 to column 14, line 3;

U.S. Pat. No. 5,236,958 at column 1, line 45 to column 6, line 65;

U.S. Pat. No. 5,252,742 at column 1, line 45 to column 6, line 65;

U.S. Pat. No. 5,359,085 at column 5, line 25 to column 19, line 55;

U.S. Pat. No. 5,488,119 at column 1, line 29 to column 7, line 65;

U.S. Pat. No. 5,821,287 at column 3, line 5 to column 11, line 39;

U.S. Pat. No. 6,113,814 at column 2, line 23 to column 23, line 29;

U.S. Pat. No. 6,153,126 at column 2, line 18 to column 8, line 60;

U.S. Pat. No. 6,296,785 at column 2 line 47 to column 31, line 5;

U.S. Pat. No. 6,348,604 at column 3, line 26 to column 17, line 15; and

U.S. Pat. No. 6,353,102 at column 1, line 62 to column 11, line 64.

Spiro(indoline)pyrans are also described in the text, Techniques in Chemistry, Volume III, "Photochromism", Chapter 3, Glenn H. Brown, Editor, John Wiley and Sons, Inc., New York, 1971. In addition, it is contemplated that organic photochromic materials such as photochromic pigments and photochromic compounds encapsulated in metal oxides can be used in the photochromic coating. See, for example, the materials described in U.S. Pat. Nos. 4,166,043 and 4,367,170.

The photochromic coating of the present invention can contain one photochromic compound or a mixture of two or more photochromic compounds, as desired. Mixtures of photochromic compounds can be used to attain certain activated colors such as a near neutral gray or near neutral brown. See, for example, U.S. Pat. No. 5,645,767, column 12, line 66 to column 13, line 19, which describes the parameters that define neutral gray and brown colors.

The photochromic compound(s) described herein can be incorporated into the curable coating composition by addition to the coating composition and/or by dissolving the compound(s) in a solvent before being added to the curable coating composition. Alternatively, although more involved, the photochromic compound(s) can be incorporated into the cured polymer coating by imbibition, permeation, diffusion or other transfer methods, which methods are known to those skilled in the art of dye transfer into host materials.

In addition to photochromic materials, the photochromic coating (or precursor formulation) can contain additional conventional adjuvants that impart desired properties or characteristics to the coating, that are required by the process used to apply and cure the photochromic coating on the surface of the plastic substrate, or that enhance the performance of the coating. Such adjuvants include, but are not limited to, ultraviolet light absorbers, light stabilizers, such as hindered amine light stabilizers (HALS), asymmetric diaryloxalamide(oxanilide) compounds, and singlet oxygen quenchers, e.g., a nickel ion complex with an organic ligand, antioxidants, polyphenolic antioxidants, heat stabilizers, rheology control agents, leveling agents, e.g., surfactants, free radical scavengers and adhesion promoting agents, such as trialkoxy silanes, e.g., silanes having an alkoxy radical of 1 to 4 carbon atoms, including γ-glycidoxypropyl trimethoxy silane, γ-aminopropyl trimethoxysilane, 3,4-epoxy cyclohexylethyl trimethoxysilane, dimethyldiethoxysilane, aminoethyl trimethoxysilane, and 3-(trimethoxysilyl)propyl methacrylate. Mixtures of such photochromic performance enhancing adjuvant materials are contemplated. See, for example, the materials described in U.S. Pat. Nos. 4,720,356, 5,391,327 and 5,770,115.

Compatible (chemically and color-wise) tints, e.g., dyes, can also be added to the photochromic coating formulation or applied to the plastic substrate for medical reasons or for reasons of fashion, e.g., to achieve a more aesthetic result. The particular dye chosen can vary and will depend on the aforesaid need and result to be achieved. In one embodiment, the dye can be chosen to complement the color resulting from the activated photochromic materials used, e.g., to achieve a more neutral color or absorb a particular wavelength or incident light. In another contemplated embodiment, the dye can be chosen to provide a desired hue to the substrate and/or coating when the photochromic coating is in a non-activated state.

The photochromic coating composition can be applied to the surface of the plastic substrate as a polymerizable formulation and then cured (polymerized) by methods well known to those skilled in the art including, but not limited to, photopolymerization, thermal polymerization (including infrared polymerization), and other sources of radiation. Such application methods include the art-recognized methods of spin coating, curtain coating, dip coating, spray coating or by methods used in preparing overlays. Such methods are described in U.S. Pat. No. 4,873,029.

When applied as a polymerizable formulation, the photochromic coating formulation will also typically contain a catalyst or polymerization initiator. The amount of catalyst/polymerization initiator(s) used to polymerize the polymerizable components of the photochromic coating formulation can vary and will depend on the particular initiator and the polymerizable monomers used. Typically, only that amount that is required to initiate (catalyze) and sustain the polymerization reaction is required, e.g., an initiating or catalytic amount. Generally, from 0 to 10 weight percent, e.g., from 0.01 to 8 weight percent, more typically from 0.1 to 5 weight percent, based on the total weight of the polymerizable monomer(s) in the formulation, of at least one catalyst and/or polymerization initiator, including photoinitiators is used. The amount of catalyst/initiator can range between any combinations of the aforestated values, inclusive of the recited values. The catalyst(s)/initiator(s) will be chosen from those materials that can be used to polymerize the particular monomer(s) used to produce the polymeric coating chosen as the photochromic host, and that will not impair significantly the function of the photochromic materials that are included in the coating formulation.

For example, catalysts that can be used to cure polyurethane reaction mixtures can be chosen from the group consisting of Lewis bases, Lewis acids and insertion catalysts described in Ullmann's Encyclopedia of Industrial Chemistry, 5th Edition, 1992, Volume A21, pp. 673 to 674. Usually the catalyst is an organo tin catalyst, e.g., tin octylate, dibutyl tin dilaurate, dibutyl tin diacetate, dibutyl tin mercaptide, dibutyl tin dimaleate, dimethyl tin diacetate, dimethyl tin dilaurate and 1,4-diazabicyclo[2.2.2]octane. Mixtures of tin catalysts can be used. Other tin catalysts described in the art can be used as well.

Epoxy resin coating compositions typically contain a polyacid curing agent having a high average acid functionality, e.g., two or more acid groups per molecule. Typically, the acid group is a carboxylic acid group. Non-limiting examples of polycarboxylic acids include dicarboxylic acids such as oxalic, malonic, succinic, tartaric, glutaric, adipic, sebacic, maleic, fumaric, phthalic, isophthalic, terephthalic, and dodecanedioc acids; tricarboxylic acids such as citric acid; and tetracarboxylic acids such as 1,2,3,4-butane tetracarboxylic acid.

Polyanhydride coating compositions typically contain an amine compound as the curing catalyst. Non-limiting examples of amine compounds include dimethyl cocoamine, dimethyl dodecylamine, triethylamine, triethanolamine and phenolic compounds containing at least two dialklyamino groups. Aminoplast resin and alkoxyacrylamide polymer coating compositions commonly contain an acidic material as a catalyst. Non-limiting examples include phosphoric acid or substituted phosphoric acids, such as alkyl acid phosphate and phenyl acid phosphate; and sulfonic acids or substituted sulfonic acids, such as para-toluene sulfonic acid, dodecylbenzene sulfonic acid and dinonylnaphthalene sulfonic acid.

Acrylic/methacrylic monomer-based coating compositions can contain thermal initiators, e.g., initiators that produce free radicals, such as organic peroxy compounds or azobis(organonitrile) compounds, photoinitiators or mixtures of such initiators.

Non-limiting examples of suitable organic peroxy compounds include peroxymonocarbonate esters, such as tertiarybutylperoxy isopropyl carbonate; peroxydicarbonate esters, such as di(2-ethylhexyl) peroxydicarbonate, di(secondary butyl) peroxydicarbonate and diisopropyl peroxydicarbonate; diacyl peroxides, such as 2,4-dichlorobenzoyl peroxide, isobutyryl peroxide, decanoyl peroxide, lauroyl peroxide, propionyl peroxide, acetyl peroxide, benzoyl peroxide, p-chlorobenzoyl peroxide; peroxyesters, such as t-butylperoxy pivalate, t-butylperoxy octylate, and t-butylperoxy isobutyrate; methylethylketone peroxide; and acetylcyclohexane sulfonyl peroxide.

Non-limiting examples of suitable azobis(organonitrile) compounds include azobis(isobutyronitrile), 2,2'-azobis(2,4-dimethylpentanenitrile), 1,1'-azobiscyclohexanecarbonitrile, and azobis(2,4-dimethylvaleronitrile) and mixtures of such azo thermal initiators. Desired thermal initiators are those that do not discolor the resulting coating or decompose the photochromic material incorporated within the polymerizable coating composition.

Photopolymerization can be performed in the presence of at least one photoinitiator using ultraviolet light and/or visible light, if photoinitiators are required. Photoinitiators, which are free radical initiators, are classified in two major groups based upon their mode of action. Cleavage-type photoinitiators include, but are not limited to, acetophenones, α-aminoalkylphenones, benzoin ethers, benzoyl oximes, acylphosphine oxides and bisacylphosphine oxides. Abstraction-type photoinitiators include, but are not limited to, benzophenone, Michler's ketone, thioxanthone, anthraquinone, camphorquinone, fluorone and ketocoumarin. Abstraction-type photoinitiators function better in the presence of materials such as amines and other hydrogen donor materials added to provide labile hydrogen atoms for abstraction. Typical hydrogen donors have an active hydrogen positioned alpha to an oxygen or nitrogen, e.g., alcohols, ethers and tertiary amines, or an active hydrogen atom directly attached to sulfur, e.g., thiols. In the absence of such added materials, photoinitiation can still occur via hydrogen abstraction from monomers, oligomers or other components of the system.

Non-limiting examples of photopolymerization initiators that can be used include benzil, benzoin, benzoin methyl ether, benzoin isobutyl ether, benzophenol, acetophenone, benzophenone, 4,4'-dichlorobenzophenone, 4,4'-bis(N,N'-dimethylamino)benzophenone, diethoxyacetophenone, fluorones, e.g., the H-Nu series of initiators available from Spectra Group Limited, 2-hydroxy-2-methyl-1-phenylpropan-1-one, 1-hydroxycyclohexyl phenyl ketone, 2-isopropylthixantone, α-aminoalkylphenone, e.g., 2-benzyl-2-dimethylamino-1-(4-morpholinophenyl)-1-butanone, acylphosphine oxides, such as 2,6-dimethylbenzoyl diphenyl phosphine oxide, 2,4,6-trimethylbenzoyl diphenyl phosphine oxide, 2,6-dichlorobenzoyl diphenyl phosphine oxide, and 2,6-dimethoxybenzoyl diphenyl phosphine oxide; bisacylphosphine oxides, such as bis(2,6-dimethyoxybenzoyl)-2,4,4-trimethylpentyl phosphine oxide, bis(2,6-dimethylbenzoyl)-2,4,4-trimethylpentyl phosphine oxide, bis(2,4,6-trimethylbenzoyl)-2,4,4-trimethylpentyl phosphine oxide, and bis(2,6-dichlorobenzoyl)-2,4,4-trimethylpentyl phosphine oxide; phenyl-4-octyloxyphenyliodonium hexafluoroantimonate, dodecyldiphenyliodonium hexafluoroantimonate, (4-(2-tetradecanol)oxyphenyl)-iodonium hexafluoroantimonate and mixtures of such photo polymerization initiators.

The source of radiation used for photopolymerization is chosen from those sources that emit ultraviolet light and/or visible light. The source of radiation can be a mercury lamp, a mercury lamp doped with FeI3 and/or GaI3, a germicidal lamp, a xenon lamp, a tungsten lamp, a metal halide lamp or a combination of such lamps. Typically, the absorbance spectra of the photoinitiator(s) is matched with the spectral output of the light source bulb, e.g., an H bulb, D bulb, Q bulb and/or V bulb, for highest curing efficiency. The exposure time of the curable coating to the light source will vary depending upon the wavelength and intensity of the light source, the photoinitiator, and thickness of the coating. Generally, the exposure time will be sufficient to substantially cure the coating, or produce a coating that is cured sufficiently to allow physical handling followed by a post thermal cure. The photochromic coating can also be cured using an electron beam process that does not require the presence of a thermal or photoinitiator.

Solvents can also be present in the coating formulation in order to dissolve and/or disperse the components of the coating formulation. Typically, a solvating amount of solvent is used, e.g., an amount which is sufficient to solubilize/disperse the solid components in the coating formulation. Commonly, from 10 to 80 weight percent of solvent material, based on the total weight of the coating formulation, is used.

Solvents include, but are not limited to, benzene, toluene, methyl ethyl ketone, methyl isobutyl ketone, acetone, ethanol, tetrahydrofurfuryl alcohol, propyl alcohol, propylene carbonate, N-methylpyrrolidinone, N-vinyl pyrrolidinone, N-acetyl pyrrolidinone, N-hydroxymethylpyrrolidinone, N-butyl pyrrolidinone, N-ethyl pyrrolidinone, N-(N-octyl) pyrrolidinone, N-(N-dodecyl)pyrrolidinone, 2-methoxyethyl ether, xylene, cyclohexane, 3-methyl cyclohexanone, ethyl acetate, butyl acetate, tetrahydrofuran, methanol, amyl propionate, methyl propionate, propylene glycol methyl ether, diethylene glycol monobutyl ether, dimethyl sulfoxide, dimethyl formamide, ethylene glycol, mono- and di-alkyl ethers of ethylene glycol and their derivatives, which are sold as CELLOSOLVE industrial solvents, and mixtures of such solvents.

In a further contemplated embodiment, the photochromic polymeric coating can be applied as a water-borne coating, e.g., as aqueous polymer dispersion, such as a latex, with or without the presence of an organic solvent. This type of system is a two-phase system comprising an aqueous phase and an organic phase, which is dispersed in the aqueous phase. Use of water-borne coatings is well known in the art. See, for example, U.S. Pat. No. 5,728,769, which relates to aqueous urethane resins and coatings prepared from such resins, and the patents referred to in the '769 patent.

After the photochromic coating formulation is applied to the surface of the plastic substrate, it is cured (polymerized) by exposure to ultraviolet or electron beam radiation, or is thermally cured. The specific cure conditions used will depend on the plastic substrate, the polymerizable components in the formulation and the type of catalyst/initiator used, or in the case of electron beam radiation, the intensity of the electron beam. Thermal curing can involve heating from room temperature up to temperatures below which the plastic substrate is not damaged due to such heating. Temperatures up to 200° C. have been reported. Such cure conditions are well known in the art. For example, a typical thermal cure cycle involves heating the formulation from room temperature (22° C.) to from 85 to 125° C. over a period of from 2 to 20 minutes. The time required for ultraviolet or electron beam radiation cures is generally shorter than a thermal cure, e.g., from 5 seconds to 5 minutes, and will depend on the intensity (power) of the radiation. When the thermal or UV/electron beam cure conditions produce a coating that can be physically handled but is not completely cured, an additional thermal post cure step can also be employed to fully cure the photochromic coating.

Prior to applying the photochromic coating to the surface of the plastic substrate, the surface of the substrate is often cleaned and treated to provide a clean surface and a surface that will enhance adhesion of the photochromic coating to the substrate. Effective cleaning and treatments commonly used include, but are not limited to, ultrasonic washing with an aqueous soap/detergent solution, cleaning with an aqueous mixture of organic solvent, e.g., a 50:50 mixture of isopropanol:water or ethanol:water, UV treatment, activated gas treatment, e.g., treatment with low temperature plasma or corona discharge, as described earlier, and chemical treatment that results in hydroxylation of the substrate surface, e.g., etching of the surface with an aqueous solution of alkali metal hydroxide, e.g., sodium or potassium hydroxide, which solution can also contain a fluorosurfactant. Generally, the alkali metal hydroxide solution is a dilute aqueous solution, e.g., from 5 to 40 weight percent, more typically from 10 to 15 weight percent, such as 12 weight percent, alkali metal hydroxide. See, for example, U.S. Pat. No. 3,971,872, column 3, lines 13 to 25; U.S. Pat. No. 4,904,525, column 6, lines 10 to 48; and U.S. Pat. No. 5,104,692, column 13, lines 10 to 59, which describe surface treatments of polymeric organic materials.

In some cases, a primer coating is applied to the plastic surface substrate before application of the photochromic coating. The primer coating is interposed between the organic substrate and the photochromic polymeric coating, and serves as a barrier coating to prevent interaction of the components comprising the photochromic polymeric coating with the substrate and vice versa, and/or as an adhesive layer to promote adhesion of the photochromic coating to the plastic substrate. The primer can be applied to the plastic substrate by any of the methods used to apply the photochromic coating, e.g., spray, spin, spread, curtain, roll or dip coating; and can be applied to a cleaned and untreated or cleaned and treated, e.g., chemically treated, surface of the substrate. Primer coatings are well known to those skilled in the art. Selection of an appropriate primer coating will depend on the plastic substrate used and the particular photochromic coating, e.g., the primer coating must be chemically and physically compatible with the surface of the plastic substrate and the photochromic coating, while providing the functional benefits desired for the primer coating, e.g., barrier and adhesive properties.

The primer coating can be one or several monomolecular layers thick, and can range from 0.1 to 10 microns, more usually from 0.1 to 2 or 3 microns in thickness. The thickness of the primer coating can vary between any combination of the aforementioned values, inclusive of the recited values. One contemplated embodiment of a suitable primer coating comprises an organofunctional silane, such as methacryloxypropyl trimethoxysilane, a catalyst of a material that generates acid on exposure to actinic radiation, e.g., onium salts, and an organic solvent, such as diglyme or isopropyl alcohol, as described in U.S. Pat. No. 6,150,430. A further example of a primer coating is described in U.S. Pat. No. 6,025,026, which describes a composition that is substantially free of organosiloxanes and which comprises organic anhydrides having at least one ethylenic linkage and an isocyanate-containing material.

The thermally cured tie layer should be transparent, more particularly, optically clear when used for optical, e.g., ophthalmic, applications, and not significantly impair the optical properties of the photochromic coated substrate. For example, the thermally cured tie layer coating/film should permit a sufficient quantity of the appropriate UV radiation to pass through it in order to activate the photochromic materials incorporated into the photochromic polymeric coating appended to the substrate. The terms "transparent" and "optically clear" are defined earlier in this disclosure.

The surface of the thermally cured tie layer is desirably harder than the photochromic coating to which it is applied, and is usually softer than the abrasion-resistant coating that is commonly applied to the thermally cured tie layer. The hardness of the tie layer can be measured by various methods, including the Fischer Microhardness Method (discussed previously), the conventional pencil hardness test (ASTM Method D-3363), Knoop Hardness testing or any other conventional hardness test method. As described, it is also desirable that the thermally cured tie layer coating adhere well to the photochromic coating, and be compatible with abrasion resistant coatings that are prepared with organo-silane(s). It is further desired, although not imperative, that the thermally cured tie layer be resistant to treatment with dilute aqueous inorganic caustic solutions.

Adhesion of the thermally cured tie layer to the photochromic coating can be determined by the conventional art recognized crosshatch tape peel adhesion test, and/or by a boiling water crosshatch tape peel adhesion test, which is a more stringent test. The former is often referred to as the primary (1°) test or dry test; while the later is often referred to as the secondary (2°) or wet test. In the primary test, a cutting tool composed of eleven blades spaced approximately 1 mm apart (tip to tip) and 0.65 mm thick is used to make a first long cut on the sample followed by second and third cuts, which are made at 90 degrees to and across the first cut. The second and third cuts are separated from each other to provide separate crosshatch zones. A piece cm) is applied in the direction of the first cut and pressed down to smooth out any bubbles. The tape is then peeled off the surface with a sharp, rapid, even and continuous movement. The procedure is repeated with a fresh piece of tape. A small piece of tape (1½ inches, 3.8 cm) is applied to each of the crosshatch zones produced by the second and third cuts in a direction 90 degrees to the direction of the first tape, and these pieces of tape also peeled off the surface with a sharp, rapid, even and continuous movement. If 30 percent or less of the squares of the grid produced by the cutting tool are found to have debonded from the substrate (photochromic coating), e.g., at least 70 percent of the grids remain intact, the coating is deemed to pass the adhesion test. More particularly, it is desirable that no more than 20, particularly no more than 10 squares, still more particularly, no more than 5 squares, e.g., 1 square, out of a 100 squares of the grid de-bond from the substrate. In accordance with the present invention, the thermally cured tie layer should pass the crosshatch tape peel adhesion test to be considered to have adhered to the photochromic coating. Stated differently, if the thermally cured tie layer coating/film passes the crosshatch tape peel test, it is referred to herein as being coherently appended (or cohesively appended) or attached to the layer, e.g., the photochromic coating, to which it is appended.

A further more severe adhesion test, is the secondary or wet adhesion test, which optionally can be performed to assess the adhesion of the thermally cured tie layer to the photochromic coating. This further test; namely, the secondary or boiling water cross-hatch adhesion test, involves placing the test sample, e.g., lens, which has been scored with cross hatches, as described above, in boiling deionized water for 30 minutes. After the test sample has cooled to room temperature, the crosshatch tape peel adhesion test, as described above, is performed again. The same pass/fail requirements that were described for the crosshatch adhesion test are used for this boiling water modification of the test.

The thermally cured tie layer coating/film should desirably, as noted, be resistant to treatment, e.g., removal, by aqueous inorganic caustic solutions, e.g., relatively dilute alkali metal hydroxide solutions, such as solutions of sodium hydroxide or potassium hydroxide. The coating is considered to be resistant to removal by such solutions if the thickness of the coating is reduced not more than 0.5 micron after exposure to 12.5 weight percent aqueous potassium hydroxide at 140° F. (60° C.) for four minutes, or after exposure to 12.5 weight percent sodium hydroxide at 140° F. (60° C.) for twenty minutes. Desirably, the coating thickness is not reduced more than 0.5 microns after two exposures, more desirably after three exposures, to the aqueous alkali metal hydroxide solution.

The thermally cured tie layer coating/film is desirably also compatible with abrasion-resistant coatings (hard coat), particularly abrasion-resistant coatings comprising organo silane material(s), that are used to protect plastic surfaces from abrasion, scratches, etc. Organo silane-containing abrasion-resistant coatings, often referred to as hard coats or silane-based hard coatings, are well known in the art, and are commercially available from various manufacturers, such as SDC Coatings, Inc. and PPG Industries, Inc. Reference is made to column 5, lines 1–45 of U.S. Pat. No. 4,756,973, and to column 1, lines 58 through column 2, line 8, and column 3, line 52 through column 5, line 50 of U.S. Pat. No. 5,462,806 which disclosures describe organo silane hard coatings. Reference is also made to U.S. Pat. Nos. 4,731,264, 5,134,191, 5,231,156 and International Patent Publication WO 94/20581 for disclosures of organo silane hard coatings.

While a described physical feature of the thermally cured tie layer is that it be compatible with organo silane hard coatings, other coatings that provide abrasion and scratch resistance, such as polyfunctional acrylic hard coatings, melamine-based hard coatings, urethane-based hard coatings, alkyd-based coatings, silica sol-based hard coatings or other organic or inorganic/organic hybrid hard coatings can be used as the abrasion-resistant coating. One skilled in the art can readily determine if the thermally cured tie layer is compatible with organo silane hard coats by applying an organo silane hard coat to the tie layer and determining the compatibility of the tie layer to that hard coating by means of the cross-hatch tape peel adhesion test, which is performed on the hard coat.

Another method of determining compatibility of the thermally cured tie layer coating/film to the hard coat is the absence of crazing in the hard coat after it has been applied to the tie layer and cured. By crazing is meant the presence of fractures in the hard coat. Such fractures are sometimes readily apparent by observation; however, the fractures can be very fine and observable by magnification under bright light. The light source can consist of a high intensity white arc light of a 75 watt Xenon bulb, with the light being projected vertically down through the hard coat.

By use of the term "compatible with an organo silane abrasion resistant coating (hard coat)" is meant that the thermally cured tie layer is capable of having an organo silane hard coat deposited on its surface and that the organo silane hard coat adheres to the tie layer under ordinary handling/wear conditions, as determined by the crosshatch tape peel adhesion test or the absence of crazing in the hard coat. Naturally, the organo silane hard coat can be removed by treatment with concentrated aqueous caustic, or severe mechanical abrasion. Further, the term abrasion-resistant organo silane-containing coating (or other such similar meaning terms) is meant that the abrasion-resistant coating is prepared from a composition comprising at least one organo silane.

It is contemplated that, if required, a primer coating can be applied to the thermally cured tie layer before applying the abrasion-resistant coating on top of it. Such primer coatings are known in the art. Selection of an appropriate primer coating will depend on the particular thermally cured tie layer and abrasion-resistant coating used; namely, the primer coating must be chemically and physically compatible (non-reactive) with the surfaces that it abuts. The primer coating can be one or several monomolecular layers thick, and can range from 0.1 to 10 microns, e.g., from 0.1 to 2 or 3 microns, in thickness. Such primer coatings are discussed herein in relation to the photochromic coating, and that discussion is applicable here also.

In one embodiment, the hard coat can be prepared from a composition comprising from 35 to 95 weight percent, as calculated solids, of at least one organo silane monomer represented by the following empirical formula:

$$R1SiW3$$

wherein R1 is glycidoxy(C1–C20)alkyl, desirably glycidoxy(C1–C10)alkyl, and more desirably, glycidoxy(C1–C4)alkyl; W is hydrogen, halogen, hydroxy, C1–C5 alkoxy, C1–C5 alkoxy(C1–C5)alkoxy, C1–C4 acyloxy, phenoxy, C1–C3 alkylphenoxy, or C 1–C3 alkoxyphenoxy, said halogen being bromo, chloro or fluoro. Typically, W is hydrogen, halogen, hydroxy, C1–C3 alkoxy, C1–C3 alkoxy(C1–C3) alkoxy, C1–C2 acyloxy, phenoxy, C1–C2 alkylphenoxy, or C1–C2 alkoxyphenoxy, and the halogen is chloro or fluoro. More typically, W is hydroxy, C1–C3 alkoxy, C1–C3 alkoxy (C1–C3)alkoxy, C1–C2 acyloxy, phenoxy, C1–C2 alkylphenoxy, or C1–C2 alkoxyphenoxy.

The weight percent, as calculated solids, of organo silane monomer(s) represented by the foregoing empirical formula in the hard coat composition is typically from 40 to 90, more typically from 45 to 85, and still more typically from 50 to 70 weight percent. The weight percent calculated solids are determined as the percent of the silanol that theoretically forms during hydrolysis of the orthosilicate.

Non-limiting examples of organo silane monomers include:

glycidoxymethyltriethoxysilane,
glycidoxymethyltrimethoxysilane,
alpha-glycidoxyethyltrimethoxysilane,
alpha-glycidoxyethyltriethoxysilane,
alpha-glycidoxypropyltrimethoxysilane,
alpha-glycidoxypropyltriethoxysilane,
alpha-glycidoxypropyltrimethoxysilane,
alpha-glycidoxypropyltriethoxysilane,
beta-glycidoxyethyltrimethoxysilane,
beta-glycidoxyethyltriethoxysilane,
beta-glycidoxypropyltrimethoxysilane,
beta-glycidoxypropyltriethoxysilane,
beta-glycidoxybutyltrimethoxysilane,
beta-glycidoxybutyltriethoxysilane,
gamma-glycidoxypropyltrimethoxysilane,
gamma-glycidoxypropyltriethoxysilane,
gamma-glycidoxypropyltripropoxysilane,
gamma-glycidoxypropyltributoxysilane,
gamma-glycidoxypropyltrimethoxysilane,
gamma-glycidoxypropyltriphenoxysilane,
gamma-glycidoxybutyltrimethoxysilane,
gamma-glycidoxybutyltriethoxysilane,
delta-glycidoxybutyltrimethoxysilane,
delta-glycidoxybutyltriethoxysilane,
hydrolyzates of such silane monomers, and mixtures of such silane monomers and hydrolyzates thereof.

The hard coat composition of the foregoing described embodiments can further include from 5 to 65 weight percent, as calculated solids, of: (a) silane monomers represented; (b) metal alkoxides; or (c) a mixture thereof in a weight ratio of (a):(b) of from 1:100 to 100:1. Typically, the hard coat composition includes from 10 to 60 weight percent calculated solids, more typically from 15 to 55, and still more typically from 30 to 50 weight percent calculated solids of the aforementioned materials (a), (b) or (c).

The hard coat composition can include at least one silane monomer (a) represented by the following empirical formula:

$$R2b(R3)cSiZ4-(b+c)$$

wherein R2 can be C1–C20 alkyl, C1–C20 haloalkyl, C2–C20 alkenyl, C2–C20 haloalkenyl, phenyl, phenyl (C1–C20)alkyl, C1–C20 alkylphenyl, phenyl(C2–C20)alkenyl, C2–C20 alkenylphenyl, morpholino, amino(C1–C20) alkyl, amino(C2–C20)alkenyl, mercapto(C1–C20)alkyl, mercapto(C2–C20)alkenyl, cyano(C1–C20)alkyl, cyano (C2–C20)alkenyl, acryloxy, methacryloxy, or halogen. The halo or halogen can be bromo, chloro, or fluoro. Typically, R2 is a C1–C10 alkyl, C1–C10 haloalkyl, C2–C10 alkenyl, phenyl, phenyl(C1–C10)alkyl, C1–C10 alkylphenyl, morpholino, amino(C1–C10)alkyl, amino(C2–C10)alkenyl, mercapto(C1–C10)alkyl, mercapto(C2–C10)alkenyl, cyano (C1–C10)alkyl, cyano(C2–C10)alkenyl, or halogen and the halo or halogen is chloro or fluoro.

In the empirical formula for the silane monomer (a), R3 can be C1–C20 alkylene, C2–C20 alkenylene, phenylene, C1–C20 alkylenephenylene, amino(C1–C20)alkylene, amino(C2–C20)alkenylene; Z can be hydrogen, halogen, hydroxy, C1–C5 alkoxy, C1–C5 alkoxy(C1–C5)alkoxy, C1–C4 acyloxy, phenoxy, C1–C3 alkylphenoxy, or C1–C3 alkoxyphenoxy, said halo or halogen being bromo, chloro or fluoro; b and c are each an integer of from 0 to 2; and the sum of b and c is an integer of from 0 to 3. Typically, R3 is C1–C10 alkylene, C2–C10 alkenylene, phenylene, C1–C10 alkylenephenylene, amino(C1–C10)alkylene, amino (C2–C10)alkenylene, Z is hydrogen, halogen, hydroxy, C1–C3 alkoxy, C1–C3 alkoxy(C1–C3)alkoxy, C1–C2 acyloxy, phenoxy, C1–C2 alkylphenoxy, or C1–C2 alkoxyphenoxy, and the halo or halogen is chloro or fluoro.

Non-limiting examples of silane monomers (a) include: methyltrimethoxysilane, methyl-triethoxysilane, methyltrimethoxyethoxysilane, methyltri-acetoxysilane, methyltripropoxysilane, methyltributoxysilane, ethyltrimethoxysilane, ethyltriethoxysilane, and gamma-methacryloxypropyltrimethoxysilane, gamma-aminopropyltrimethoxysilane, gamma-aminopropyltriethoxysilane, gamma-mercaptopropyltrimethoxysilane, chloromethyltrimethoxysilane, chloromethyltriethoxysilane, dimethyldiethoxysilane, gamma-chloropropylmethyldimedthoxysilane, gamma-chloropropyl-methyldiethoxysilane, tetramethylorthosilicate, tetraethylorthosilicate, hydrolyzates of such silane monomers, and mixtures of such silane monomers and hydrolyzates thereof.

The hard coat composition can further include at least one metal oxide compound represented by the following empirical formula, $$M(T)q$$

wherein M is a metal chosen from aluminum, antimony, tantalum, titanium or zirconium; T is C1–C10 alkoxy and q is an integer equivalent to the valence of M. Usually, M is chosen from aluminum, titanium or zirconium and T is C1–C5 alkoxy, e.g., propoxy.

The hard coat composition can also include from 0 to 20 weight percent, based on the total weight of the composition, of a metal oxide chosen from silicon dioxide (silica), aluminum oxide (alumina), antimony oxide, tin oxide, titanium oxide, zirconium oxide or mixtures of such metal oxides. The metal oxide can be in the form of a sol. As used in the present specification, the term sol means and includes a colloidal dispersion of finely divided solid inorganic metal oxide particles in an aqueous or an organic liquid. The average size of such particles can range from 1 to 200 nanometers, typically from 2 to 100 nanometers, and more typically, from 5 to 50 nanometers.

Such metal oxide sols can be prepared by hydrolyzing a metal salt precursor for a time sufficient to form the desired particle size or such sols can be purchased commercially. Examples of commercially available metal oxide sols that can be used in the hard coat composition include NALCO® colloidal sols (available from NALCO Chemical Co.), REMASOL® colloidal sols (available from Remet Corp.) and LUDOX® colloidal sols (available from E. I. du Pont de Nemours Co., Inc.). Stable acidic and alkaline metal oxide sols are commercially available as aqueous dispersions. Usually, the metal oxide is silica or alumina supplied in the form of an acid stabilized colloidal silica, acid stabilized colloidal alumina, e.g., NALCO® 8676, or an acid stabilized alumina coated silica sol, e.g., NALCO® 1056. Metal oxide sols can also be obtained as dispersions in organic liquids, e.g., ethanol, isopropyl alcohol, ethylene glycol and 2 propoxyethanol.

The hard coat composition also contains a catalytic amount of a water-soluble acid catalyst. A catalytic amount is that amount which is sufficient to cause polycondensation of the silane monomer(s). Typically, the catalytic amount of acid catalyst will range from 0.01 to 10 weight percent, based on the total weight of the hard coat composition. The water-soluble acid catalyst can be an organic carboxylic acid or an inorganic acid. Examples of suitable catalysts include acetic acid, formic acid, glutaric acid, maleic acid, nitric acid, sulfuric acid and hydrochloric acid.

Organic solvents present in the hard coat composition can be added or formed in situ by the hydrolysis of the silane monomer(s). Useful organic solvents are those that will dissolve or disperse the solid components of the coating composition. The minimum amount of solvent present in the coating composition is a solvating amount, e.g., an amount that is sufficient to solubilize or disperse the solid components in the coating composition. For example, the amount of solvent present can range from 20 to 90 weight percent based on the total weight of the coating composition and depends, in part, on the amount of silane monomer present in the coating composition. Examples of solvents include, but are not limited to, the following: benzene, toluene, methyl ethyl ketone, methyl isobutyl ketone, acetone, ethanol, tetrahydrofurfuryl alcohol, propyl alcohol, propylene carbonate, N-methylpyrrolidinone, N-vinylpyrrolidinone, N-acetylpyrrolidinone, N-hydroxymethylpyrrolidinone, N-butyl-pyrrolidinone, N-ethylpyrrolidinone, N-(N-octyl)-pyrrolidinone, N-(n-dodecyl)pyrrolidinone, 2-methoxyethyl ether, xylene, cyclohexane, 3-methylcyclohexanone, ethyl acetate, butyl acetate, tetrahydrofuran, methanol, amyl propionate, methyl propionate, diethylene glycol monobutyl ether, dimethyl sulfoxide, dimethyl formamide, ethylene glycol, mono- and dialkyl ethers of ethylene glycol and their derivatives, which are sold under the trade name CELLOSOLVE industrial solvents, propylene glycol methyl ether and propylene glycol methyl ether acetate, which are sold under the trade name DOWANOL® PM and PMA solvents, respectively, and mixtures of such solvents.

A leveling amount of nonionic surfactant(s) can be present as a component in the hard coat composition. A leveling amount is that amount which is sufficient to allow the coating to spread evenly or to level the hard coat composition on the surface of the tie layer to which it is applied. Typically, the nonionic surfactant is a liquid at the conditions of use and is used in amounts from about 0.05 to about 1.0 weight percent based on the amount of the silane monomer(s). Suitable nonionic surfactants are described in the Kirk Othmer Encyclopedia of Chemical Technology, 3rd Edition, Volume 22, pages 360 to 377. Other potential nonionic surfactants include the surfactants described in U.S. Pat. No. 5,580,819, column 7, line 32 to column 8, line 46.

Non-limiting examples of nonionic surfactants that can be used in the hard coat composition include ethoxylated alkyl phenols, such as the IGEPAL® DM surfactants or octylphenoxypolyethoxyethanol, which is sold as TRITON® X-100, an acetylenic diol such as 2,4,7,9-tetramethyl-5-decyne-4,7-diol, which is sold as SURFYNOL® 104, ethoxylated acetylenic diols, such as the SURFYNOL® 400 surfactant series, fluoro-surfactants, such as the FLUORAD® fluorochemical surfactant series, and capped nonionics, such as the benzyl capped octyl phenol ethoxylates, which is sold as TRITON® CF87, the propylene oxide capped alkyl ethoxylates, which are available as the PLURAFAC® RA series of surfactants, octylphenoxyhexadecylethoxy benzyl ether, polyether modified dimethylpolysiloxane copolymer in solvent, which is sold as BYK®-306 additive by BYK Chemie, USA, and mixtures of such recited surfactants.

Water is also present in the hard coat composition in an amount sufficient to form hydrolysates of the silane monomer(s). The water present in the optional metal oxide sol can supply the amount of water necessary. If not, additional water can be added to the coating composition to provide the required additional amount necessary to hydrolyze the silane monomer(s).

The abrasion-resistant coating (hard coat) can be applied to the thermally cured tie layer coating/film using the same application techniques described with respect to the photochromic coating and the tie layer, e.g., spin coating. The abrasion resistant film can be applied at a thickness of from 0.5 to 10 microns. Prior to applying the hard coat, e.g., the organo silane hard coat, to the tie layer, the tie layer can be treated to enhance its receptivity of and adhesion of the hard coat. Such treatments, e.g., plasma treatments, as are described above with respect to pretreatment of the photochromic coating prior to application of the tie layer can be used.

In a further embodiment of the present invention, additional coatings, such as antireflective coatings, can be applied to the hard coat layer. Examples of antireflective coatings are described in U.S. Pat. No. 6,175,450 and International Patent Publication WO 00/33111.

The present invention is more particularly described in the following examples, which are intended as illustrative only, since numerous modifications and variations therein will be apparent to those skilled in the art. In the examples, percentages are reported as weight percent, unless otherwise specified. Materials, such as monomers, catalysts, initiators, etc., which are identified in one example by a lower case letter in parenthesis and which are used in other examples, are identified in the subsequent examples with the same lower case letter.

EXAMPLE 1

In the following example, plano PDQ coated 1.5 mm×70 mm polycarbonate lenses obtained from Gentex Optics were used. The test lenses were treated with an oxygen plasma for 1 minute using a Plasmatech machine at a power setting of 100 Watts while introducing oxygen at a rate of 100 ml/min into the vacuum chamber of the Plasmatech machine. A photochromic polyurethane coating composition was applied to the plasma treated lenses by spin coating and the polyurethane coating thermally cured for one hour at 140° C. The components of the polyurethane composition and their amounts are tabulated in Table 1. The components of the photochromic polyurethane composition were mixed for 30 minutes at 60° C. on a magnetic hot plate, followed by 30 minutes of mixing at ambient temperature prior to being applied to the lens. The photochromic polyurethane coating was approximately 20 microns thick, and had a Fischer microhardness value of approximately 12 N/mm2.

TABLE 1

| Formulation | |
| --- | --- |
| Component/ | Amount, Grams |
| Desmodur PL 3175A (a) | 2.6 |
| Vestanat B 1358A (b) | 7.6 |
| PC 1122 (c) | 8.0 |
| HCS 6234 polyol (d) | 1.9 |
| Tinuvin 144 UV stabilizer (e) | 0.36 |
| A-187 (f) | 0.53 |
| N-methyl pyrrolidinone | 5.6 |
| Photochromic Material (g) | 0.58 |
| L-5340 surfactant (h) | 0.05 |
| Dibutyltin dilaurate | 0.16 |

(a) Methyl ethyl ketoxime blocked hexamethylene diisocyanate (Bayer)
(b) Methyl ethyl ketoxime blocked isophorone diisocyanate trimer (CreaNova, Inc.)
(c) Polyhexane carbonate diol (Stahl)
(d) Polyacrylate polyol (Composition D in Example 1 of U.S. Pat. No. 6,187,444 B1)
(e) Hindered amine light stabilizer (Ciba-Geigy)
(f) γGlycidoxypropyl trimethoxysilane coupling agent (OSi)
(g) A mixture of naphthopyran photochromic materials in proportions designed to give a gray tint to the coating when activated by UV radiation.
(h) Surfactant (Niax)

A polyurethane tie layer coating was formulated using the components listed in Table 2. The components were mixed in a small container for 20 minutes on a stir plate at 60° C. and then cooled to room temperature before being applied to the photochromic coating on the test lenses by spin coating. The polyurethane tie layer had a thickness of approximately 10 microns and was cured by heating the lens for 1 hour at 140° C. in a convection oven. Prior to applying the polyurethane tie layer, the photochromic polyurethane coating on the test lenses were treated by plasma discharge using the Plasmatech machine using the same conditions used to treat the uncoated piano lens.

TABLE 2

| Formulation | |
| --- | --- |
| Component/ | Amount, Grams |
| Vestanat B 1358A (b) | 2.0 |
| BPAEO/2EO/phenol (i) | 0.24 |
| TMP(1PO/OH) (j) | 0.12 |
| N-methyl pyrrolidinone | 0.70 |
| Dibutyltin dilaurate | 0.015 |
| BYK 333 silicone surfactant (k) | 0.001 |
| A-187 (f) | 0.08 |

(i) Ethoxylated Bisphenol A (Aldrich CAS 32492-61-8)
(j) Propoxylated trimethylolpropane (Aldrich CAS 25723-16-4))
(k) Polyether modified dimethyl polysiloxane copolymer (BYK Chimie USA)

The polyurethane tie layer coated test lenses had a percent light transmission of 87%. These lenses were exposed to UV light and observed to reversibly change color. A test lens was tested for resistance to caustic (exposure to aqueous 12.5% NaOH for 20 minutes at 60° C.) and found to pass this test. The Fischer Microhardness of the polyurethane tie layer was determined to be 137 N/mm2. A polyurethane tie layer coated lens was coated with a siloxane hard coat (HI-GARD® 1035 available from PPG Industries, Inc.) and the hard coating cured for 3 hours at 120° C. No crazing of the hard coat was observed after its cure.

EXAMPLE 2

In the following example, photochromic polyurethane coated piano PDQ polycarbonate test lenses, which were prepared in the manner described in Example 1, were used. A tie layer formulation was prepared by mixing 100 grams of Epon 826 epoxy resin (Bisphenol A/epichlorohydrin copolymer) and 17 grams of triethylene tetraamine by hand at room temperature. The tie layer formulation was spin coated onto the photochromic polyurethane coating of the test lenses, and cured in a convection oven at 95° C. for one hour. The tie layer had a thickness of approximately 10 microns, and a hardness (FH) of 125 N/mm2. The tie layer coated test lenses had a percent light transmission of 85%. These lenses were exposed to UV light and observed to reversibly change color. A test lens was tested for resistance to caustic (exposure to aqueous 12.5% NaOH for 20 minutes at 60° C.) and found to pass this test. A tie layer coated test lens was coated with a siloxane hard coat (HI-GARD® 1035 available from PPG Industries, Inc.) and the hard coating cured for 3 hours at 120° C. No crazing of the hard coat was observed after its cure.

EXAMPLE 3

In the following example, photochromic polyurethane coated plano PDQ polycarbonate test lenses, which were prepared in the manner described in Example 1, were used. A tie layer formulation was prepared by mixing 2 grams of Certech™ CRT-6000 epoxy resin (available from PPG Industries, Inc.) and 0.3 grams of N,N-dimethyl-1-amino dodecane with a magnetic stir bar for 20 minutes at room temperature. The tie layer formulation was spin coated onto the photochromic polyurethane coating of the test lenses, and cured in a convection oven at 140° C. for 30 minutes. The tie layer had a thickness of approximately 10 microns. The tie layer coated test lenses had a percent light transmission of 86%, and the hardness of the tie layer (FH) was determined to be 140 N/mm2. These lenses were exposed to UV light and observed to reversibly change color. A test lens was tested for resistance to caustic (exposure to aqueous 12.5% NaOH for 20 minutes at 60° C.) and found to pass this test. A tie layer coated test lens was coated with a siloxane hard coat (HI-GARD® 1035 available from PPG Industries, Inc.) and the hard coating cured for 3 hours at 120° C. No crazing of the hard coat was observed after its cure.

EXAMPLE 4

In the following example, photochromic polyurethane coated plano PDQ polycarbonate test lenses, which were prepared in the manner described in Example 1, were used. A tie layer formulation was prepared by mixing 1 grams of OPTECH™ CSRC-8002 carbamate-melamine clear resin (available from PPG Industries, Inc.) and 0.77 grams of dodecylbenzene sulfonic acid with a magnetic stirrer for 20 minutes at room temperature. The tie layer formulation was spin coated onto the photochromic polyurethane coating of the test lenses, and cured in a convection oven at 140° C. for 30 minutes. The tie layer had a thickness of approximately 10 microns. The tie layer coated test lenses had a percent light transmission of 75%. The hardness of the tie layer (FH) was 50 N/mm2. These lenses were exposed to UV light and observed to reversibly change color. A test lens was tested for resistance to caustic (exposure to aqueous 12.5% NaOH for 20 minutes at 60° C.) and found to pass this test. A tie layer coated test lens was coated with a siloxane hard coat (HI-GARD® 1035 available from PPG Industries, Inc.) and the hard coating cured for 3 hours at 120° C. No crazing of the hard coat was observed after its cure.

EXAMPLE 5

In the following example, photochromic polyurethane coated plano PDQ polycarbonate test lenses, which were prepared in the manner described in Example 1, were used. A tie layer formulation was prepared with an acrylic melamine resin (High Tech clear coat 74760) (available from PPG Industries, Inc.) The tie layer was spin coated onto the photochromic polyurethane coating of the test lenses, and cured in a convection oven at 140° C. for 30 minutes. The tie layer had a thickness of approximately 10 microns. The tie layer coated test lenses had a percent light transmission of 88%. The hardness of the tie layer (FH) was 163 N/mm2. These lenses were exposed to UV light and observed to reversibly change color. A test lens was tested for resistance to caustic (exposure to aqueous 12.5% NaOH for 20 minutes at 60° C.) and found to pass this test. A tie layer coated test lens was coated with a siloxane hard coat (HI-GARD® 1035 available from PPG Industries, Inc.) and the hard coating cured for 3 hours at 120° C. No crazing of the hard coat was observed after its cure.

EXAMPLE 6

In the following example, photochromic polyurethane coated plano PDQ polycarbonate test lenses, which were prepared in the manner described in Example 1, were used. A tie layer formulation was prepared by mixing 12.4 grams of a polyester resin (as subsequently described), 6.1 grams of Desmodur N 3300 isocyanate (Bayer) and 6.5 grams of methyl isobutyl ketone with a magnetic stirrer for 30 minutes at room temperature. (The polyester resin was prepared by mixing 22.6 grams of Emerox 1110 azelaic acid, 72.34 grams of Tone 0301 polycaprolactone triol, 5.03 grams of A-174 (3-methacryloxypropyl trimethoxysilane) coupling agent (Silquest), and 0.1 grams of p-toluene sulfonic acid for 30 minutes at room temperature.) The tie layer formulation was spin coated onto the photochromic polyurethane coating of the test lenses, and cured in a convection oven at 135° C. for 30 minutes. The tie layer had a thickness of approximately 10 microns. The tie layer coated test lenses had a percent light transmission of 89%. The hardness of the tie layer (FH) was 97 N/mm2. These lenses were exposed to UV light and observed to reversibly change color. A test lens was tested for resistance to caustic (exposure to aqueous 12.5% NaOH for 20 minutes at 60° C.) and found to pass this test. A tie layer coated test lens was coated with a siloxane hard coat (HI-GARD® 1035 available from PPG Industries, Inc.) and the hard coating cured for 3 hours at 120° C. No crazing of the hard coat was observed after its cure.

EXAMPLE 7

A hydrophilic polyurethane acrylate prepolymer was prepared by adding 104.4 grams of N-methylpyrrolidone, 78.1 grams of hydroxyethyl methacrylate, 80.5 grams of dimethylol propionic acid, 0.8 grams of di-tertiarybutyl-4-methyl phenol, 0.8 grams of triphenyl phosphite and 0.8 grams of dibutyl tin dilaurate to a four necked round bottom flask fitted with a thermocouple, mechanical stirrer and condenser. The contents of the flask were heated to 100° C. to obtain a homogeneous solution. Then, 400 grams of polytetrahydrofuran (MW 1000) was added to the flask. To this mixture was added slowly 222.3 grams of isophorone diisocyanate while maintaining the mixture at from 90 to 100° C. The reaction mixture was stirred at 90° C. until all the isocyanate groups were reacted. Then 417.71 grams of butyl acrylate was added to the flask and the contents cooled to ambient temperature.

An aqueous polyurethane acrylic dispersion was prepared, as described below, from the following components:

TABLE 3

| INGREDIENTS | AMOUNT (Grams) |
| --- | --- |
| CHARGE 1 | |
| Distilled water | 460.0 |
| Polyurethane acrylate prepolymer | 333.3 |
| Igepal CO-897 m | 5.8 |
| DDBSA n | 11.5 |
| Dimethyl ethanolamine | 12.0 |
| Ethylene glycol dimethacrylate | 15.0 |
| Methyl methacrylate | 78.3 |
| FEED 1 | |
| Ferrous ammonium sulfate | 0.02 |
| Sodium metabisulfite | 1.0 |
| Distilled water | 20.0 |
| FEED 2 | |
| Tertiarybutyl hydroperoxide (70% in water) | 0.8 |
| Distilled water | 20.0 | m Nonionic surfactant, 70% in water (Rhodia, Paris, France)
n Dodecylbenzene sulfonic acid, 70% in isopropanol Charge 1 was mixed in a stainless steel beaker until homogeneous and the mixture was passed once through a Microfluidizer® M110T (Microfluidics™ division of MFIC Corporation, Newton, Mass.) at 8000 psi into a round bottom flask fitted with a thermometer, mechanical stirrer and condenser, and sparged with nitrogen gas. The Microfluidizer M110T was rinsed with 40 grams of water that was then added to the flask. The temperature of the mixture was adjusted to 30° C. Feed 1 was added to the flask and stirred for one minute. Then Feed 2 was added to the flask over 30 minutes. An exotherm of 33° C. was observed. The resultant aqueous polyurethane acrylic polymer dispersion had a total solids content of 40.9% (measured at 110° C. for one hour), a pH of 6.57, and a Brookfield viscosity of 56.1 cps (spindle #1 at 60 rpm).

20 grams of the aqueous polyurethane acrylic polymer dispersion was mixed at room temperature with 6.84 grams of Cymel 385 (melamine-formaldehyde crosslinker) and 0.41 grams of A-187 (γ glycidoxypropyl trimethoxysilane) in a mixing vessel for one hour. This tie layer coating mixture was spin coated onto plano PDQ coated polycarbonate test lenses (as described in Example 1) that had been coated with a photochromic polyurethane coating, as described in Example 1. The photochromic polyurethane coating was plasma treated, as described in Example 1, prior to applying the tie layer coating mixture. The wet film weight of the mixture was approximately 0.06 grams, which provided a tie layer thickness of approximately 5 microns. The tie layer coating was cured at 110° C. for 1 hour in a convection oven.

One tie later coated test lens was treated with an oxygen plasma for 1 minute using a Plasmatech machine at a power setting of 100 Watts while introducing oxygen at a rate of 100 ml/minute into the vacuum chamber of the Plasmatech machine, and then hard coated with a siloxane hard coat (HI-GARD® 1035 available from PPG Industries, Inc.). All of the test lenses were then heat treated for an additional 3 hours at 100° C. The tie layer applied to the test lenses was tested for caustic (12.5% NaOH) resistance (20 minutes at 60° C.), adhesion (1 hour boiling water crosshatch tape test) and hard coat compatibility (level of hard coat crazing after cure). All of the tie layers on the test lenses were determined to pass the caustic resistance and adhesion test, and the hard coated lens did not exhibit any crazing. The tie layer coated lens was exposed to UV light and observed to have photochromic activity.

EXAMPLE 8

In the following example, photochromic polyurethane coated plano PDQ polycarbonate test lenses, which were prepared in the manner described in Example 1, were used. A curable thermosetting powder coating corresponding to polymer formulation B in Table 1 of U.S. Pat. No. 6,277,917 B1 was prepared in accordance with the method described in column 12 of the '917 patent. Polymer formulation B was blended with the other materials tabulated in Table 4 using the blending, extruding, grinding and classifying procedures described in column 13 of the '917 patent.

TABLE 4

Powder Coating Formulation

| Component/ | Amount, Grams |
| --- | --- |
| Polymer B | 717.4 |
| Dodecanedioic acid | 282.6 |
| Tinuvin 144 UV stabilizer (e) | 22.0 |
| Benzoin | 2.2 |
| Wax C micro powder (o) | 6.6 |
| GCA-1 (p) | 22.0 |
| Methyl dicocoamine | 11.0 |

(o) Fatty acid amide (Hoechst-Celanese)
(p) Anti-yellowing agent (Sanko Chemical)

The polyurethane photochromic coating test lenses were treated with an oxygen plasma for one minute using a Plasmatech machine at a power setting of 100 Watts, while introducing oxygen at a rate of 100 mmin into the vacuum chamber of the Plasmatech machine. The powder coating prepared as described above was applied to the surface of the photochromic polyurethane coating on the test lenses by an electrostatic spraying method, and the powder coatings cured thermally for 30 minutes at 145° C. The thickness of the powder coating was estimated to be approximately 50 microns, and was harder than the photochromic polyurethane coating.

The powder coating of the test lenses to be hard coated were treated with an oxygen plasma for one minute using a Plasmatech machine at a power setting of 100 Watts, while introducing oxygen at a rate of 100 ml/min into the vacuum chamber of the Plasmatech machine. A siloxane hard coating (HI-GARD® 1035 available from PPG Industries, Inc.) was applied by spin coating to the surface of the oxygen plasma treated powder coating, and the siloxane coating thermally cured at 60° C. for 20 minutes followed by a thermal post cure at 120° C. for 3 hours.

The dry adhesion of the siloxane hard coating to the powder coating was tested using the standard crosshatch pull test. All samples passed at 100%. The dry adhesion of the powder coating to the photochromic polyurethane coating on test lenses that were not coated with the siloxane hard coating was also tested using the crosshatch pull test, and all samples were observed to pass at 100%.

The test lenses to which the siloxane hard coating were applied were viewed using a high intensity white arc light of a 75 Watt Xenon bulb, with the light being projected vertically down through the lens. All samples tested were free of crazing (tiny cracks) in the hard coat indicating that the coating stack (photochromic polyurethane plus powder coating tie layer plus siloxane hard coat) were all compatible. The test lenses (with and without the hard coating) were tested for transparency and found to have a transparency of greater than 80%.

Although the present invention has been described with reference to specific details of certain embodiments thereof, it is not intended that such details should be regarded as limitations upon the scope of the invention except insofar as they are included in the accompanying claims.

What is claimed is:

1. A photochromic article comprising:
   (a) a rigid substrate comprising paper, glass, ceramic, wood, masonry, textile, metal and/or organic polymeric material,
   (b) a photochromic organic polymeric coating appended to at least a portion of at least one surface of said substrate, said polymeric coating comprising a photochromic amount of at least one photochromic material, wherein said polymeric coating comprises photochromic polyurethane-based coatings, photochromic polyurea urethane-based coatings, photochromic poly(meth)acrylic-based coatings, photochromic aminoplast coatings, and/or photochromic epoxy resin-based coatings, and
   (c) a transparent coating comprising a thermally cured thermoset polymer superimposed on said photochromic polymeric coating, said transparent coating being harder than said photochromic organic polymeric coating, wherein said thermoset polymer comprises (a) a thermosetting polyurethane; (b) a thermoset polysiloxane polymer; and/or (c) a thermoset material prepared from (1) a liquid crosslinkable composition comprising a polyepoxide and a polyacid curing agent; (2) a crosslinkable composition comprising (i) a material containing a plurality of carbamate and/or urea functional groups and (ii) an aminoplast crosslinking agent; (3) a crosslinkable composition comprising at least one acrylic polyol, aminoplast and at least one carbamoyl triazine; (4) a powder clear coating composition comprising (i) an epoxy functional acrylic polymer or copolymer as the predominant film-forming polymer and (ii) a polycarboxylic acid crosslinking agent; or (5) film-forming resin compositions comprising a latex emulsion that includes crosslinked polymeric microparticles dispersed in an aqueous continuous phase.

2. The photochromic article of claim 1 wherein the thermally cured polymer comprises (a) a thermosetting polyurethane; (b) a thermoset polysiloxane polymer; or (c) a thermoset material prepared from (1) a liquid crosslinkable composition comprising a polyepoxide and polyacid curing agent; (2) a crosslinkable composition comprising (i) material containing a plurality of carbamate and/or urea functional groups, and (ii) an aminoplast crosslinking agent; (3) a crosslinkable composition comprising acrylic polyol(s), aminoplast and carbamoyl triazine(s); (4) a powder clear coating comprising (i) an epoxy functional acrylic polymer or copolymer as the predominant film-forming polymer, and (ii) a polycarboxylic acid crosslinking agent; or (5) film-forming resin compositions comprising a latex emulsion that includes crosslinked polymeric microparticles dispersed in an aqueous continuous phase.

3. The photochromic article of claim 2 further comprising an abrasion-resistant coating affixed to the surface of the thermally cured polymer coating.

4. The photochromic article of claim 3 further comprising an antireflective coating affixed to the surface of the abrasion-resistant coating.

5. The photochromic article of claim 4, wherein the article is an ophthalmic article.

6. The photochromic article of claim 5 wherein the ophthalmic article is a lens.

7. The photochromic article of claim 2 wherein the abrasion-resistant coating comprises an organo silane-based coating.

8. The photochromic article of claim 2 wherein the polymeric substrate is a substrate comprising a thermoplastic polycarbonate.

9. The photochromic article of claim 1 wherein the thermally cured thermoset polymer is prepared from a film-forming resin composition comprising a latex emulsion that includes crosslinked polymeric microparticles dispersed in an aqueous continuous phase.

10. The photochromic article of claim 9 wherein the film-forming composition further comprises an aqueous polyurethane dispersion.

11. The photochromic article of claim 10 wherein the aqueous polyurethane dispersion contains polyurethane acrylate micro particles.

12. The photochromic article of claim 1 wherein the rigid substrate is an organic polymeric material.

13. The photochromic article of claim 12 wherein the rigid substrate is an organic polymeric material chosen from thermoset substrates prepared from polymerizable compositions comprising allyl diglycol carbonate monomer(s), substrates prepared from thermoplastic polycarbonates, substrates prepared from polyurea urethanes, or substrates prepared from compositions comprising the reaction product of polyfunctional isocyanate(s) and/or isothiocyanate(s) with polythiol or polyepisulfide monomer(s).

14. The photochromic article of claim 11 wherein the allyl diglycol carbonate is diethylene glycol bis(allyl carbonate).

15. The photochromic article of claim 1 wherein the thermally cured thermoset polymer is prepared from a thermosetting polyurethane composition.

16. The photochromic article of claim 1 wherein the thermally cured thermoset polymer is prepared from a crosslinkable composition comprising (a) a material containing a plurality of carbamate and/or urea functional groups and (b) an aminoplast crosslinking agent.

17. The photochromic article of claim 1 wherein the thermally cured thermoset polymer is prepared from a crosslinkable composition comprising at least one acrylic polyol, aminoplast and at least one carbamoyl triazine.

18. The photochromic article of claim 1 wherein the thermally cured thermoset polymer is prepared from a powder clear coating composition comprising (a) an epoxy functional acrylic polymer or copolymer as the predominant film-forming polymer and (b) a polycarboxylic acid crosslinking agent.

19. The photochromic article of claim 1 wherein the thermally cured thermoset polymer is a polysiloxane polymer.

* * * * *